May 22, 1951 R. O. RIPPERE 2,554,155
GROUND TRAINER FOR TRAINING AIRCRAFT CREWS
Filed Dec. 13, 1946 21 Sheets-Sheet 1

INVENTOR
R. O. RIPPERE
BY
P. C. Smith
ATTORNEY

INVENTOR
R. O. RIPPERE
BY
P. C. Smith
ATTORNEY

May 22, 1951 R. O. RIPPERE 2,554,155
GROUND TRAINER FOR TRAINING AIRCRAFT CREWS
Filed Dec. 13, 1946 21 Sheets-Sheet 10

INVENTOR
R. O. RIPPERE
BY
P. C. Smith
ATTORNEY

May 22, 1951 — R. O. RIPPERE — 2,554,155
GROUND TRAINER FOR TRAINING AIRCRAFT CREWS
Filed Dec. 13, 1946 — 21 Sheets-Sheet 14

May 22, 1951  R. O. RIPPERE  2,554,155
GROUND TRAINER FOR TRAINING AIRCRAFT CREWS
Filed Dec. 13, 1946  21 Sheets-Sheet 21

INVENTOR
R. O. RIPPERE
BY
P. C. Smith
ATTORNEY

Patented May 22, 1951

2,554,155

UNITED STATES PATENT OFFICE 2,554,155

GROUND TRAINER FOR TRAINING AIRCRAFT CREWS

Robert O. Rippere, Massapequa, N. Y., assignor to Bell Telephone Laboratories, Incorporated, New York, N. Y., a corporation of New York Application December 13, 1946, Serial No. 715,982

30 Claims. (Cl. 35—12)

This invention relates to an aircraft trainer in which the operation of controls similar to those of a standard aircraft by the pilot causes the operation of instruments on the pilot's and copilot's instrument panels and of instruments at the instructor's desk to simulate the instrument operation of an actual flight whereby student pilots may be given ground training commensurate with actual training in an airplane and under all flight conditions which might be encountered during an actual flight.

In the training of pilots it has been the practice heretofore to give training in aircraft of a training type and also in ground trainers equipped to give them some of the fundamentals of instrument flight. To familiarize the pilots with the handling of power and other equipment of airplanes, ground courses have also been given with such equipment. Following such basic training, it has then been the practice to train pilots extensively in the flight of actual aircraft which they will later be assigned to fly.

Aircraft are costly to build, to fly and to maintain and their use for intensive training purposes by pilots who have not yet attained their skill in flying them, introduces a great hazard both to the equipment and to the pilots during the training period and obviously withdraws such aircraft from their more valuable use in actual service.

From actual experience it has been found that after the pilots have had all of their basic training in flying and in the operation of the equipment of airplanes, the actual flying hours in the air with airplanes which will utimately be assigned to them for flight may be materially reduced through the use of a ground trainer designed to simulate all of the flight and operational functions of the type of airplane to which they will later be assigned. A ground trainer of this type for training the crew personnel of a multiengined airplane has been fully disclosed in the application of R. C. Davis, E. J. Fogarty and R. O. Rippere, Serial No. 542,986, filed June 30, 1944. In the disclosure of Patent 2,506,949 to F. M. Burelbach and J. J. Lukacs of May 9, 1950, a ground trainer has been disclosed in which the pilots may be trained to perform all the functions required to start and control the engines of an airplane of the multiengined type which the trainer is designed to simulate. The present invention relates more particularly to a trainer of the latter type in which the pilots may be trained to perform all of the flight functions which would be required to actually fly such an airplane.

It is therefore an object of the present invention to provide a ground trainer in which student pilots may be trained to perform all flight functions which would be required to actually fly an airplane of the type which the trainer is designed to simulate.

To attain this object, the trainer in accordance with the present invention has been designed to follow as nearly as possible the flight and engine characteristics of the airplane which it is desired to simulate, in the operation of its controls and the instrument response thereto. The instruments and controls provided for the pilots are similar in appearance to those in the regular airplane but such instruments are controlled through electrical circuits and mechanically operated apparatus so that the indications on the instruments and "feel" of the controls simulate those of an airplane in flight. In addition sound effects and airplane vibrations are simulated by a loudspeaker and vibrators located in the trainer to render the training flight more realistic. Although the training flight unit remains stationary when the pilots perform their normal control functions at the start and during flight, equipment is brought into action which simulates and records engine starting, take off and landing, banked turns, altitude effects, etc. in the instrument response. The design is based on various aerodynamic and engine performance characteristics and registers the result in terms of normal airplane instrument readings.

The objective is obtained by the use of motor drive and motor control units which operate from input potentials caused by the unbalancing of the circuits as the engine and flight controls are positioned. These motors through reduction gears produce shaft rotations to angular positions proportional to the input potentials. The shafts cause the rotation of potentiometers or variacs which control other motor drive units and also control the operation of telemetric apparatus which control the operation of corresponding instruments thus causing said instruments to register the shaft positions. Potentiometers are also mechanically coupled to the engine and flight controls and are electrically included in the motor control circuits.

In order that the training of student pilots may be suitably supervised and directed, an instructor's desk is provided at which duplicates of the instruments of the training unit are mounted, at which control keys and switches are provided for enabling the instructor to introduce conditions of flight, and at which various supervisory signals are also provided.

Just as an airplane uses thrust created by the engines and propellers to take-off, climb and fly, so does the trainer use thrust to simulate take-off, climb and flight. The flight circuits may be considered in two groups, one group includes the circuits associated with straight ahead flight including climbing flight and the other group includes the circuits associated with turns. The straight flight circuits include angle of attack, true rate of climb, indicated rate of climb, rate of pitch, altimeter, true airspeed and indicated airspeed.

In an airplane, the pilot uses the elevator control to control the speed of flight. If the power developed by the engines and propellers is more than is needed to fly level at the speed the pilot chooses, the airplane will climb and similarly if the engine power is less than that required to fly level, the airplane will descend. The position of the control determines the angle of attack of the wings which is the angle between the lower surface of the wings and the line of flight of the airplane. The angle of attack determines how much lift or drag the wings produce for any airspeed. In the trainer, these effects are produced in a similar manner. The trainer control is arranged to control the position of a potentiometer in the rate-of-pitch motor unit. Potentiometers on the rate-of-pitch motor unit control the position of the angle of attack potentiometers which in turn control the indicated airspeed and rate-of-climb motors. When the angle of attack increases the rate-of-climb motor moves its potentiometers and instruments to a position representing the higher rate of climb and the indicated airspeed motor moves its potentiometers and instruments to a position representing a lower airspeed. Lower indicated airspeed results in lower rate of climb and as the rate of climb decreases it causes an increase in the indicated airspeed. The interaction of these circuits eventually results in a stable condition which correctly represents the new attitude of the trainer.

The rate of climb potentiometer controls the altimeter motor. If the rate of climb represents a positive rate of 200 feet per minute, the altimeter will show an increase of 200 feet in altitude at the end of a minute.

The true airspeed of an airplane is usually different from the indicated airspeed because the ordinary airspeed indicators depend on the air density as well as the true airspeed. Air density depends on barometric pressure and temperature, both of which are closely related to altitude. In the trainer the air density effect is controllable by the altimeter motor unit and outside air temperature so that as the altitude increases the true airspeed becomes greater than the indicated airspeed. Provision is also made whereby the instructor may introduce the representation of the outside air temperature.

The pitch bar motor unit controls the up and down movement of the "horizon" in the gyrohorizon instrument. It is controlled by various potentials representing rate of climb, true airspeed and the vertical components of the angle of attack and yaw. In straight flight an increase in rate of climb or angle of attack will cause the pitch bar motor unit to move the horizon down thus representing a nose "up" condition.

The turning flight circuits include rate of turn, rate of roll, bank, rate of yaw, ball, compass, ground speed and ground track (flight recorder) and drift sight.

The rudder is used primarily to control movement of the airplane around its vertical axis. This movement is called yawing and the rate at which the airplane moves about its vertical axis is the rate of yaw. The rate of turn with respect to the earth is related to the rate of yaw by the bank angle of the airplane.

The ailerons are used primarily to control movement of an airplane around its longitudinal axis. This movement is called rolling. The bank angle or angle between the wings and the horizon is controlled by rolling the airplane.

There are other factors, however, which also effect these movements. If the ailerons are deflected without using rudder, as the bank angle increases the plane side slips. Side-slipping causes air to strike the side of the rudder and tail fin causing the airplane to yaw in the direction of the side slip. In this case the rate of yaw is a secondary result of aileron movement. If on the other hand the rudder is applied without movement of the ailerons, the centrifugal force causes the airplane to skid. Because of the construction of the wings a skid causes the airplane to roll, raising the wing on the side toward which it is skidding. Therefore, a secondary result of rudder movement is a change in bank angle.

In the trainer the rate of turn, rate of roll, rate of yaw and bank circuits are arranged so that the effects briefly described above are reproduced. Application of left rudder without ailerons causes the rate-of-turn motor to run its potentiometers and instruments in a direction corresponding to an increasing rate of turn to the left. Left rudder application also causes the yaw motor unit to run its potentiometer in a direction corresponding to a skid to the right. Potentials from the yaw potentiometers cause a decrease in the rate of turn and cause the rate-of-roll motor to run its potentiometer in a direction to represent a lowering of the left wing. The rate-of-roll circuit causes the bank motor to move its potentiometers and instruments to represent a left wing down condition and a potential from one of the bank potentiometers tends to decrease the rate of yaw until a stable condition exists.

If the aileron control wheel is turned to the right without moving the rudder pedals, a potential is connected to the rate-of-roll motor circuit so that the motor of such circuit moves its potentiometers in a direction corresponding to a lowering of the right wing. A potential from one of these potentiometers causes the bank motor to move its potentiometers and instruments to a right wing down position. A potential from one of the bank potentiometers causes the yaw mtor to move in a direction representative of a slip to the right. The yaw movement is reflected into the rate-of-roll circuit until stabilization occurs under the existing conditions.

The ball circuit controls the movement of the ball indicator in the turn and bank instrument. If the airplane has the correct bank angle for its rate of turn and airspeed, the ball will be centered in the curved glass tube of the instrument. If the right wing is lower than it should be, the ball moves to the right. In the trainer if there is a rate of turn to the right a corresponding potential from the rate-of-turn potentiometer tends to cause the ball motor to move the ball to the left. If the bank angle is correct for its airspeed and rate of turn, there will be no slip-motor control circuit and apparatus of the associated motor unit;

Fig. 15 shows in the upper left portion a schematic representation of the thrust motor control circuit and apparatus of the associated motor unit, in the central portion thereof a schematic representation of the weight motor control circuit and apparatus of the associated motor unit and in the lower portion thereof a schematic representation of the angle of attack motor control circuit and apparatus of the associated motor unit;

Fig. 16 shows schematically the instruments mounted on the pilot's instrument panel positioned before the pilot's station on the flight deck of the trainer and the synchro-receivers for controlling them;

Fig. 17 shows schematically to the left of the vertical dot-dash line the instruments mounted on the copilot's instrument panel positioned before the copilot's station on the flight deck of the trainer and the synchro-receivers for controlling them, to the right of the vertical dot-dash line the instruments positioned at the bombardier's station in the trainer and the synchro-receivers for controlling them, and below the horizontal dot-dash line control potentiometers operable by certain of said controls and synchro-transmitters operable by other controls positioned at the instructor's desk;

Fig. 22 is a diagram showing how the several figures of the drawing should be assembled to fully disclose the invention.

The motor control circuits and associated motor units are in general mounted in pairs. For example, the rate-of-turn motor control circuit schematically disclosed in the lower portion of Fig. 12 and all of the potentiometers and synchro-transmitters controlled thereby disclosed in the lower portion of Fig. 12, and the rate-of-roll motor control circuit and associated potentiometers controlled thereby, constitute a single assembly. Each motor control circuit comprises a direct current reversible motor which, through a reduction gear box drives a main driving shaft which, in turn may drive one or more synchro-transmitters of the so-called "autosyn" type for controlling instruments remotely mounted on instrument panels of the trainer and at the instructor's desk, may drive potentiometers or variable transformers of the so-called "variac" type for controlling other motor control circuits of the trainer, and may drive limit switches to assure that the driving motor will be arrested before the sliders of the potentiometers or variacs are driven beyond the ends of the windings with which they are associated. The shaft may also drive cams for operating other switches. This equipment is mounted on a motor plate as schematically disclosed in the Patent No. 2,428,767, granted October 14, 1947, to W. P. Albert, R. C. Davis, R. H. Gumley and W. H. T. Holden. The relays, condensers, resistances, control rheostats, testing jacks and electronic devices associated with the equipment mounted on the motor plate are located on an apparatus rack positioned above and secured to the motor plate. Several of these motor plates and mounting rack assemblies are mounted one above the other in apparatus cabinets forming a separate unit of the trainer equipment.

Figure 4:
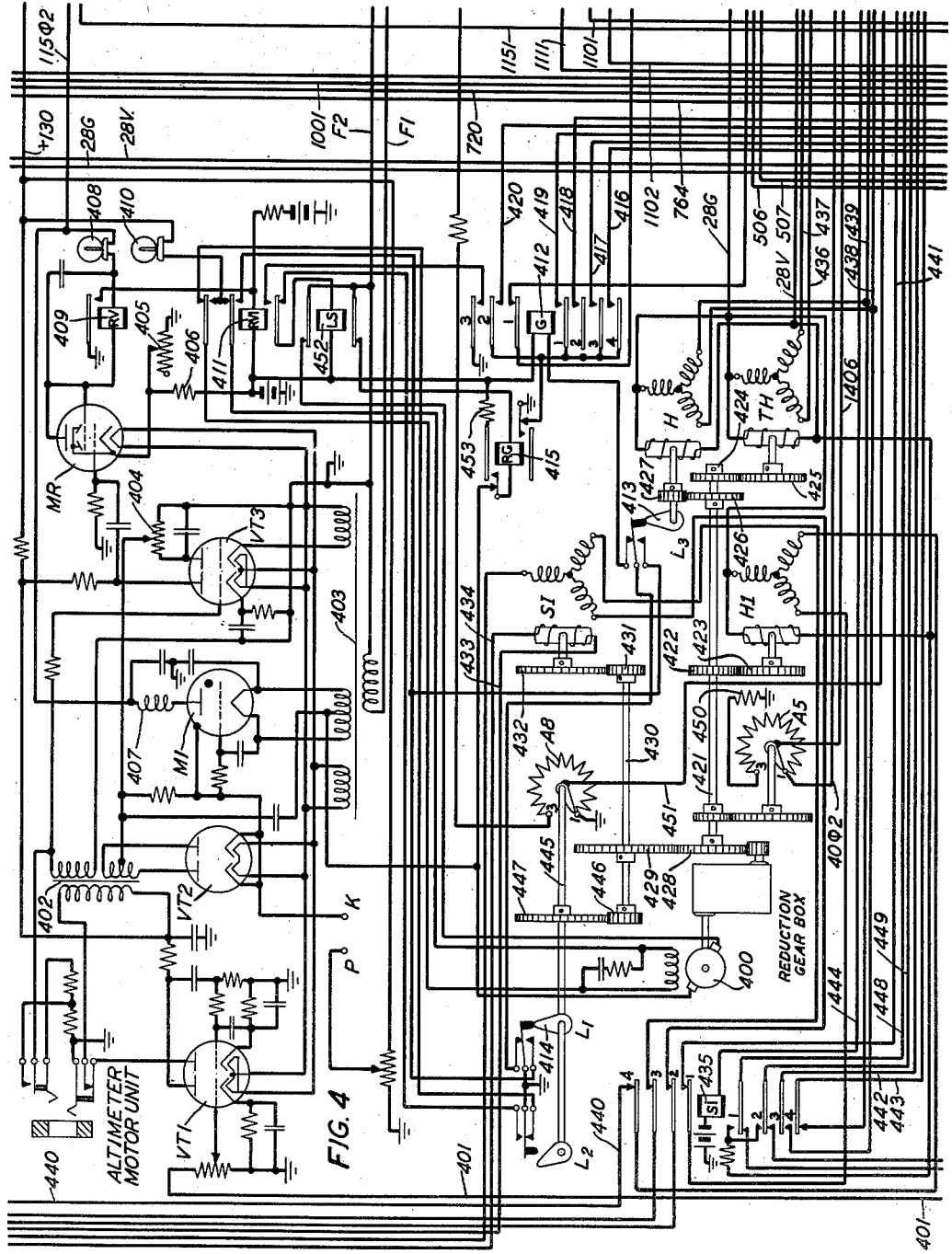

Each of the motor control circuits, for example the altimeter motor control circuit disclosed in Fig. 4, is of the type disclosed and fully described in the Patent No. 2,428,767, granted to Albert, Davis, Gumley and Holden, above referred to. In general, the circuit for controlling the motor 400 comprises a dual amplifier tube VT1 which receives a signal potential incoming on signal control conductor 401, amplifies it and applies it through the lower secondary winding of the step-up transformer 402 to the plates of a dual rectifier tube VT2. The tube VT2 serves as a full wave rectifier to rectify the output signal from the tube VT1 and to apply it as a positive potential to the grid of the gas-filled motor impulsing tube MI. The output potential of tube VT1 is also applied through the upper secondary winding of transformer 402 to the control grid of the left amplifier unit of tube VT3, is amplified thereby and impressed upon the control grid of the motor reversing tube MR. Direct current grid bias for tube MI is supplied from the right secondary winding of the power transformer 403 through the right unit of tube VT3 under the control of bias adjusting rheostat 404. Direct current cathode bias is supplied to the cathode of tube MR from the slider of bias control rheostat 405, the winding of which is connected in series with the resistor 406 and with the source of battery current.

Filament heating current for tubes VT1, VT2, VT3 and MR is supplied from the left secondary winding of transformer 403 and filament heating current is supplied to tube MI from the middle secondary winding of transformer 403. The primary winding of transformer 403 is energized from the 115-volt filament supply bus-bars F1 and F2. Plate potential is supplied to the plates of amplifier tube VT1 and to the plate of the left or amplifier unit of tube VT3 from the +130-volt direct current bus-bar, and 60-cycle plate potential is applied from the 115-volt alternating current bus-bar 115φ2 through choke coil 407 to the plate of tube MI and through ballast lamp 408 and through the winding of the RV relay 409 to the plate and screen grid of tube MR.

The motor 400 is of the direct current reversible type whose stator winding is energized by direct current from the direct current bus-bar +130 through ballast lamp 410 under the control of the RV1 reversing relay 411, which relay is in turn under the control of the RV plate relay 409 associated with the tube MR. The rotor winding of the motor is energized by positive impulses of current transmitted therethrough by the firing of the gas-filled tube MI. When the input signal potential applied to conductor 401 is in phase with the potential applied to the plate of tube MR relays 409 and 411 will operate and, since the rectifier tube VT2 functions to make the grid of tube MI more positive in response to both half ping or skidding and therefore no yaw potential controlling the ball. The potentials from the rudder potentiometer applied to control the ball will be equal and opposite to the rate-of-turn potential and the ball motor will center the ball. If the bank angle is 5 degrees less than it should be there will be a component yaw and the ball motor will move the ball 5 degrees to the left.

The compass system in the trainer is controlled by the movement of the compass motor unit which is a function of the rate of pitch, rate of turn and bank angle. The effect of rate of pitch increases as the bank angle increases whereas the effect of rate of turn decreases as the bank angle increases. A turning error is introduced into the pilot's magnetic compass circuit by the effect of the field produced by two small coils mounted in the compass unit. The current through the coils is controlled by a potentiometer on the rate-of-turn motor unit and is proportional to the rate of turn. With this arrangement, no turning error will be produced on an east or west course and a maximum error of approximately 30 degrees will occur on fast turns from a north or south course. An additional error representative of the variation of the horizontal component of the earth's magnetic field with change of location can be introduced by the instructor.

The tendency of the directional gyro to drift away from the true heading is simulated by means of a slow speed motor and differential gear box through which the gyro-transmitter is attached to the compass motor unit.

The remote indicating compass at the pilot's position follows the flux gate master indicator at the navigator's position and gives the true heading when the navigator has made the correct variation compensation at the flux gate master indicator.

The compass, altimeter and airspeed indicator tell the pilot how fast and in what direction the airplane is moving with respect to the air around it. If that air is moving with respect to the earth the pilot must make allowance for the magnitude and direction of the air movement with respect to the earth. These functions are known as ground wind velocity and direction. Their values can be determined in an airplane by use of a drift sight and an appropriate course steered by the pilot in order to reach his destination.

In the trainer the imaginary course flown is recorded on a map by a flight recorder whose direction and speed over the map are controlled by the ground track and ground speed motor control circuits respectively which are dependent on the true airspeed and compass heading of the trainer and the ground wind velocity and direction.

Figure 1:
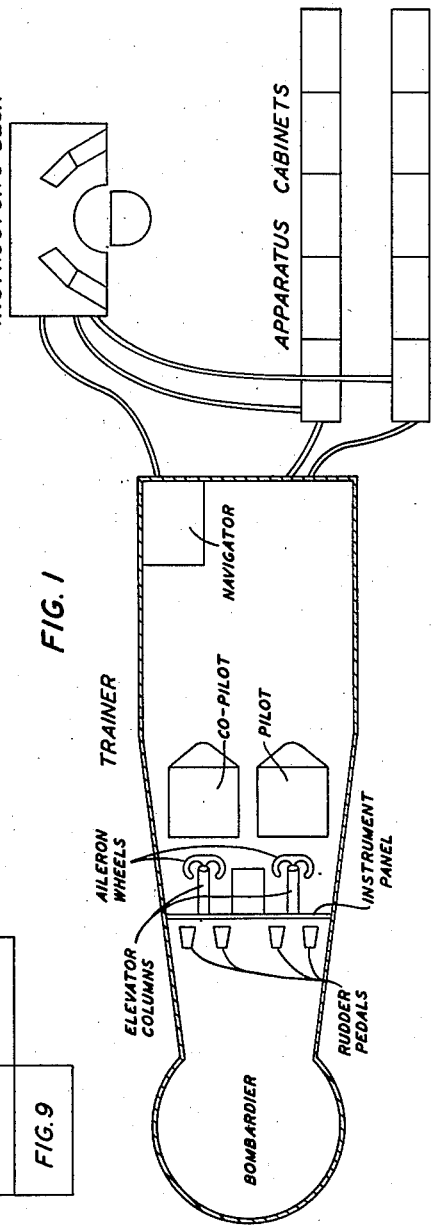
Figure 2:
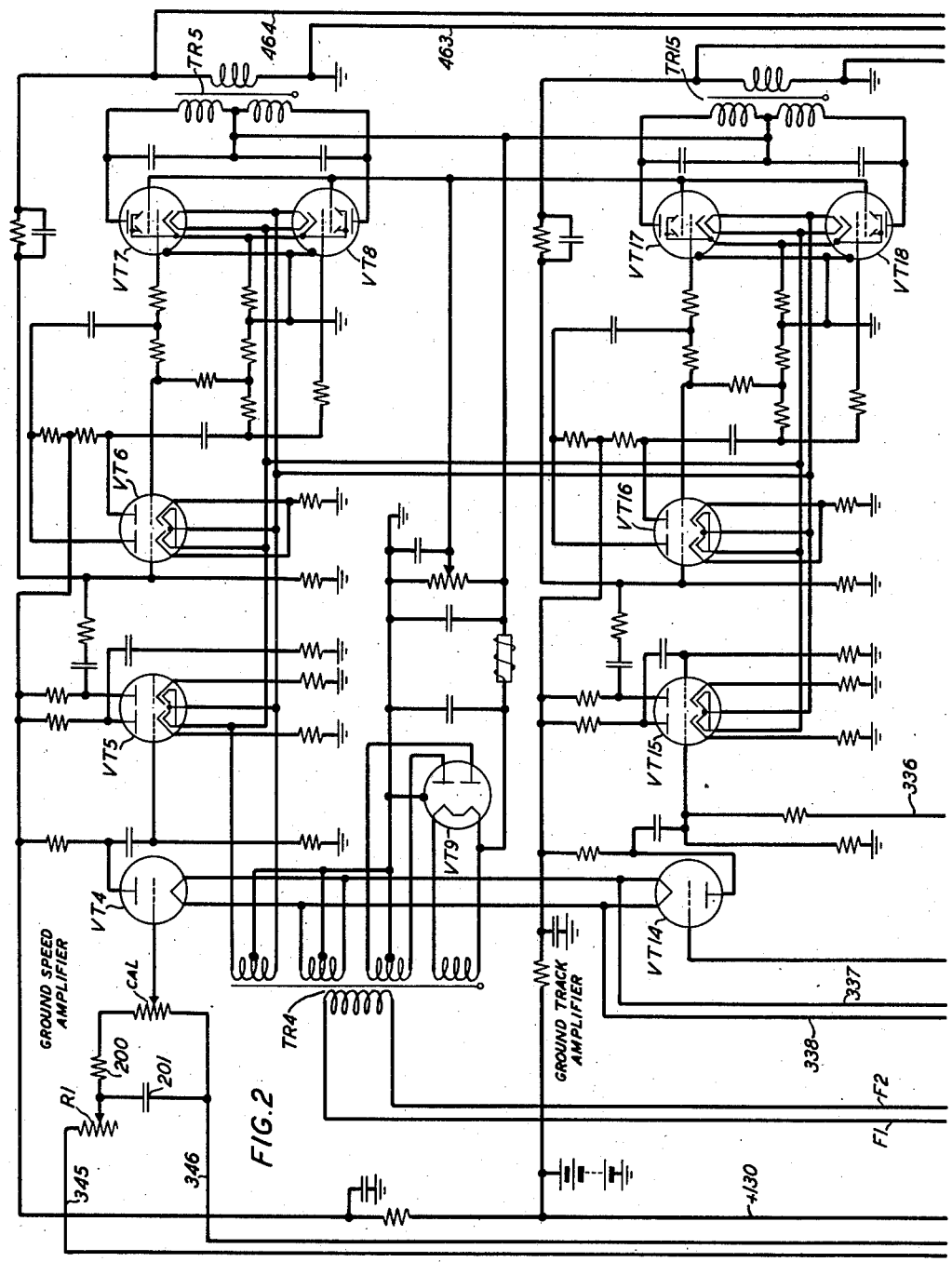
Figure 3:
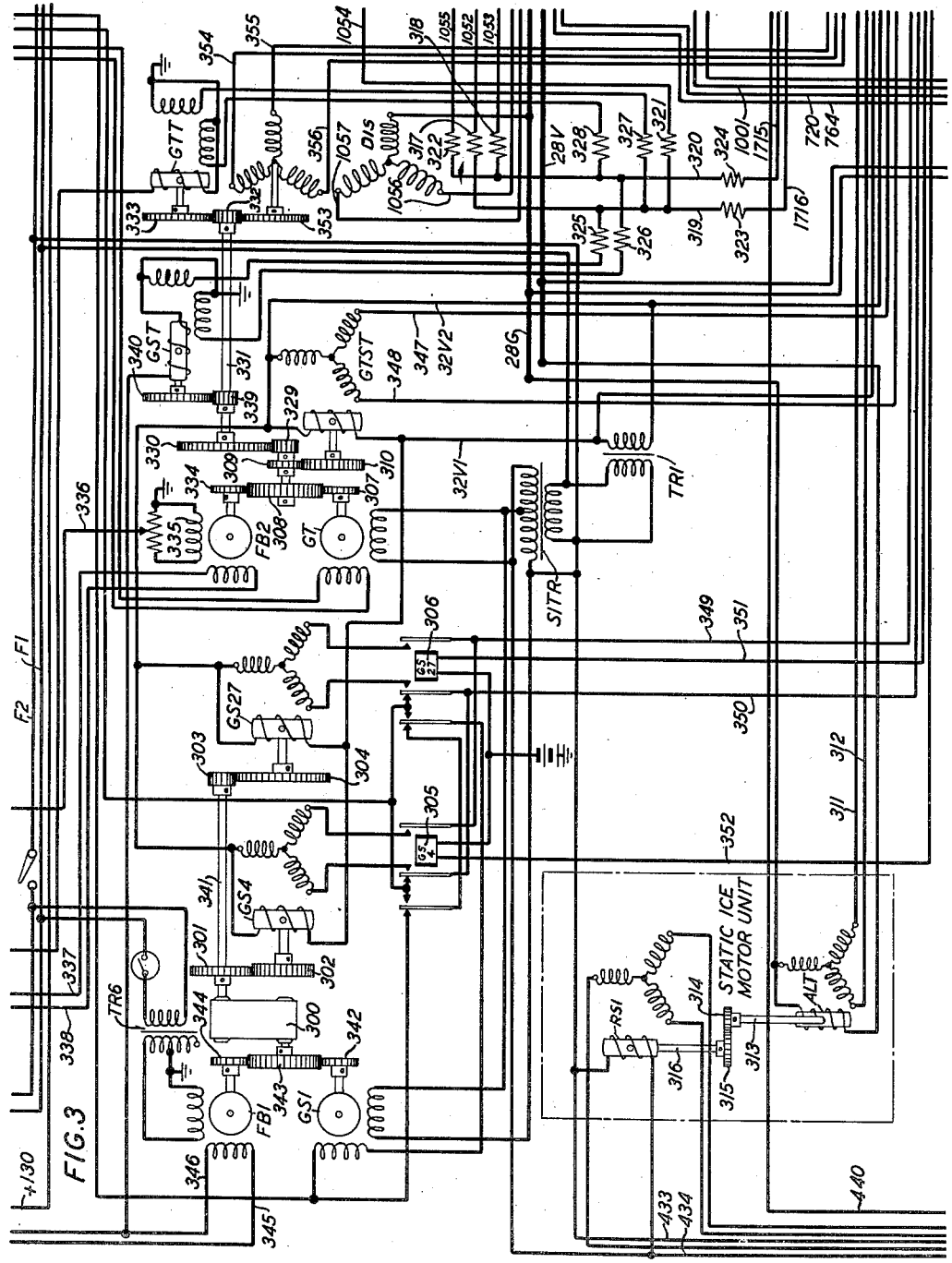
Figure 5:
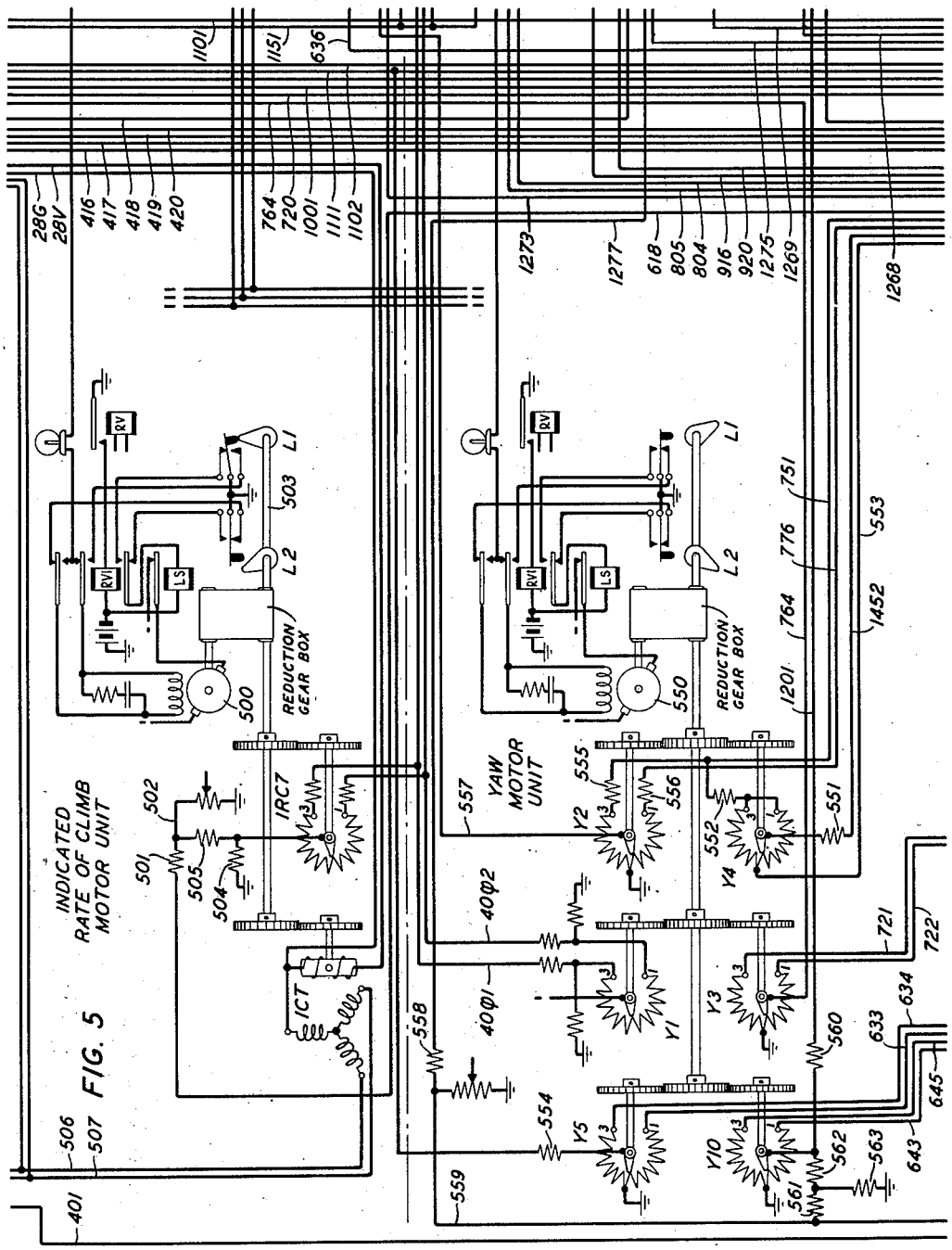
Figure 6:
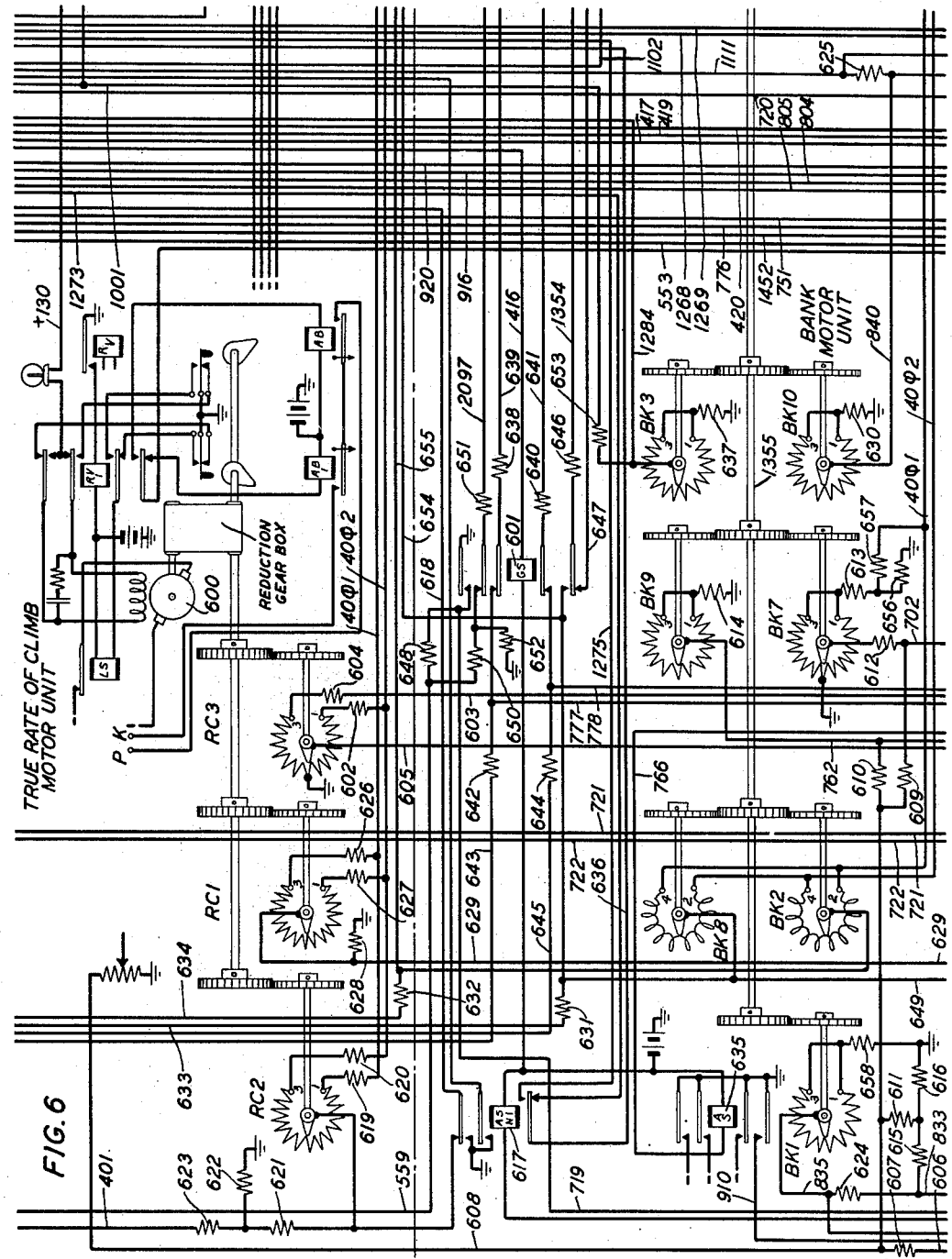
Figure 7:
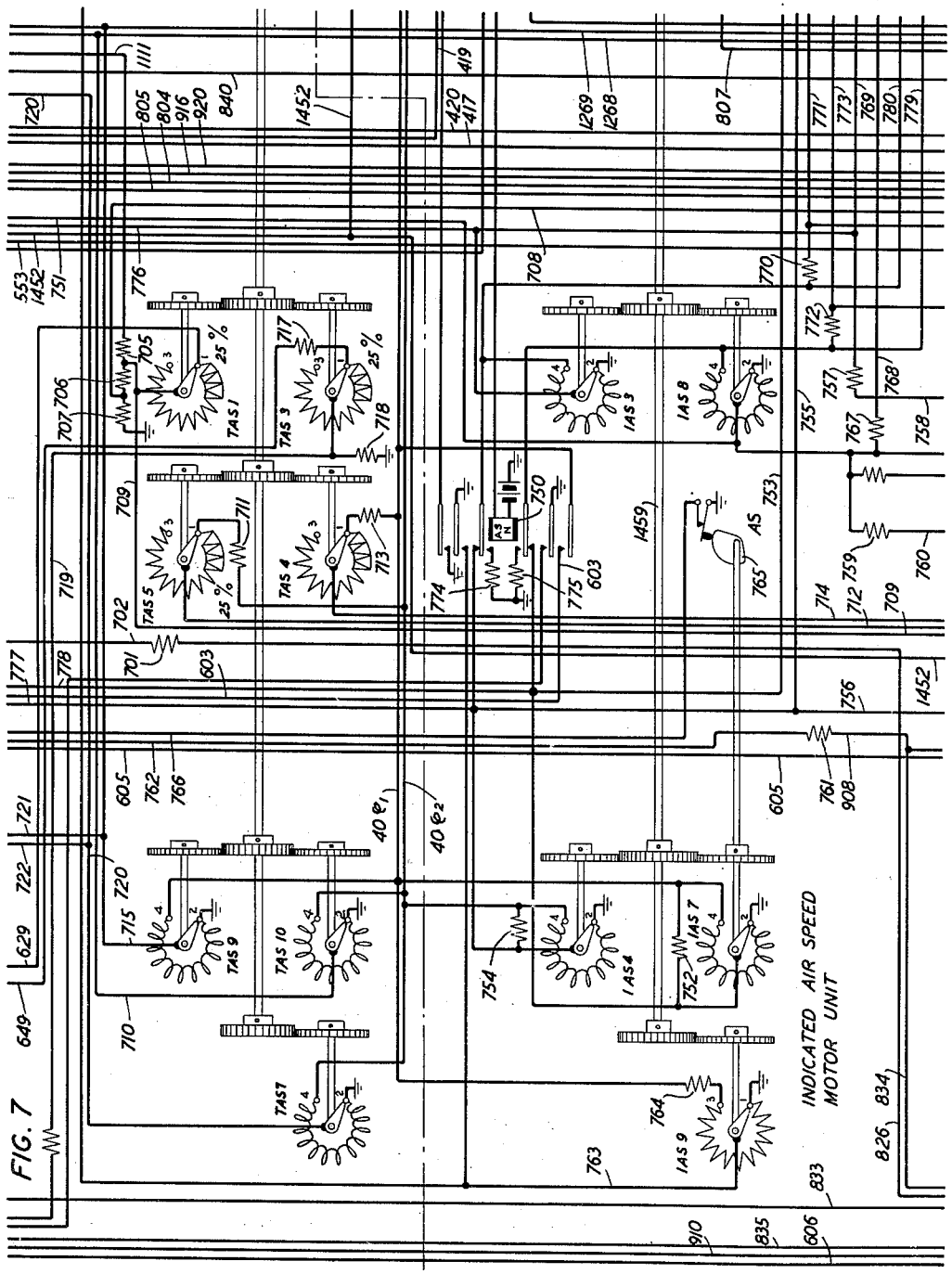
Figure 8:
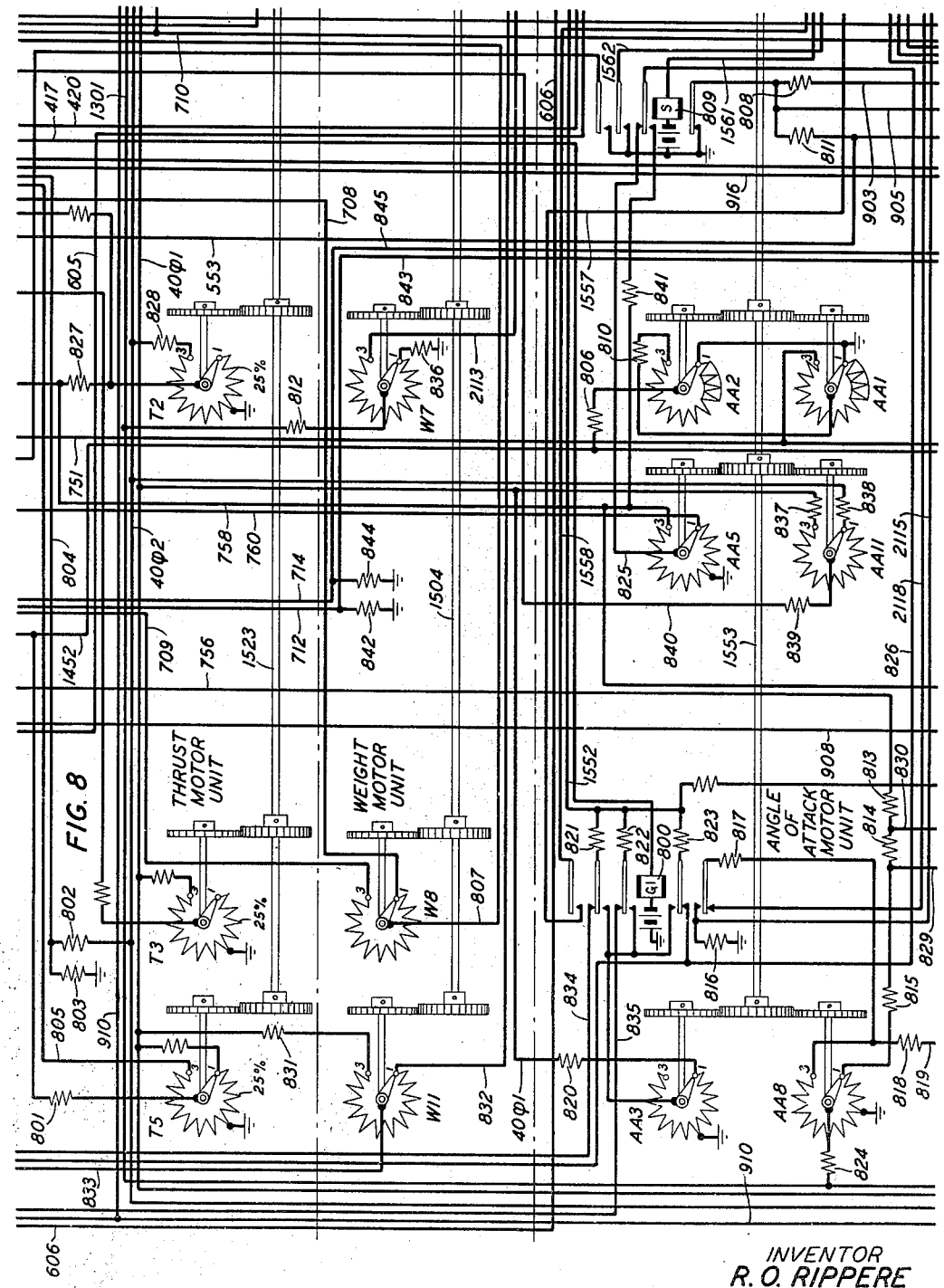
Figure 9:
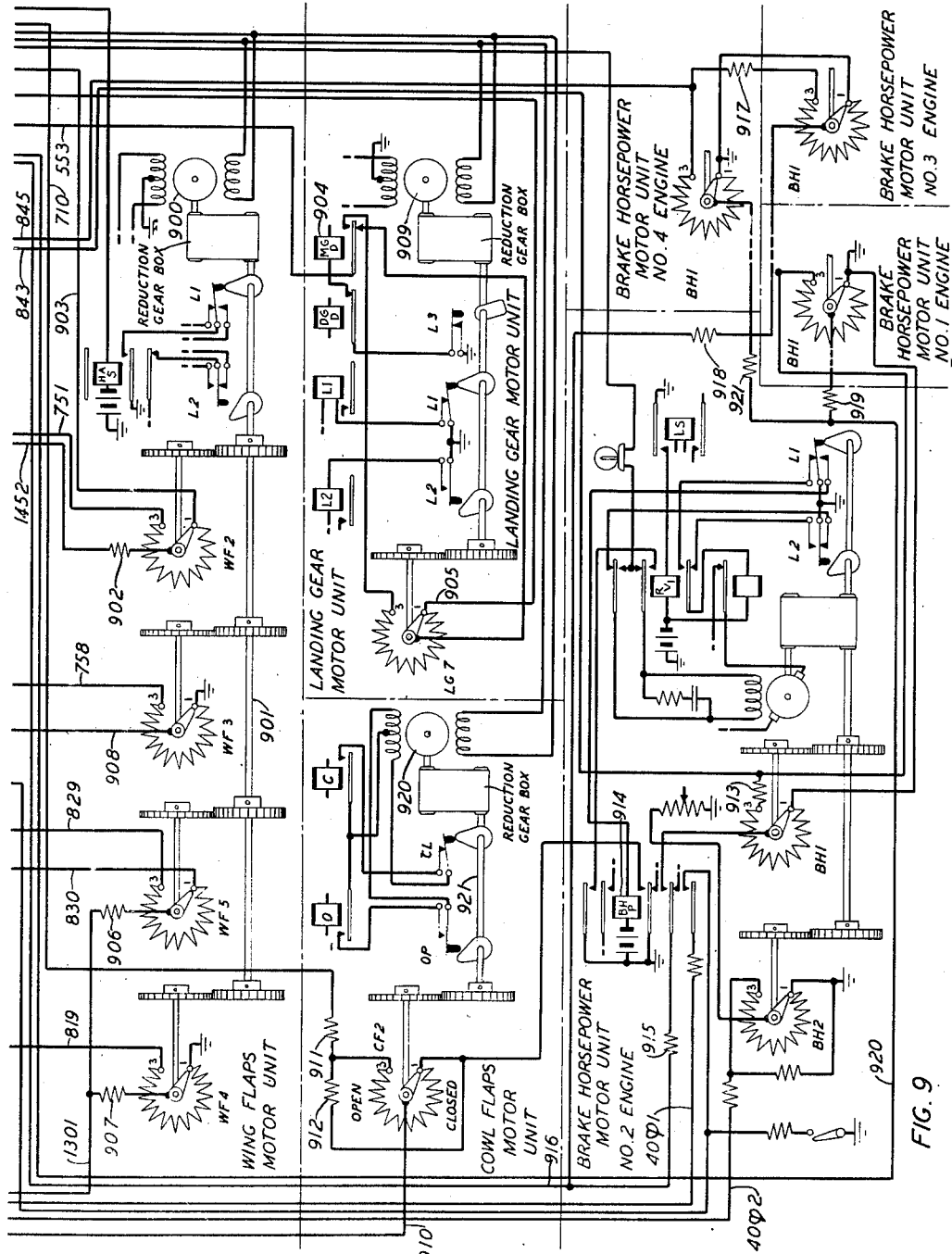
Figure 10:
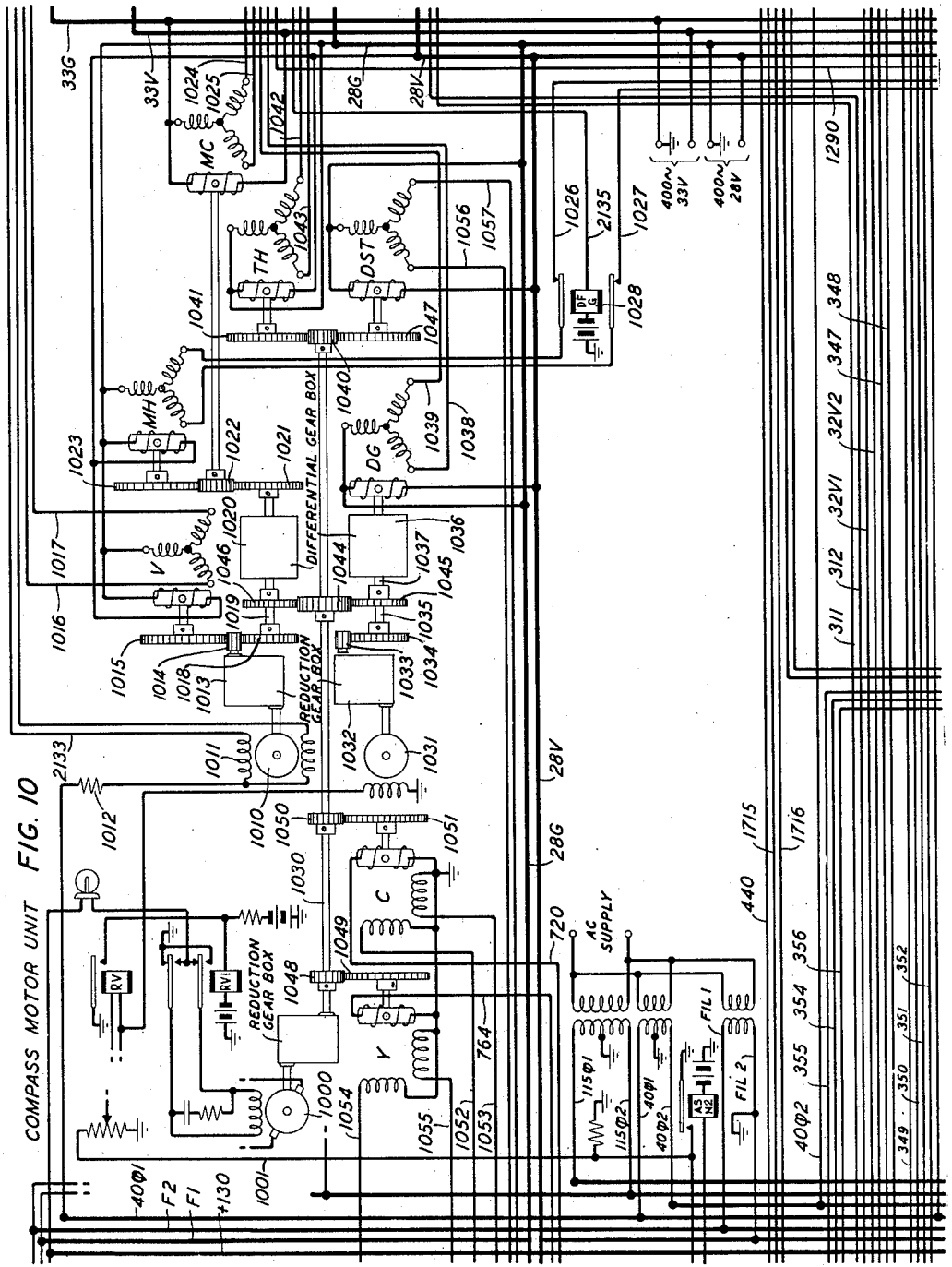
Figure 11:
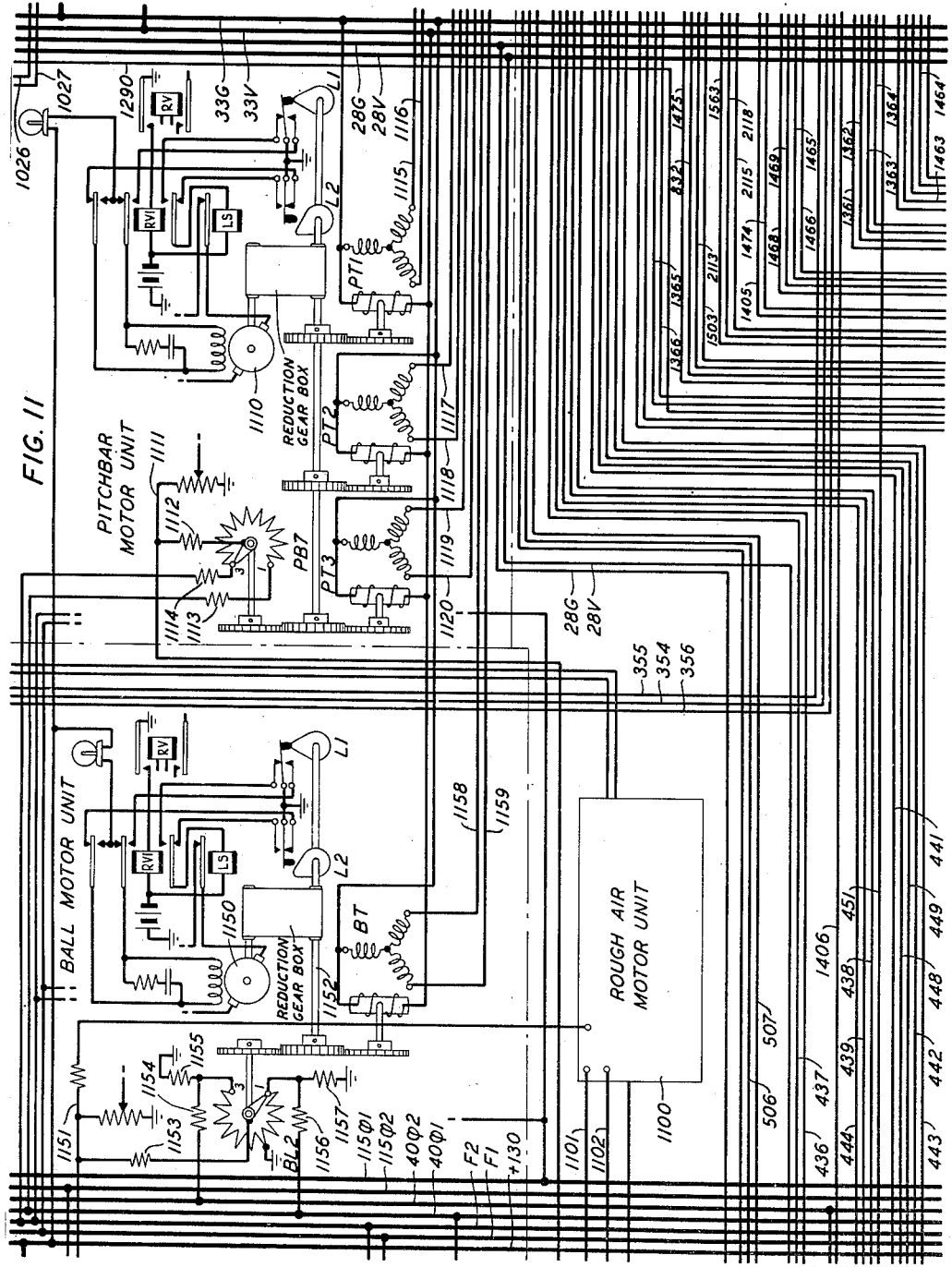
Figure 12:
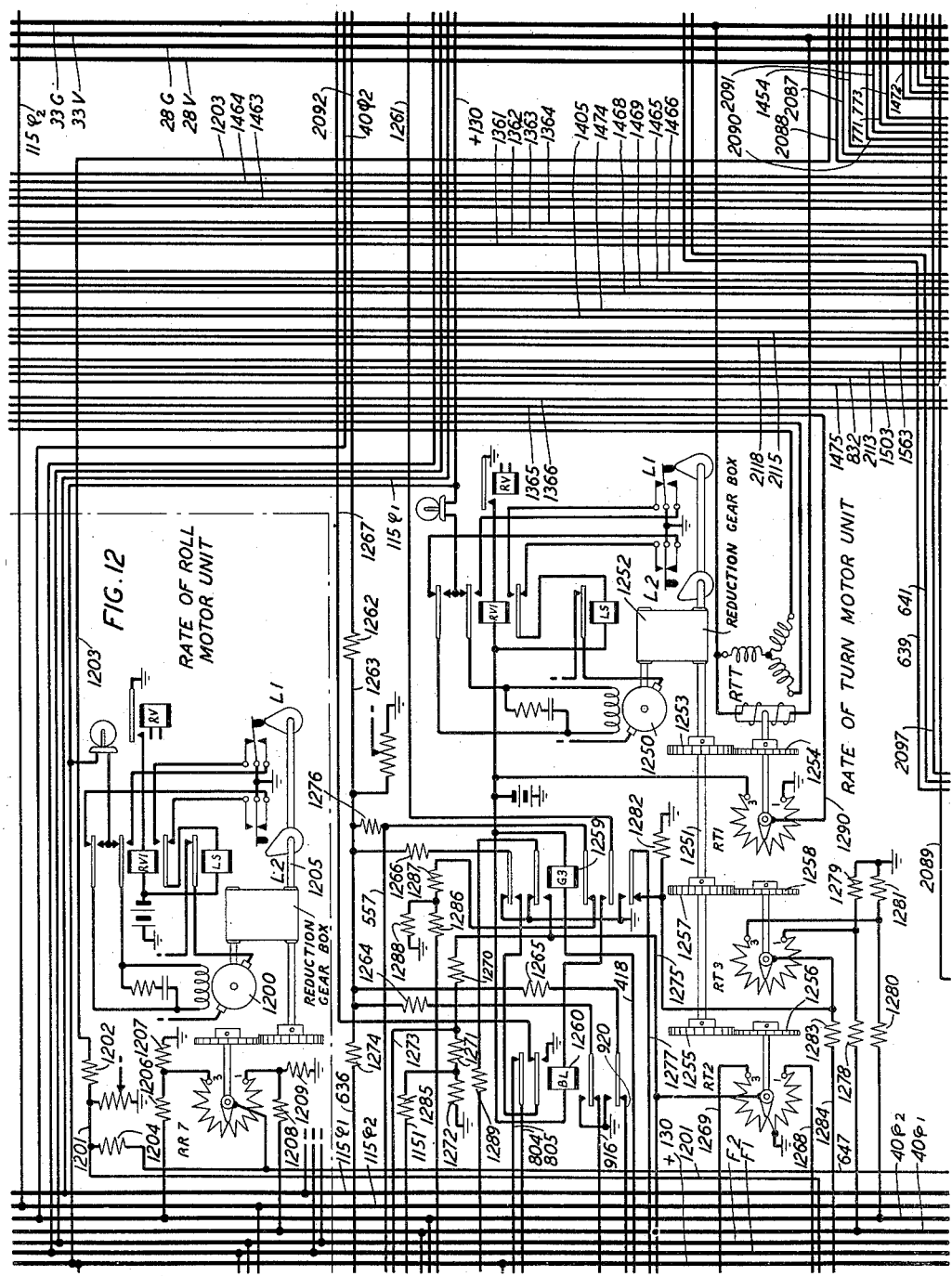
Figure 13:
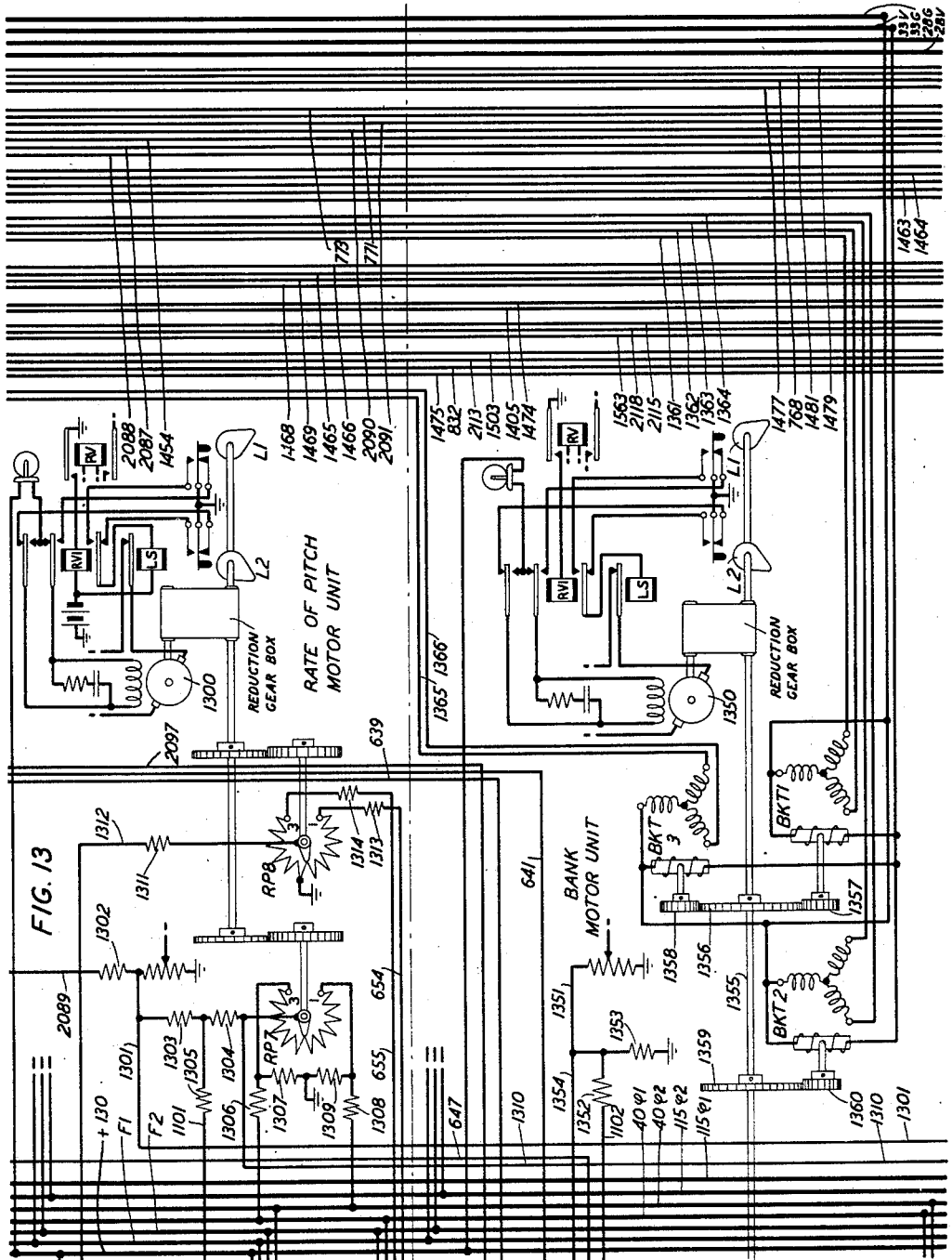
Figure 14:
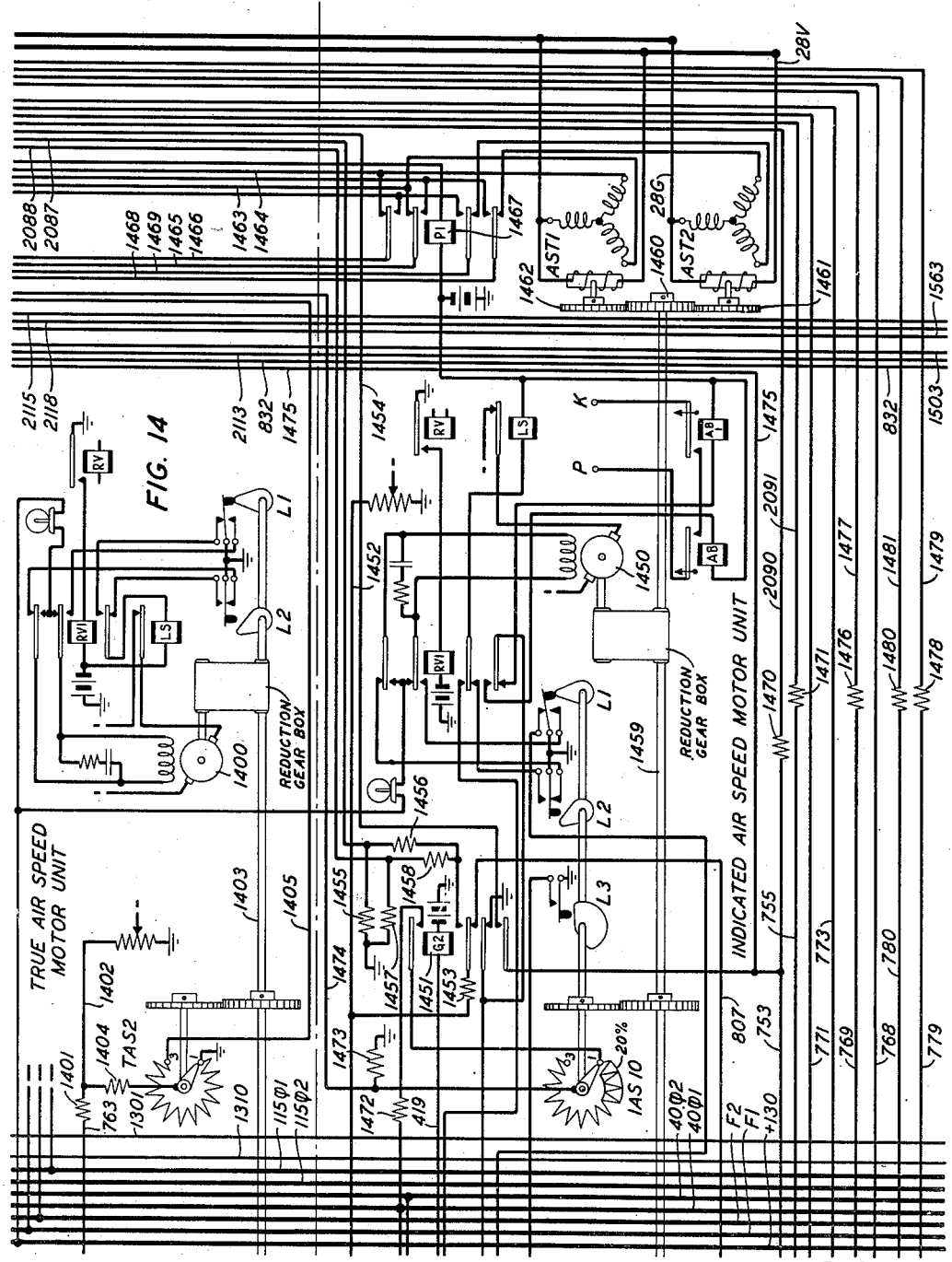
Figure 15:
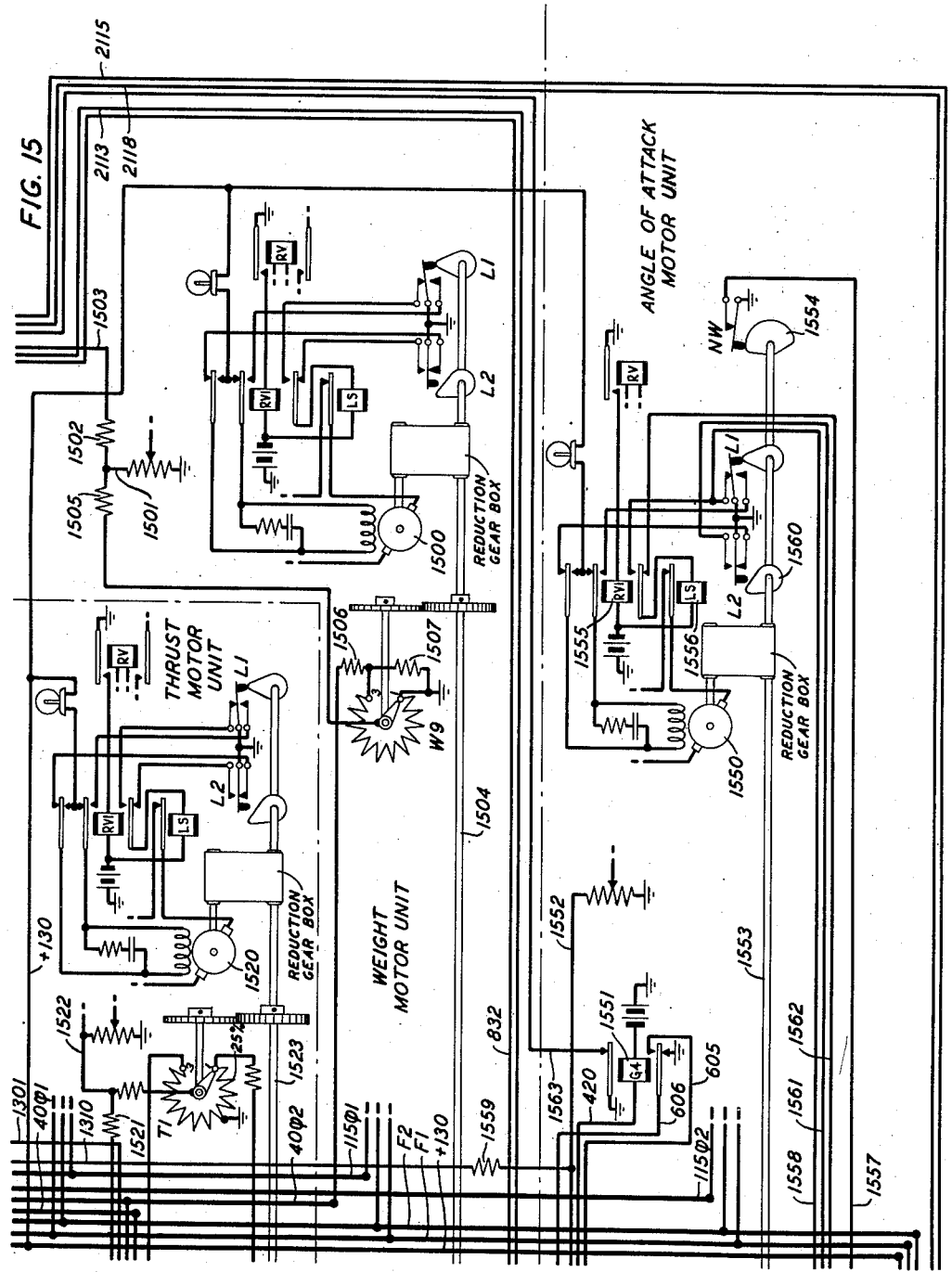
Figure 21:
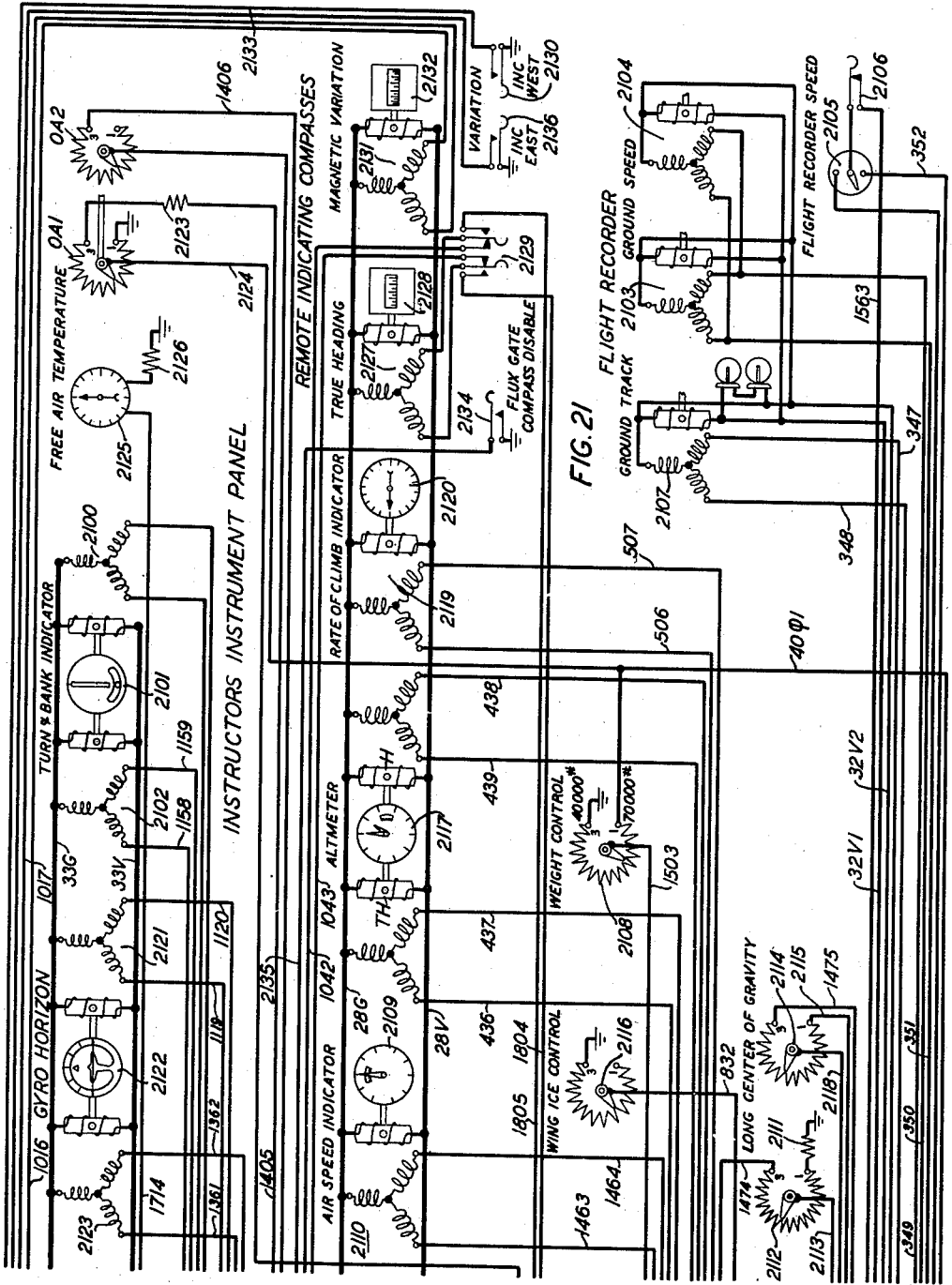
Fig. 21 shows schematically instruments with their operating synchro-receivers mounted on instrument panels at the instructor's desk, the flight recorder and other controls.

The features of the trainer by which flight conditions may be simulated having been briefly described, reference may now be had for a more comprehensive understanding of the invention to the following detailed description of the invention when read in connection with the accompanying drawings, in which:

Fig. 1 shows diagrammatically the flight trainer together with the instructor's desk and associated apparatus cabinets;

Fig. 2 shows the ground speed and ground track control amplifiers which control the ground speed and ground track motor units disclosed in Fig. 3;

Fig. 3 shows schematically in the upper portion thereof the ground speed and ground track motor units which control the speed and direction of movement of the flight recorder at the instructor's desk, disclosed schematically in Fig. 21. Fig. 3 also shows in the lower left portion thereof the schematic representation of the static ice motor unit;

Fig. 4 shows a schematic representation of the altimeter motor control circuit and altimeter motor unit;

Fig. 5 shows above the dot-dash line a schematic representation of the indicated rate-of-climb motor control circuit and apparatus of the associated motor unit and below the dot-dash line a schematic representation of the yaw motor control circuit and apparatus of the associated motor unit;

Fig. 6 shows above the dot-dash line a schematic representation of the true rate-of-climb motor control circuit and apparatus of the associated motor unit and below the dot-dash line a schematic representation of apparatus of the bank motor unit;

Fig. 7 shows above the dot-dash line a schematic representation of apparatus of the true airspeed motor unit and below the dot-dash line a schematic representation of apparatus of the indicated airspeed motor unit;

Fig. 8 shows above the upper dot-dash line a schematic representation of apparatus of the thrust motor unit, in the central portion of the figure the schematic representation of apparatus of the weight motor unit, and below the lower dot-dash line a schematic representation of apparatus of the angle of attack motor unit;

Fig. 9 shows above the upper dot-dash line a schematic representation of the wing flaps motor unit, in the left center portion a schematic representation of the engine cowl flaps motor unit, in the right center portion a schematic representation of the landing gear motor unit, and below the lower dot-dash line schematic representations of the brake horsepower units for the four simulated engines;

Fig. 10 shows a schematic representation of the compass motor control circuit and apparatus of the associated motor unit;

Fig. 11 shows in the upper right portion thereof a schematic representation of the pitch bar motor control circuit and apparatus of the associated motor unit and in the upper left portion thereof a schematic representation of the ball motor control circuit and apparatus of the associated motor unit. Fig. 11 also shows a box in the lower left corner thereof representing a rough air motor unit controlled from the instructor's desk, Fig. 17, for simulating the effects of rough air;

Fig. 12 shows above the dot-dash line a schematic representation of the rate of roll motor control circuit and apparatus of the associated motor unit and below the dot-dash line a schematic representation of the rate-of-turn motor control circuit and apparatus of the associated motor unit;

Fig. 13 shows above the dot-dash line a schematic representation of the rate-of-pitch motor control circuit and apparatus of the associated motor unit and below the dot-dash line a schematic representation of the bank motor control circuit and apparatus of the associated motor unit;

Fig. 14 shows above the dot-dash line a schematic representation of the true airspeed motor control circuit and apparatus of the associated motor unit and below the dot-dash line a schematic representation of the indicated airspeed waves of the signal regardless of the phase of the signal with respect to the phase of the potential applied to the plate of tube MI, the tube MI will cause the transmission of an impulse through the rotor circuit of motor 400 each time the tube MI fires on each positive half wave of the plate potential and the motor will rotate in one direction. In response to an input signal which is out of phase with the potential applied to the plate of tube MR, tube MR will not conduct and consequently relays 409 and 411 will not operate but, since tube MI will fire on each positive half wave of the potential applied to its plate, the motor 400 will be operated in response to the incoming signal in the reverse direction.

Figure 16:
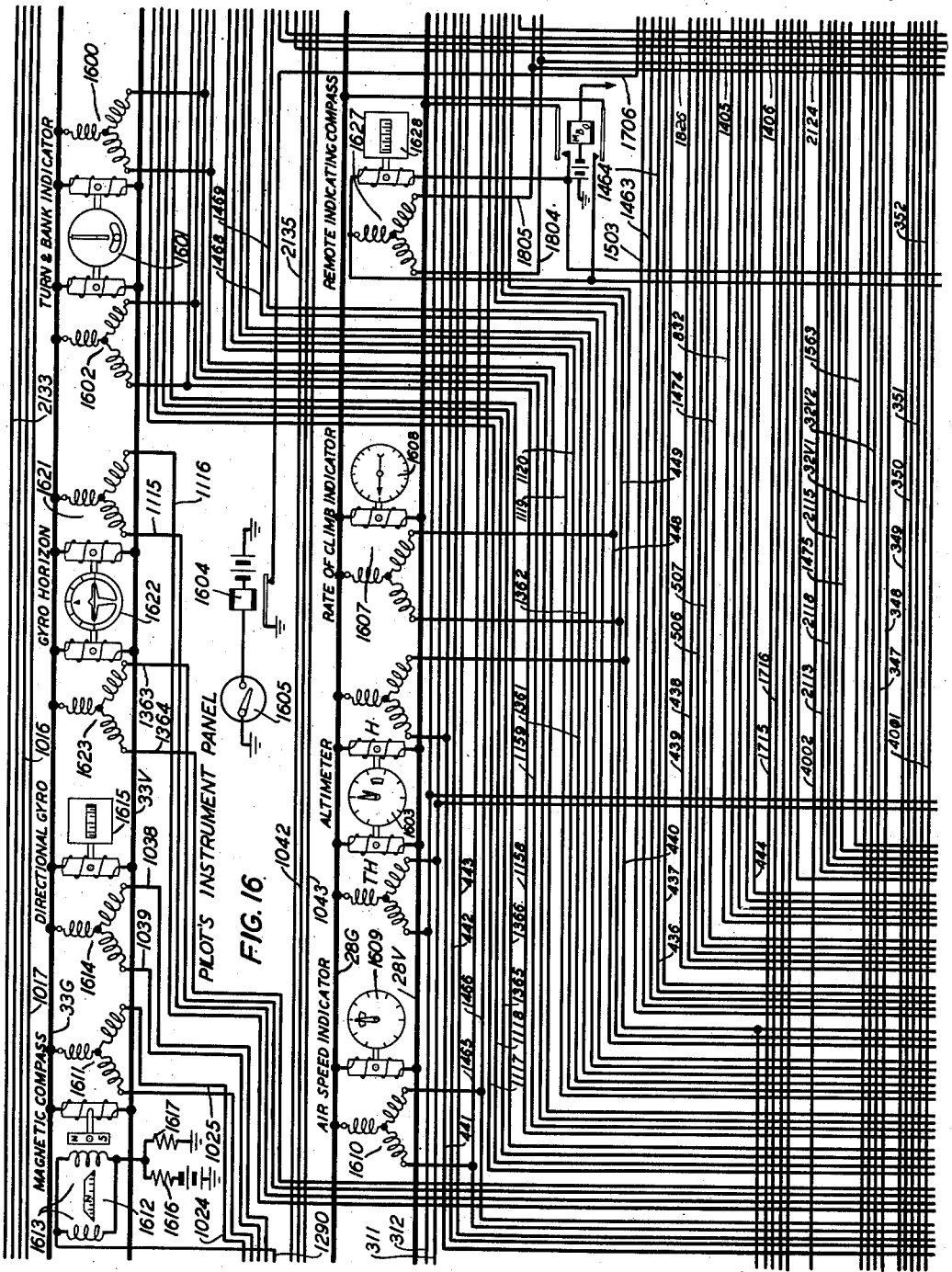

Potentiometers and variacs of a motor unit may enter into the control of several other motor control circuits of the trainer. For example, the motor 1250 of rate-of-turn motor unit of Fig. 12 rotates shaft 1251 through the reduction gear box 1252, which shaft through gears 1253 and 1254 rotates the slider of potentiometer RT1 and the rotor of synchro-transmitter RTT, through gears 1255 and 1256 rotates the slider of potentiometer RT2 and through gears 1257 and 1258 rotates the slider of potentiometer RT3. Potentiometer RT2 enters into the control of the altimeter motor control circuit of Fig. 4 and potentiometer RT3 enters into the control of the compass motor control circuit of Fig. 10 and into the control of the rate-of-yaw motor control circuit of Fig. 5. The potentiometer RT1 enters into the control of the magnetic compass on the pilot's instrument panel, Fig. 16. The synchro-transmitter RTT is effective to control the synchro-receivers 1600, 1700 and 2100 which drive the rate-of-turn pointers of the turn and bank instruments 1601, 1701 and 2101 on the pilot's, copilot's and instructor's instrument panels.

The motor control circuits shown schematically in figures such as Fig. 12, are similar to the altimeter motor control circuit of Fig. 4 but to avoid unnecessarily increasing the disclosure have been abbreviated to show only the input circuits to the first amplifier tubes thereof, to show the RV, RV1 and LS relays which control the circuits of the motors and to show the motors, reduction gear boxes and limit switches. Such abbreviated motor control circuits are disclosed in Figs. 5, 6, 9, 10, 11, 12, 13, 14 and 15.

Figure 19:
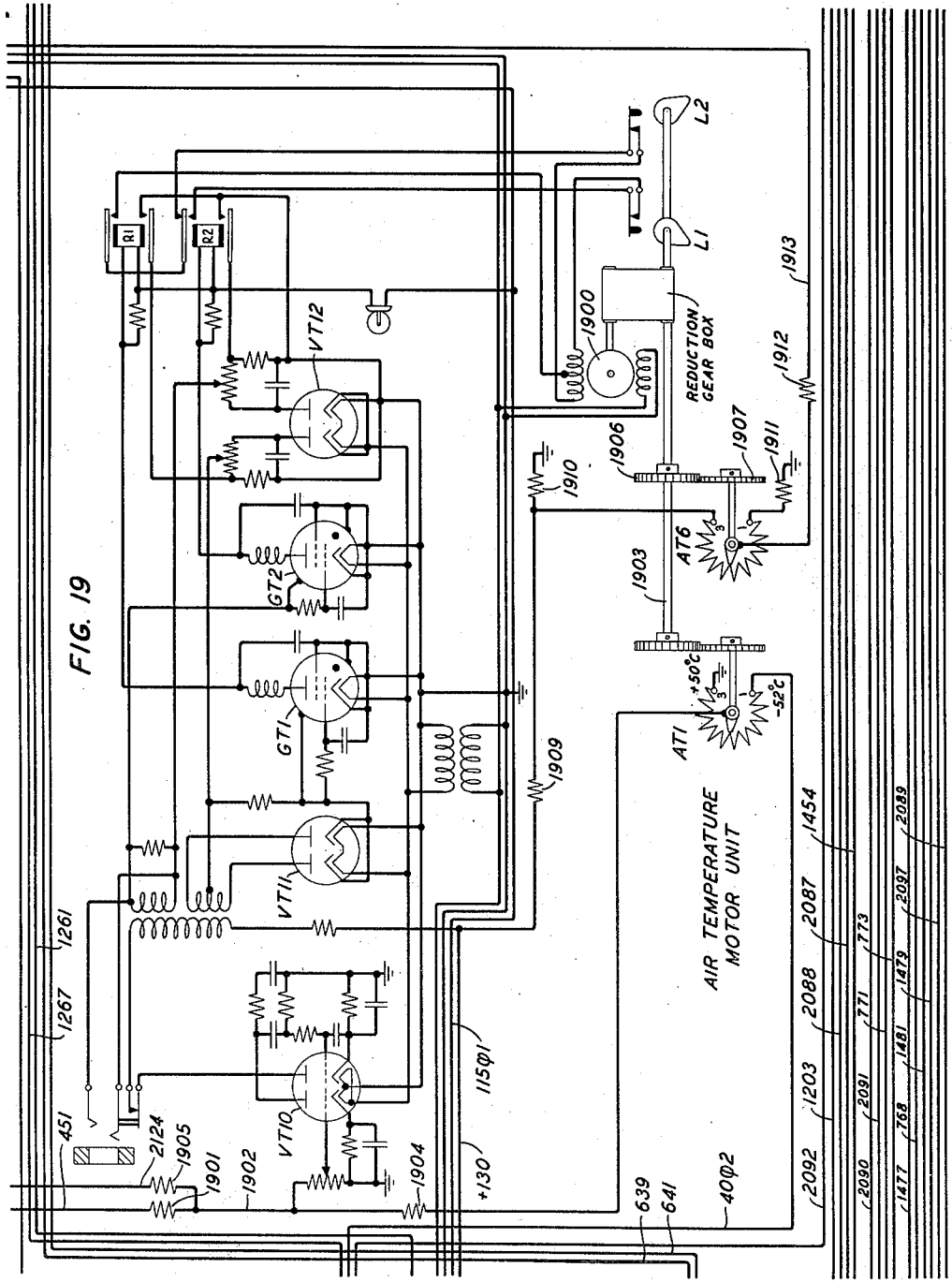
Fig. 19 shows the air temperature motor control circuit and apparatus of the associated motor unit.

The motors of the wing flaps, landing gear and cowl flaps motor units of Fig. 9 and the motor of the air temperature motor unit of Fig. 19 are of the reversible alternating current shaded pole type having a main stator winding and shaded pole windings. A motor of this type is caused to rotate in one direction by energizing the stator winding and short-circuiting one of the shaded pole windings and to rotate in the opposite direction by energizing the stator winding and short-circuiting the other shaded pole winding. The wing flaps and landing gear motor units are more fully disclosed in Patent 2,516,803 to R. O. Rippere of July 25, 1950.

The instruments on the pilot's, copilot's, bombardier's, navigator's and instructor's instrument panels illustrated in Figs. 16, 17, 18 and 21 are identical in appearance to the instruments which would be found on the corresponding instrument panels of an actual airplane but are driven by synchro-receivers associated therewith as, for example, the turn indicators of the turn and bank instruments 1601, 1701 and 2101 which are driven, as previously described by the associated synchro-receivers 1600, 1700 and 2100. Some of the instruments, such as for example the gyro or artificial horizon have two driving synchro-receivers associated therewith. In the case of the gyro horizon instrument one of the receivers is operable from the bank motor control unit to tip the artificial horizon bar and to operate a pointer to indicate the angle of bank simulated in the flight being conducted in the trainer and the other receiver being operable from the pitch bar motor unit to raise or lower the horizon bar to indicate whether a level, diving or climbing flight is being simulated. An instrument of this type is fully described in Patent 2,381,872 granted August 14, 1945, to C. I. Baker.

The flight recorder motor control circuits of Fig. 2 in conjunction with the motor units of Fig. 3 control the flight recorder on the instructor's desk schematically disclosed in Fig. 1. The speed at which the flight recorder is advanced over a map to record the actual ground speed of the simulated flight is under the control of the ground speed motor control circuit shown in the upper portion of Fig. 2 and the motor GS1 disclosed in the left portion of Fig. 3. The motor GS1 through the reduction gear box 300, gears 301 and 302, and gears 303 and 304 drives the ground speed synchro-transmitters GS4 and GS27 which may be electrically associated with the synchro-receivers 2103 and 2104 geared to the driving wheels of the flight recorder. By the operation of the GS4 relay 305 or the GS27 relay 306, under the control of switch 2105 and key 2106 at the instructor's desk, the flight recorder may be operated over a terrain map under the control of transmitter GS4 at a speed representative of four nautical miles per inch, or under the control of transmitter GS27 at a speed representative of twenty-seven nautical miles per inch.

The orientation of the flight recorder to record the direction of the simulated flight course is under the control of the ground track motor control circuit disclosed in the lower portion of Fig. 2 and the motor GT disclosed in Fig. 3 which motor, through the reduction gears 307, 308, 309 and 310, drives the synchro-transmitter GTST electrically connected with the synchro-receiver 2107 geared to the spindle of the steering wheel of the flight recorder. In general, the flight recorder is controlled in the manner fully disclosed in Patent 2,486,784 to W. H. T. Holden of November 1, 1949.

The rough air unit represented by the box 1100 of Fig. 11 is of the type fully disclosed in Patent 2,460,743 to C. E. Germanton of February 1, 1949.

The control columns 2000 and 2050, rudder pedals 2001, 2002 and 2051, 2052, and brake pedals 2003, 2004 and 2053, 2054 at the pilot's and copilot's stations are schematically illustrative of the similar controls of an actual airplane. The control column 2000 comprises a slidable and rotatable sleeve 2005 to the forward end of which the aileron control wheel 2006 is secured. The sleeve carries an arm 2007 which is longitudinally movable with the sleeve but does not partake of its rotation the end of which arm is secured to the sprocket chain 2008 which extends over idler sprocket wheels 2009, 2010, 2011 and over sprocket wheel 2012 secured to shaft 2024. The shaft through sprocket chain 2025 drives counter shaft 2026 which in turn through the sprocket chain 2027 drives the slider of elevator potentiometer EL. Loading may be applied from the elevator loading unit 2028 through sprocket chain 2029 to shaft 2026 and thence through sprocket chain 2025, shaft 2024 and sprocket chain 2008 to resist the sliding movement of the control 2000. The sleeve 2055 of control column 2050 at the copilot's station is similarly connected through arm 2057 and sprocket chain 2058 with shaft 2024 and in the manner described with potentiometer EL and elevator loading unit 2028. Thus when either control column is given a sliding movement, the slider of potentiometer EL is rotated toward the "up" end of its winding if the column is pulled out or toward the "down" end of its winding if the column is pushed in.

The rotation of the column 2000 by the aileron wheel 2006 is imparted to the square shaft 2013 which is capable of rotating with the sleeve 2005 but does not partake of the longitudinal movement of the sleeve. The shaft 2013 through the sprocket wheel 2014 is connected by sprocket chain 2015 with the sprocket wheel 2064 attached to shaft 2063 associated with the column 2050 at the copilot's station so that rotation of the aileron wheel 2006 at the pilot's station or the rotation of the aileron wheel 2056 at the copilot's station will cause the rotation of sprocket wheel 2030 which is connected by sprocket chain 2031 extending over idler sprocket wheels 2032, 2033, 2034 and 2035 with sprocket wheel 2036 mounted on shaft 2037. The shaft 2037 through the sprocket chain 2038 drives the countershaft 2039 which, in turn, through the sprocket chain 2040, drives the slider of the aileron potentiometer AL. Thus the rotation of either aileron wheel 2006 or 2056 will result in the movement of the slider of potentiometer AL from its normal position at the center tap of its winding toward the No. 1 or No. 3 terminal of the winding dependent upon the direction of rotation of the aileron wheel for right or left wing down. Aileron loading may be applied from the aileron loading unit 2041 through the sprocket chain 2042 to countershaft 2039 and thence through the linkage previously described to the aileron wheels 2006 and 2056.

At the pilot's station the right rudder pedal 2002 is connected to sprocket chain 2016 which extends over idler sprocket wheel 2017 and sprocket wheel 2018 mounted on shaft 2043. The left rudder pedal 2001 is connected to sprocket chain 2019 which extends over idler sprocket wheel 2020 and sprocket wheel 2021 mounted on shaft 2043. It will be noted that the pedal 2001 is connected to the upper reach of chain 2016 whereas the pedal 2002 is connected to the lower reach of chain 2019 so that pressure upon the pedal 2001 will cause the rotation of shaft 2043 in one direction whereas pressure upon pedal 2002 will cause the reverse rotation of shaft 2043. The rudder pedals at the copilot's station are similarly linked to the shaft 2043 through the chains 2066 and 2069 extending over sprocket wheels 2067, 2068, 2070 and 2071. Shaft 2043 is connected by sprocket chain 2044 with counter-shaft 2045 which in turn drives the sliders of rudder potentiometers RD1 and RD2 through sprocket chain 2046. Thus pressure on right rudder pedals 2001 and 2051 will result in the movement of the sliders of these potentiometers toward the No. 1 terminals of their windings representative of right rudder, or pressure on left rudder pedals 2002 and 2052 will result in the movement of the sliders of the potentiometers toward the No. 3 terminals of their windings representative of left rudder. Rudder loading may be applied from the rudder loading unit 2047 through the sprocket chain 2048 to counter-shaft 2045 and through the linkage previously described to the rudder pedals 2001, 2002, 2051 and 2052.

Pressure on the right brake pedal 2003 at the pilot's station is communicated through the linkage 2022 to shaft 2074 and similarly pressure on the right foot brake pedal 2053 at the copilot's station is communicated through the linkage 2072 to shaft 2074 which, through the gears 2075, 2076 and 2077, operates the sliders of the right brake potentiometers RB1 and RB2 and rotates the switch operating cams 2078 and 2079. Pressure on the left foot brake pedal 2004 at the pilot's station is communicated through the linkage 2023 to the shaft 2080 and, similarly, pressure on the left foot brake pedal 2054 at the copilot's station is communicated through the linkage 2073 to shaft 2080 which, through the gears 2081, 2082 and 2083, operates the sliders of the left brake potentiometers LB1 and LB2 and rotates the switch operating cams 2084 and 2085.

The apparatus employed in embodying the invention having now been briefly described, the procedure followed in making a typical flight will now be discussed. Preparatory to making a flight the pilot checks all instruments. The gyro-horizon instrument should indicate a nose level zero bank condition; the air speed indicator, climb indicator and altimeter should read zero; the turn and bank indicators should be centered; the wing flaps indicator should show a flaps "up" position; and the air temperature indicator should normally read +15 degrees centigrade. The engine instruments, not shown, would also be checked. The pilot will also check the controls for freedom of motion. The parking brake is at this time set at its "on" position. Starting of the engines may now be simulated in the manner fully described in the Patent 2,506,949 to Burelbach and Lukacs, hereinbefore referred to. As each engine throttle is opened, the manifold pressure as indicated by the manifold pressure indicator increases and the tachometers show an increase of engine speed, until when the throttle is fully open a manifold pressure of 57 inches of mercury and an engine speed of 2800 revolutions per minute will be indicated. As the speeds of the engines increase the brake horsepower motor units for the four engines, shown schematically in Fig. 9, will operate to move the sliders of their potentiometers away from the No. 1 terminals of their windings representative of the production of brake horsepower, and the thrust motor unit of Figs. 8 and 15 will be operated in a manner representative of the thrust developed by the four engine driven propellers, thus moving the sliders of potentiometers T1, T2, T3 and T5 away from the No. 1 terminals of their windings.

The grounded condition of the airplane is simulated in the trainer by the operated condition of the G relay 412 of Fig. 4 the circuit of which is established over the normal contacts of the L3 limit switch closed by cam 413 and the normal contacts of the L1 limit switch closed by cam 414 of the altimeter motor unit of Fig. 4, which switches are both operated to their alternate positions when the altitude of the simulated flight is zero. The contacts of switch L1 close to their alternate positions as the altitude decreases between 600 and 100 feet and the contacts of the microswitch L3 close to their alternate positions when the altitude becomes zero. Relay 412, upon operating, establishes a circuit from ground over the lower normal contacts of the RG relay 415, over the lower No. 4 contacts of relay 412 and conductor 416, thence through the winding of the G5 relay 601 of Fig. 6 to battery; a circuit from ground over the lower normal contacts of relay 415, over the lower No. 3 contacts of relay 412 and conductor 417 and thence through the winding of the G1 relay 800 of the angle of attack motor unit of Fig. 8 to battery; a circuit over the lower contacts of relay 415, over the lower No. 2 contacts of relay 412 and conductor 418 through the winding of the G3 relay 1259 of the rate of turn motor unit of Fig. 12 to battery; a circuit over the lower contacts of relay 415, the lower No. 1 contacts of relay 412 and conductor 419 through the winding of the G2 relay 1451 of the indicated airspeed motor unit of Fig. 14 to battery and a circuit over the lower contacts of relay 415, over the upper No. 2 contacts of relay 412, conductor 420 and through the winding of the G4 relay 1551 of the angle of attack motor unit of Fig. 15 to battery.

For a simulated flight, the weight of the airplane and its load will be assumed to be 60,000 pounds. This is represented in the trainer by the control of the weight motor unit of Fig. 15 by the instructor. To accomplish this the instructor adjusts the weight control rheostat 2108, the winding of which is energized from the $40\varphi 1$ bus-bar, to a position representative of the weight of 60,000 pounds. Phase $\varphi 1$ potential will thereby be impressed from the slider of rheostat 2108, over conductor 1503 and through resistor 1502 to the signal input conductor 1501 of the weight motor control circuit which functions in the manner previously described in connection with the altimeter motor circuit of Fig. 4 to cause the motor 1500 thereof to rotate the shaft 1504 and the sliders of the potentiometers W7, W8, W9, and W11 driven thereby into positions representative of the assumed weight of 60,000 pounds. When the slider of balancing potentiometer W9 has been moved toward the No. 3 terminal of its winding to a position representative of this weight, the potential of phase $\varphi 2$ derived at its slider and applied through resistor 1505 to the signal input conductor 1501 will balance the phase $\varphi 1$ potential applied through resistor 1502 to conductor 1501 and the motor 1500 will stop. To derive the phase $\varphi 2$ balancing potential, potential is applied from the $40\varphi 2$ bus-bar through resistor 1506 and thence in parallel through resistor 1507 and through the winding of potentiometer W9 to ground.

For take-off the wing flaps should be half down (20 degrees) and therefore the motor 900 of the wing flaps motor unit, Fig. 9, is controlled by the pilot in the manner fully disclosed in my application Serial No. 676,603 hereinbefore referred to and rotates the sliders of potentiometers WF2, WF3, WF4 and WF5 driven from shaft 901 to positions approximately midway of their windings. The pilot also operates the cowl flaps control (not shown) to cause the motor of the cowl flaps motor unit of each engine to operate the shaft of such unit into a position representative of a one-quarter opening of the engine cowl flaps. For example, the motor 920 of the cowl flaps motor unit for the No. 2 engine, disclosed in Fig. 9, rotates shaft 921 and the slider of the potentiometer CF2 driven thereby one-quarter of the distance toward the No. 3 terminal of its winding.

With the foot brakes locked, no airspeed is developed as would be indicated by the airspeed indicators 1609, 1709, 1712, 1809 and 2109 on the pilot's, copilot's, bombardier's, navigator's and instructor's instrument panels even with the thrust developed due to open engine throttles. The airspeed indicators are controlled from the indicated airspeed motor unit disclosed in Figs. 7 and 14. This motor unit is controlled by signal potentials representing forces along the line of flight. During flight, potentials representing thrust, drag and the components of weight along the line of flight when climbing or diving are connected to the signal input conductor 1452. The sum of these potentials represents accelerating force. Since the motor 1450 runs at a speed proportional to the potential applied to conductor 1452, the rate of movement of the airspeed indicators is proportional to the accelerating force. The drag force is a function of airspeed, yaw, angle of attack, landing gear position and wing flaps position so that increasing any of these increases the drag potential thus reducing forward acceleration, fully stabilizing when the equation is satisfied.

The force equation as represented by the indicated airspeed is:

Thrust—drag—weight×(sine of angle of climb) =accelerating force. Since no angle of climb circuit is provided the relative magnitude of the weight term is represented by the equivalent term: Weight×rate of climb÷true airspeed.

The circuit connected to input signal conductor 1452, through resistor 801, from the slider of thrust potentiometer T5, Fig. 8, represents the thrust. With the foot brakes locked, this thrust potential is zero because the BL relay 1260 in the rate of turn motor unit of Fig. 12 will be operated and will open the circuit over which the winding of the thrust potentiometer T5 is energized, which circuit extends from the junction point between resistors 802 and 803 of the potential divider connected from the $40\varphi 2$ bus-bar through such resistors to ground, over conductor 804, over the upper back contact of the BL relay 1260, over conductor 805 and through the upper 75 per cent of the winding of potentiometer T5 to ground. Relay 1260 is held operated so long as the brakes are locked, over a circuit which may be traced from ground over the alternate contacts of the L switch closed by cam 2078 when the right foot brake is locked, over the alternate contacts of the L switch closed by the cam 2084 when the left foot brake is locked, over conductor 1261, over the middle lower front contact of the G3 relay 1259 and through the winding of relay 1260 to battery. As soon, however, as the foot brakes are unlocked relay 1260 releases, the upper portion of the winding of thrust potentiometer T5 becomes energized and potential of phase $\varphi 2$ becomes applied to signal input conductor 1452 of the indicated airspeed motor control circuit.

The drag force opposing acceleration consists of the normal straight flight drag plus a component introduced by the effects of yaw. The straight flight drag is equal to $K \times$ (indicated airspeed)$^2 \times C_D$, where K represents one-half the product of sea level air density and the wing area of the airplane, and $C_D$ is the coefficient of drag which is the sum of the parasite drag coefficient the drag coefficient due to deflection of wing flaps and landing gear, and the induced drag coefficient due to the angle of attack of the wings. The circuit connected to input signal conductor 1452 through resistor 902 represents the parasite and wing flaps drag, while the circuit connected to input signal conductor 1452 through resistor 806 represents the induced drag due to the angle of attack. The drag effects of yaw and landing gear are simulated by the circuits connected from the slider of the yaw potentiometer Y4 of Fig. 5 through resistor 551 to signal input conductor 1452. The weight component during flight is simulated by the circuit connected from the slider of the weight potentiometer W8 of Fig. 8 over conductor 807, over the inner lower back contact of the G2 relay 1451 associated with the indicated airspeed motor unit, and thence through resistor 1453 to conductor 1452.

As previously stated the drag imposed by the wing flaps is represented by a potential impressed on conductor 1452 through resistor 806. This potential varies as the square of the indicated airspeed and is of phase $\varphi 1$. To derive this potential from the $40\varphi 1$ bus-bar is impressed across the winding of the indicated airspeed variac IAS7 of Fig. 7 and potential derived at the slider of such variac is impressed over the inner lower back contact of the ASN relay 750 which releases as soon as airspeed is developed, and thence through the winding of indicated airspeed variac IAS8 to ground. The phase $\varphi 1$ potential derived at the slider of variac IAS8 which thus varies as the square of the airspeed, is then impressed over conductor 751, through the winding of the wing flaps potentiometer WF2 of Fig. 9, over conductor 903, through resistor 898 and to ground over the lower back contact of the S (stall relay) 809. The potential then derived at the slider of potentiometer WF2 is applied through resistor 902 to signal input conductor 1452. With the wing flaps half down, as has been assumed, this potential will impose a considerable amount of drag which will increase as the airspeed increases.

A second drag is imposed by the wings. To derive a potential representative of this drag, the potential derived at the slider of indicated airspeed variac IAS8 is supplied over conductor 751 through the winding of the angle of attack potentiometer AA1 of Fig. 8 to ground whereby a phase $\varphi 1$ potential derived at the slider of the latter potentiometer is applied through resistor 810, through the winding of angle of attack potentiometer AA2 to ground. The potential then derived at the slider of the latter potentiometer is applied through resistor 806 to signal input conductor 1452. With the airplane on the ground and the nose wheel of the landing gear still on the ground, the sliders of the angle of attack potentiometers will be positioned at the center positions of the angle of attack potentiometer windings as will be later explained and, consequently, the phase $\varphi 1$ drag potential applied through resistor 806 to conductor 1452 will be a function of the coefficient of drag of the wings as determined by the position of the sliders of potentiometers AA1 and AA2 and will increase in accordance with the increase of airspeed.

The drag due to the landing gear being down is represented as previously stated by a potential applied to conductor 1452 through resistor 551. To derive this potential, the phase $\varphi 1$ potential derived at the slider of the indicated airspeed variac IAS8 is applied over conductor 751 through resistor 552, through the two halves of the winding of yaw potentiometer Y4 of Fig. 5 to the center tap of such potentiometer winding, over conductor 553, through resistor 811 and in parallel with resistor 811 over the back contact of the MGD relay 904 which, with the main landing gear down, will be released, thence through landing gear potentiometer LG7, the slider of which will be at the No. 3 terminal of its winding, conductor 995, and thence to ground at the lower back contact of the S relay 809. The potential derived at the slider of the yaw potentiometer Y4 is then applied through resistor 551 to conductor 1452. This potential will thus vary as the square of the indicated airspeed and is a function of the position of the landing gear. With the movement of the simulated flight straight ahead and the slider of yaw potentiometer Y4 at the center tap winding there will be no component of yaw imposed on this derived drag potential.

A further slight drag potential will also be applied to conductor 1452 which is representative of the frictional resistance of the landing gear and the resistance due to the rolling of the landing gear wheels over the ground. To derive this potential phase $\varphi 1$ potential from the bus-bar $40\varphi 1$ is applied through resistor 752 and in parallel therewith through the upper portion of the winding of the indicated airspeed variac IAS7 and the potential thus resulting which will vary with the indicated airspeed is applied over conductor 753, over the lower front contact of the G3 relay 1451 which remains operated as long as the simulated flight is grounded, over conductor 1454, through the winding of the left brake potentiometer LB1 and in parallel through the winding of the right brake potentiometer winding RB1, and through the 100-ohm resistor 2086 to ground. Potential derived at the slider of potentiometer LB1 is then applied over conductor 2087 to ground through resistor 1455 and through resistor 1456 and over the inner lower front contact of the G2 relay 1451 through resistor 1453 to signal input conductor 1452, and potential derived at the slider of potentiometer RB1 is then applied over conductor 2088 to ground and through resistor 1457 and through resistor 1458, over the inner lower front contact of the G2 relay 1451 through resistor 1453 to signal input conductor 1452. With the foot brakes both unlocked for take-off the sliders of brake potentiometers LB1 and LB2 should both be at the No. 1 terminals of their windings so that the drag potential applied to conductor 1452 over the circuit just traced will be relatively small.

The phase $\varphi 2$ thrust potential and the phase $\varphi 1$ drag potentials derived as just described are added at signal input conductor 1452 resulting in a predominating potential of phase $\varphi 2$ which causes the motor 1450 of the indicated airspeed motor unit to drive the sliders of the potentiometers and variacs thereof in a direction representative of an increasing airspeed. The effect of acceleration is introduced by means of the gearing which connects the motor 1450 to shaft 1459 from which the variacs and potentiometers are driven.

The shaft 1459 also drives through gears 1460, 1461 and 1462 the rotors of synchro-transmitters AST1 and AST2 which rotors are energized from the 28-volt, 400-cycle source of current schematically indicated in Fig. 10, over the 28V and 28G bus-bars. The stator windings of transmitter AST1 are connected over bus-bar 28G and over conductors 1263 and 1264 to the stator windings of the synchro-receiver 2110 which drives the air speed indicator 2109 at the instructor's desk. The stator windings of transmitter AST1 are also connected over bus-bar 28G and over the upper back contacts of the $\varphi 1$ relay 1451, and conductors 1465 and 1466 with the stator windings of the synchro-receiver 1610 which drives the airspeed indicator 1609 at the pilot's station and with the stator windings of the synchro-receiver 1710 which drives the airspeed indicator 1709 at the copilot's station. The stator windings of the transmitter AST2 are connected over bus-bar 26G and over the lower back contacts of relay 1467 and conductors 1468 and 1469 with the stator windings of the synchro-receiver 1810 which drives the airspeed indicator at the navigator's station and with the stator windings of the synchro-receiver 1711 which drives the airspeed indicator 1712 at the bombardier's station. These air speed indicators will now show the accelerating airspeed of the simulated movement of the flight along the ground.

When an indicated airspeed of about 80 knots is attained the pilot will pull backward on the control wheel 2006 about 4 inches resulting in a movement of the slider of elevator potentiometer EL from its normal position below the center tap point toward the upper terminal of its winding representative of the changing of the attitude of the airplane for take-off, or change in the rate of pitch. The rate of pitch is simulated in the trainer by the rate-of-pitch motor control circuit and motor unit shown in the upper portion of Fig. 13. This motor unit is controlled by potentials representing a performance equation based on the major moments tending to make the airplane pitch or turn about its lateral axis through the wings.

In flight these moments are: Wing moment+ tail moment—moment due to rate of pitch= pitch accelerating moment.

The relative magnitude of the moments in the above equation may be represented by potentials which are dependent on indicated airspeed, angle of attack, wing flaps position, longitudinal center of gravity, position of the elevator as determined by the movement of the control, rate of pitch and rough air. The wing and tail moments are directly proportional to the square of the indicated airspeed and the moment due to rate of pitch is directly proportional to the true airspeed. In the trainer the true airspeed and indicated airspeed are assumed to be equal in so far as rate of pitch is concerned and thus by dividing through by indicated airspeed a simplified circuit is obtained in which the wing and tail moments are represented by potentials directly proportional to indicated airspeed, while the airspeed part of the rate-of-pitch moment is eliminated.

By representing the coefficient of lift by an equivalent angle of attack function, the circuit connected to the signal input conductor 1301 through resistor 824 from the slider of angle of attack potentiometer AA8 represents the wing moment and that part of the tail moment produced by the stabilizer. The circuit connected to conductor 1301 from the slider of the elevator potentiometer EL, over conductor 2089, through resistor 1302 represents that part of the tail moment produced by the elevator action. In order to give improved control near the neutral position of the elevator a grounded center tap potentiometer EL is used. Because each half of the potentiometer represents unequal movement of the elevator (−30 degrees "up" and +20 degrees "down") a correction factor represented by the circuit connected to conductor 1301 through resistor 906 from the slider of the wing flaps potentiometer WF5 is introduced. The effect of wing flaps is represented by the circuit connected from the slider of the wing flaps potentiometer WF4 through resistor 907 to conductor 1201. The circuit connected to conductor 1301 through resistors 1303 and 1304 from the rate of pitch potentiometer RP7 represents the pitching moment due to the rate of pitch. Under the control of the instructor random potentials representing rough air may be applied from the rough air circuit 1100 of Fig. 11, over conductor 1101 and through resistors 1305 and 1303 to signal input conductor 1301.

With a grounded condition of flight simulated and no airspeed, the only potential applied to conductor 1301 will be that applied through resistor 812 representative of the weight of the airplane. This potential will be of phase $\varphi1$ and will cause the motor 1300 of the rate-of-pitch motor unit of Fig. 13 to rotate the sliders of potentiometers RP7 and RP8 nearly to the No. 1 terminals of their windings or until the phase $\varphi2$ potential derived at the slider of balancing potentiometer RP7 and applied to conductor 1301 through resistors 1304 and 1303 balances the phase $\varphi1$ potential. The No. 3 terminal of potentiometer RP7 is connected to the junction point between resistors 1306 and 1307 of the potential divider connected from the $40\varphi1$ bus-bar through such resistors to ground and the No. 1 terminal of the potentiometer is connected to the junction point between resistors 1308 and 1309 of the potential divider connected from the $40\varphi2$ bus-bar through such resistors to ground. The movement of the sliders of potentiometers RP7 and RP8 will now be representative of a negative value of rate of pitch due to the weight of the plane which is holding the nose of the plane down.

To determine the phase $\varphi1$ potential applied through resistor 812 to conductor 1301, potential from the $40\varphi1$ bus-bar is applied through resistor 1472, over the upper contacts of the G2 relay 1451, through the indicated airspeed potentiometer IAS10, and through resistor 1473 to ground, the potential derived between the potentiometer winding and resistor 1473 being applied over conductor 1474, through the winding of longitudinal center of gravity rheostat 2112 at the instructor's desk, and through resistor 2111 to ground. The potential derived at the slider of rheostat 2112 is then applied over conductor 2113 and through the winding of weight potentiometer W7 of Fig. 8 and resistor 836 to ground. Through the adjustment of the latter potentiometer, as previously described in accordance with the assumed weight of the airplane with its load, the potential applied to the winding of such potentiometer is modified and applied from the slider thereof through resistor 812 to conductor 1301.

When the brakes are released and a simulated airspeed is attained, the phase $\varphi1$ potential applied from the slider of potentiometer W7 through resistor 812 to conductor 1301 does not change until an indicated airspeed of approximately 50 knots is attained due to the short-circuited condition of the first 20 per cent of the winding of indicated airspeed potentiometer IAS10. As the airspeed increases above 50 knots the potential derived at the slider of potentiometer IAS10 decreases and as a consequence the potential applied to signal input conductor 1301 through resistor 812 decreases.

With airspeed now developed the lifting moments of the wings and stabilizer are represented by a potential applied to conductor 1301 through resistor 824 as previously stated. To derive this potential, potential of phase $\varphi2$ derived as previously described at the slider of indicated airspeed variac IAS4 is applied over conductor 756, through resistors 813, 814 and 815 in series, through the lower portion of the winding of the angle of attack potentiometer AA8 to ground at the 25 per cent tap of such potentiometer winding. At the same time potential of phase $\varphi 1$ derived as previously described at the slider of the indicated airspeed variac IAS7 is applied over conductor 753, over conductor 1475, through the winding of the longitudinal center of gravity adjusting rheostat 2114 at the instructor's desk, over conductor 2115 and through resistor 816 to ground, and over the lower front contact of the GI relay 800, through resistor 817 and through the upper 75 per cent of the winding of the angle of attack potentiometer AA8 to ground. The upper portion of the winding of potentiometer AA8 is shunted by a circuit through resistor 818, over conductor 819 and through the winding of the wing flaps potentiometer WF4 to ground. Until the GI relay 800 releases phase $\varphi 1$ potential which energizes the upper portion of the winding of potentiometer AA8 will be low because of the low resistance connection to ground through the resistor 816. It has been assumed that the sliders of the potentiometers of the angle of attack motor unit are normally held at about the centers of the potentiometer windings and therefore with the slider of potentiometer AA8 positioned between the ground tap and the No. 3 terminal of the winding, phase $\varphi 1$ potential of a low value is derived at such slider and applied through resistor 824 to conductor 1301, which potential will increase as the airspeed increases.

To insure that the angle of attack motor unit will normally position the sliders of its potentiometers at positions representative of the attitude of the airplane with its nose wheel on the ground prior to the development of airspeed, at which time the GI relay 800 is operated, the potentiometer AA3 is provided. The first half of the winding of this potentiometer is energized by potential of phase $\varphi 1$ applied therethrough from the 40$\varphi 1$ bus-bar through resistor 820. The potential derived at the slider of such potentiometer is applied over the inner lower and inner and middle upper front contacts of the GI relay 800, through resistors 821, 822 and 823 to signal input conductor 1552 of the angle of attack motor control circuit. This phase $\varphi 1$ potential causes such control circuit to operate motor 1550 in a direction to move the sliders of all potentiometers driven from the shaft 1553 until the slider of potentiometer AA3 reaches the grounded center tap position at which time the motor will stop.

It will be recalled that the winding of wing flaps potentiometer WF4 was included in shunt with the upper portion of the winding of angle of attack potentiometer AA8 and was thus energized by the potential of phase $\varphi 1$. A potential is therefore derived at the slider of such potentiometer WF4 which is applied as previously stated through resistor 907 to signal input conductor 1301 representative of the effects of the wing flaps which have been assumed to be halfway down. This phase $\varphi 1$ potential will be small until the GI relay 800 releases when take-off is simulated and will increase as the airspeed increases.

At the same time the winding of wing flaps potentiometer WF5 is connected in parallel over conductors 829 and 830 with resistor 814 which it will be recalled was included in the circuit over which potential of phase $\varphi 2$ was supplied through the lower quarter of the winding of angle of attack potentiometer AA8 and, consequently, potential of phase $\varphi 2$ is applied from the slider of potentiometer WF5 through resistor 906 to signal input conductor 1301.

The potentials thus applied to signal input conductor 1301 through resistors 824, 906, and 907 due to the simulated ground run for take-off, which increase as the airspeed increases and are representative of the lift forces, are added to the phase $\varphi 1$ potential applied to conductor 1301 through resistor 812 representative of the weight of the airplane resisting take-off, and the result is a potential of phase $\varphi 1$ of less value than was applied through resistor 812 before the airspeed was developed, and consequently the phase $\varphi 2$ potential applied to the slider of balancing potentiometer RP7 will be greater than the new value of phase $\varphi 1$ potential and the motor 1300 will therefore be controlled to rotate the sliders of potentiometers RP7 and RP8 away from the No. 1 terminals of their windings representative of a reduction in the negative value of the rate of pitch but not above the electrical centers of the potentiometer windings.

The elevator control is the major factor determining the movement of the sliders of the rate of pitch potentiometers to positions representative of a positive value of rate of pitch necessary for take-off. The potential of phase $\varphi 1$ derived at the slider of the indicated airspeed variac IAS7, as modified by resistor 752 connected from the No. 4 terminal of the variac to the slider of such variac is supplied over conductor 753, through resistor 1470 and over conductor 2090 to the lower or No. 1 terminal of the elevator potentiometer EL and potential of phase $\varphi 2$ derived at the slider of indicated airspeed variac IAS4, as modified by resistor 754 connected from the No. 4 terminal of such variac to the slider of such variac, is applied over conductor 755, through resistor 1471 and over conductor 2091 to the upper or No. 3 terminal of potentiometer EL. Thus as the slider of the potentiometer EL is moved by the elevator control toward the No. 3 terminal of its winding, as previously assumed for take-off, the potential of phase $\varphi 2$ applied therefrom over conductor 2089 and through resistor 1302 to signal input conductor 1301 is reduced. This potential, which increases as the airspeed increases, is now overbalanced by the predominating potential of phase $\varphi 2$ previously applied to conductor 1301 from the slider of wing flaps potentiometer WF5 and from the slider of rate of pitch potentiometer RP7 and as a consequence the motor 1300 of the rate of pitch motor unit will operate in a direction to move the sliders of potentiometers RP7 and RP8 towards the No. 3 terminals of their windings to reduce the potential of phase $\varphi 2$ derived at the slider of potentiometer RP7 and to change such potential to phase $\varphi 1$ as it moves past the electrical center of such potentiometer winding until it balances the predominant phase $\varphi 2$ signal potential applied to conduct 1301. The motor 1300 will then stop.

In the new position of the slider of rate of pitch potentiometer RP7, phase $\varphi 1$ potential is applied over conductor 1310 and through resistor 1559 to the signal input conductor 1552 of the angle of attack motor control circuit which potential is effective to cause motor 1550 to turn shaft 1553 into a position representative of the new angle of attack resulting from the change in the rate of pitch to a positive value.

As a result of the change of angle of attack represented by the movement of the slider of angle of attack potentiometer AA5, the true rate of climb motor control circuit is operated in accordance with the rate of climb which would result from the change in the angle of attack. The rate of climb motor unit is controlled by potentials representing forces perpendicular to the earth. These forces are primarily the component of the lift produced by the wings and tail that is perpendicular to the earth, and the opposing force of weight. If the two are equal the rate of climb remains stationary but if one exceeds the other there is an increase or a decrease in the rate of climb.

The force equation represented by the rate of climb circuit is as follows: Lift×cosine of the bank angle−weight=vertical accelerating force. Substituting for lift the equation becomes $C_L K \times$ (indicated airspeed)$^2 \times$ cosine of bank angle=vertical accelerating force, where K is a constant equal to one-half of the air density multiplied by the wing area and $C_L$ is the coefficent of lift and is a function of the angle of attack and the position of the wing flaps.

Prior to the simulation of flight and with the ASN relay 750 operated, the centering potentiometer RC3 of the rate of climb motor unit of Fig. 6 is effective to center the sliders of potentiometers RC1, RC2 and RC3 at the electrical centers of their windings. To accomplish this, potential of phase $\varphi 2$ is applied from the $40\varphi 2$ bus-bar through resistor 602 and the lower half of the winding of potentiometer RC3 to ground and potential of phase $\varphi 1$ is applied from the $40\varphi 1$ bus-bar over the lower contacts of the ASN relay 750, over conductor 603, through resistor 604 and through the upper half of the winding of potentiometer RC3 to ground. If the slider of such potentiometer is not centered, potential of phase $\varphi 1$ or phase $\varphi 2$ will be applied from such slider over conductor 605, over the lower front contact of the G4 relay 1561 associated with the angle of attack motor unit, thence over conductor 606, through resistor 607 and to the signal input conductor 608 of the rate of climb motor control circuit. This potential is effective to operate the motor 699 in a direction to drive the slider of potentiometer RC3 back to the center tap position whereupon the motor will stop.

The lifting forces above referred to are represented by the circuits connected to signal input conductor 608 through resistors 609 and 610. The circuit connected to conductor 608 through resistor 611 represents the weight force which opposes lift. The main lifting force is exerted by the wings and is determined by the angle of attack of the wings and by the air speed. To derive a potential which is representative of the lifting force of the wings the phase $\varphi 1$ potential derived as previously described at the slider of indicated airspeed variac IAS3, which varies as the square of the indicated airspeed, is applied through resistor 757 and over conductor 758 through the upper 75 per cent of the winding of the angle of attack potentiometer AA5 to ground. At the same time phase $\varphi 2$ potential derived at the slider of indicated airspeed variac IAS3, which also varies as the square of the indicated airspeed, is applied through resistor 759 and over conductor 760 through the lower quarter of the winding of potentiometer AA5 to ground. Prior to take-off the slider of potentiometer AA5 will be between the ground tap and the No. 3 terminal of the winding and consequently potential of phase $\varphi 2$ will be derived at the slider of such potentiometer and applied over conductor 825, over the inner upper back contact of the S relay 809, over conductor 826, through resistor 701, over conductor 702 and through resistor 612 to ground through the bank potentiometer BK7. Before take-off the bank angle will be zero and therefore the slider of this potentiometer will rest at the grounded center tap of such potentiometer winding. The phase $\varphi 2$ potential derived at the junction point between resistors 701 and 612 is then applied through resistor 669 to the signal input conductor 608 of the rate of pitch motor control circuit.

To derive a potential which represents the lift force of the wing flaps phase $\varphi 2$ potential derived at the slider of indicated airspeed variac IAS3, and which varies as the square of the indicated airspeed, is supplied over conductor 758 through the winding of wing flaps potentiometer WF3. From the slider of this potentiometer assumed to be in a position representative of the half down position of the wing flaps, the derived phase $\varphi 2$ potential is applied over conductor 908, through resistor 761, over conductor 762 to the slider of bank potentiometer BK9 and thence through the two halves of such potentiometer winding in parallel and through resistor 614 to ground. The potential derived between resistor 761 and the slider of potentiometer BK9 is then applied through resistor 610 to signal input conductor 608. The potential applied through resistor 610 is further modified in accordance with the thrust by phase $\varphi 2$ potential derived at the slider of thrust potentiometer T2 and applied through resistor 827 to conductor 758 to augment the phase $\varphi 2$ potential applied to conductor 758 through resistor 757 from the slider of variac IAS3. To derive the phase $\varphi 2$ potential at the slider of potentiometer T2, the winding of the latter potentiometer is energized in the circuit from the $40\varphi 2$ bus-bar through resistor 828 and the winding of potentiometer T2 to ground. This lift potential is representative of the lift of those portions of the wings in the path of the slip stream.

Opposing these phase $\varphi 2$ potentials applied to conductor 608, through resistors 609 and 610 is a potential of phase $\varphi 1$ applied through resistor 611, representative of the weight of the airplane and its load which resists vertical acceleration. To derive this potential, the winding of weight potentiometer W11 of Fig. 8 is energized over a circuit extending from the $40\varphi 1$ bus-bar, through resistor 831, through the winding of the potentiometer, over conductor 832 and through the wing ice rheostat 2116 at the instructor's desk. The potential then derived at the slider of potentiometer W11, which will be representative of the assumed weight of the airplane and load as determined by the instructor and the added weight of ice on the airplane as determined by the instructor, will be applied over conductor 833 and through resistances 615 and 616 of a potential divider to ground from which potential divider phase $\varphi 1$ potential is applied through resistor 611 to conductor 608.

As a result of the application of the signal potentials to signal input conductor 608, there will be a predominating potential of phase $\varphi 2$ which will cause the motor 699 to rotate in a direction to drive the sliders of potentiometers RC1, RC2 and RC3 slowly toward the No. 3 terminals of their windings. With airspeed developed the ASN relay 750 will now be deenergized and the centering potentiometer RC3 will be ineffective.

The movement of the slider of potentiometer

RC2 applies a potential of phase φ2 derived thereat, through the potential divider resistors 621 and 622 to ground, and a potential of phase φ2 derived at the junction point between these resistors is applied through resistor 623 to signal input conductor 401 of the altimeter motor control circuit. In response to this potential the motor 400 of the altimeter motor unit rotates the shaft 421 of such unit at a speed commensurate with the true rate of climb. The rotation of the shaft 421, through the gears 422 and 423, rotates the rotor of synchro-transmitter H1, through the gears 424 and 425 rotates the rotor of synchro-transmitter TH, and through the gears 426 and 427 having a step-up ratio of 1 to 10, drives the rotor of synchro-transmitter H, and also through the gears 428 and 429 drives the auxiliary shaft 430. From the auxiliary shaft the rotor of the static ice synchro-transmitter SI is driven through the gears 431 and 432. The rotor of synchro-transmitter SI is connected over conductors 433 and 434 in parallel with the rotor winding of the synchro-receiver SI of the static ice motor unit and with the secondary winding of transformer SITR of Fig. 3.

The stator windings of the TH transmitter are connected over the 28G bus-bar and conductors 436 and 437 with the stator windings of the synchro-receiver TH which drives the pointers of the altimeter 2117 at the instructor's desk which indicate the ten thousands and thousands of feet of altitude. The stator windings of the synchro-transmitter H are connected over the 28G bus-bar and conductors 438 and 439 with the stator windings of the synchro-receiver H which drives the pointer of the altimeter 2117 which indicates the hundreds of feet of altitude. With the SI relay 435 unoperated, it being assumed that no static ice condition has been imposed by the instructor, the stator windings of the synchro-transmitter H are also connected over bus-bar 28G and over the lower Nos. 3 and 4 back contacts of relay 435 and conductors 442 and 443 with the stator windings of the synchro-receiver H which drives the pointer of the altimeter 1704 at the bombardier's station to indicate the hundreds of feet of altitude. With the SI relay 435 unoperated the stator windings of synchro-transmitter H1 are connected over bus-bar 28G and over the upper Nos. 1 and 4 back contacts of relay 435 and conductors 441 and 440 with the stator windings of the synchro-receivers H which drive the pointers of the altimeters 1603, 1703 and 1803 at the pilot's, copilot's and navigator's stations to indicate the hundreds of feet of altitude. The stator windings of the synchro-receiver TH which drive the pointers of the altimeters 1603, 1703, 1704 and 1804 to indicate ten thousands and thousands of feet of altitude are connected over the bus-bar 28G and conductors 311 and 312 with the stator windings of the synchro-transmitter ALT, the rotor of which is driven by the shaft 313 of the static ice motor unit of Fig. 3. The rotor windings of all of the synchro-transmitters associated with the altimeter motor unit of Fig. 4, with the static ice motor unit of Fig. 3, and the rotor windings of all of the synchro-receivers associated with the altimeters 1603, 1703, 1704, 1804 and 2117 are energized by 400 cycle current supplied thereto from the bus-bars 28G and 28V.

The shaft 313 of the static ice motor unit is driven through the gears 314 and 315 from shaft 316 which is in turn connected to and driven by the rotor of the synchro-receiver SI telemetrically driven by the synchro-tranmitter SI associated with the altimeter motor unit. The gearing 314 and 315 has the same ratio as the gearing between the thousands and ten thousands scale points of the altimeters at the pilot's, copilot's, bombardier's and navigator's stations in the trainer. When the SI relay 435 is operated by the instructor, representative of a static ice condition which in an airplane would clog the static tube from which the altimeters are driven, the circuits traced to the synchro-receivers which drive the altimeters are opened and the altimeters are not operated. The circuit over which the instructor controls the SI relay 435 may be traced from battery through the winding of such relay, thence over conductor 444, over contacts of static ice key 1705 at the instructor's desk, over conductor 1706 to ground at the back contact of relay 1604. When the pilot discovers that his altimeter is not functioning he will operate the static line switch 1605 to simulate the transfer of the altimeters to the alternate pressure supply line thereby causing the operation of relay 1604 which operates to open the circuit of the SI relay 435. When relay 435 releases the synchro-receiver SI of the static ice motor unit is again connected with the synchro-transmitter SI of the altimeter motor unit. When this receiver assumes a position corresponding to that of the transmitter, the transmitter ALT geared to it is rotated by the same amount as that through which the synchro-transmitter TH of the altimeter motor unit has rotated to control the synchro-receiver TH which has been driving the altimeter 2117 at the instructor's desk.

The synchro-transmitter H1 which controls the hundreds pointers of the altimeters in the trainer as previously described, is disconnected from the synchro-receivers H of the altimeters upon the operation of the SI relay 435 but when relay 435 is again released, the synchro-receivers will come into synchronism with the synchro-transmitter H1. Of course, the static ice condition would not ordinarily be simulated except where ice conditions might be encountered.

In response to the firing of tube M1 to transmit power impulses to motor 400, the RG relay 415 is operated in a circuit from ground over the lower back contact of the LS relay 452, through the winding and upper normal contacts of relay 415, over the cathode-anode path through tube M1 and through choke coil 407 to the 115φ2 bus-bar. Relay 415 upon operating locks over its upper alternate contacts and through resistor 453 to battery and at its lower contacts opens the circuit of the G relay 412 which thereupon releases and in turn releases the G1, G2, G3, G4 and G5 relays 800, 1451, 1259, 1551 and 601, respectively. This will be representative of an airborne condition of flight.

As a further result of the rotation of the shafts 421 and 430 of the altimeter motor unit, shaft 445 is driven from shaft 430 through the gears 446 and 447 thereby rotating cam 414 to release the contacts of the L1 limit switch to their alternate positions. The rotation of gear 427 has also resulted in the rotation of cam 413 to release the contacts of the micro-switch L3 to their alternate positions. With these switches now released to their alternate positions, the operating circuit of the G relay 412, previously traced is opened at another point. By the operation of relay 415 as soon as tube M1 fires the airborne condition of flight is simulated earlier than would be the case if the release of the G relays were made entirely dependent upon the rotation of shafts 421 and 430.

With the G1 relay 800 now released, the slider of the angle of attack potentiometer AA3 is disconnected at the front contacts of relay 800 from the signal input conductor 1552 of the angle of attack motor control circuit so that such control circuit is no longer controlled by the potentiometer AA3. Over the upper back contact of relay 800 conductor 1552 is now connected through resistor 821 and over conductor 834 with conductor 908 and to the slider of the wing flaps potentiometer WF3 so that the angle of attack motor control circuit is now subject to the phase $\varphi 2$ potential representative of the lifting effect of the wing flaps. Over its inner lower back contact relay 800 connects conductor 1552 through resistor 823 with conductor 826, which conductor is connected over the inner upper back contact of the S relay 809 with the slider of the angle of attack potentiometer AA5 so that the angle of attack motor control circuit is now subject to the phase $\varphi 2$ potential representative of the lifting effect of the wings. Over its inner upper back contact relay 800 connects conductor 1552 through resistor 822 with conductor 835 and through resistor 824 and conductor 833 with the slider of the weight potentiometer W11 so that the angle of attack motor control circuit is now subject to the phase $\varphi 1$ potential representative of the assumed weight of the airplane and its load.

It will be recalled that upon the operation of the rate-of-pitch motor unit, the slider of potentiometer RP7 was adjusted to apply a phase $\varphi 1$ potential through resistor 1559 to the signal input conductor 1552 of the angle of attack motor control circuit. The angle of attack motor unit now responds to the summation of the potentials applied to conductor 1552 which will be of predominantly phase $\varphi 1$ and will cause the motor 1550 to rotate the shaft 1553 in a direction representative of an increase in the angle of attack until the slider of the angle of attack potentiometer AA5 moves toward the No. 3 terminal of its winding sufficiently to cause the phase $\varphi 2$ potential derived thereat and applied to control conductor 1552 through resistor 823 to balance the predominating phase $\varphi 1$ potential. The motor 1550 will then stop.

The rotation of shaft 1553 results in the movement of the slider of angle of attack potentiometer AA8 toward the No. 3 terminal of its winding. With the G1 relay 800 now released the phase $\varphi 1$ potential derived at the slider of the longitudinal center of gravity rheostat 2114 is now applied over conductor 2118, over the lower back contact of relay 800, through resistor 817 and through the upper portion of the winding of potentiometer AA8 to ground and in parallel through resistor 818 and through the winding of wing flaps potentiometer WF4 to ground. The potential of phase $\varphi 1$ thus derived at the sliders of potentiometers AA8 and WF4 and applied respectively through resistors 824 and 907 to signal input conductor 1301 of the rate-of-pitch motor control circuit become increased and the motor 1300 of the rate-of-pitch motor unit consequently rotates the slider of potentiometer RP7 in a direction to decrease the phase $\varphi 1$ potential derived at its slider until a potential balance on conductor 1301 is secured.

The decrease in phase $\varphi 1$ potential at the slider of potentiometer RP7 applied through resistor 1559 to the signal input conductor 1552 of the angle of attack motor control circuit causes the motor 1550 of the angle of attack motor unit to operate shaft 1553 in a direction representative of a reduction in angle of attack until the new value of $\varphi 1$ potential applied to conductor 1552 from the slider of angle of attack potentiometer AA5 again provides a potential balance on conductor 1552. In response to the new settings of the sliders of the potentiometers of the angle of attack motor unit, the phase $\varphi 1$ potential applied from the slider of angle of attack potentiometer AA8 through resistor 824 to the signal input conductor 1301 of the rate-of-pitch motor control circuit will be decreased and the motor 1300 of the rate-of-pitch motor unit will rotate the slider of its potentiometer RP7 in a direction to increase the phase $\varphi 1$ potential applied therefrom to the signal input conductors 1301 and 1552 of the rate-of-pitch and angle of attack motor control circuits. The rate-of-pitch and angle of attack motor units thus continue to interact until a new angle of attack is reached for which there is a zero rate of pitch.

The movement of the slider of potentiometer RC2 applies a potential of phase $\varphi 2$ derived derived thereat over the upper back contact of the ASN1 relay 617, which released following the release of the ASN relay 750 representative of the production of airspeed, thence over conductor 618 and through resistor 501 to signal input conductor 502 of the indicated rate-of-climb motor control circuit. To derive this potential the winding of potentiometer RC2 is bridged through resistors 619 and 620 between the $40\varphi 1$ and $40\varphi 2$ bus-bars. In response to the phase $\varphi 2$ potential applied to conductor 502 the motor 500 is controlled to rotate shaft 503 in a direction to move the slider of balancing potentiometer IRC7 towards the No. 3 terminal of its winding until the balancing potential of phase $\varphi 1$ derived at its slider and the signal potential of phase $\varphi 1$ applied to conductor 502 from the true rate-of-climb potentiometer RC2 balance. The motor 500 will then stop.

As a result of the rotation of the shaft 503, the rotor of the synchro-transmitter ICT is rotated. The stator windings of this transmitter are connected over the 28G bus-bar and conductors 506 and 507 with the stator windings of the synchro-receiver 2119 which drives the rate-of-climb indicator 2120 at the instructor's desk and over the lower Nos. 1 and 2 back contacts of the SI relay 435 and conductors 448 and 449 with the stator windings of the synchro-receivers 1607 and 1707 which drive the rate-of-climb indicators 1608 and 1708 at the pilot's and copilot's stations. The rotor windings of the transmitter ICT and receivers 1607 and 1707 are energized from the 28G and 28V bus-bars. The rate-of-climb indicator in an airplane is operated from the static tube and if the tube becomes clogged due to an icing condition, the rate-of-climb indicator will cease to operate. The instructor can simulate this condition by causing the operation of the SI relay 435 as previously described, thereby opening the circuits over which the stator windings of the transmitter ICT and receivers 1607 and 1707 are connected whereupon the receivers will cease to operate the indicators 1608 and 1708. As soon as the pilot discovers that the indicators are not operating, he will correct the condition by operating the static tube switch 1605 in simulation of the switch-over to the alternate static pressure supply whereupon relay 435 releases to reconnect the stator windings of transmitter ICT with the stator windings of receivers 1607 and 1707 and the receivers then operate to regain synchronism with the transmitter ICT.

The pilot will now pull back on the control 2006 while maintaining a zero rate of turn by use of the rudder pedals 2001 and 2002 so that the rate-of-climb indicators 1608, 1708 and 2119 will show a continuous rate of climb of 800 to 1400 feet per minute. The movement of control 2006 results in the movement of the slider of the elevator potentiometer EL toward the No. 3 terminal of its winding and a further decrease in phase $\varphi 1$ potential applied from the slider thereof through resistor 1302 to the signal input conductor 1301 of the rate-of-pitch motor control circuit. This will cause the readjustment of the rate-of-pitch motor unit to a position representative of the new positive rate of pitch. The resetting of the slider of rate-of-pitch potentiometer RP7 results in the control of the true rate-of-climb and angle of attack motor units to positions representative of the new rate of climb and angle of attack in the manner previously described. The resetting of the potentiometer RC2 of the true rate-of-climb motor unit in turn causes the control of the indicated rate-of-climb motor unit to control the rate-of-climb indicators 1608, 1708 and 2119 and to cause the control of the altimeter motor unit to control the altimeters 1603, 1703, 1704, 1803 and 2117 to take new settings representative of the increase in the rate of climb and the increase of altitude incident to the operation of the control 2006.

When a reasonable altitude has been attained the pilot will operate the landing gear control (not shown) to its "up" position whereupon the motor 999 of the landing gear motor unit will be operated in the manner fully described in my application, hereinbefore referred to, to simulate the retraction of the landing gear. The retracted condition of the landing gear will be indicated to the pilot and to the instructor by indicators (not shown) and in the circuit of Fig. 9 will be represented by the movement of the slider of potentiometer LG7 to the No. 1 terminal of its winding. The movement of the slider to the No. 1 terminal connects direct ground to the center tap of the yaw potentiometer Y4 and with the flight assumed to be straight ahead and the slider of the yaw potentiometer at the center tap position, the phase $\varphi 1$ potential connected from such slider through resistor 551 to its signal input conductor 1452 of the indicated airspeed motor control circuit will be reduced to zero. As a result of this decrease in phase $\varphi 1$ potential on conductor 1452, the potential balance on conductor 1452 will no longer exist and the phase $\varphi 2$ potential applied from the slider of the thrust potentiometer T5 through resistor 801 to conductor 1452 will cause the motor 1450 of the indicated airspeed motor unit to turn the shaft 1459 in a direction representative of the increase in airspeed incident to the reduction in drag resulting from the retraction of the landing gear. This increase in indicated airspeed is effective through the movement of the sliders of the indicated airspeed variacs IAS3, IAS4, IAS7 and IAS8 toward the No. 4 terminals of their terminals to cause an increase in the rate of pitch, true rate of climb and angle of attack in the manner previously described.

The pilot will also operate the wing flaps control (not shown) to the "up" position thereby causing the motor 900 of the wing flaps motor unit to rotate the sliders of the wing flaps potentiometers back to the No. 1 terminals of their windings. This will result in the application of ground potential from the slider of potentiometer WF4 through resistor 907 to the signal input conductor 1301 of the rate-of-pitch control circuit and the decrease in the phase $\varphi 2$ potential applied to conductor 1301 from the slider of potentiometer WF5 through resistor 906. The motor of the rate-of-pitch motor unit will now be operated to a position representative of the establishment of a negative rate of pitch. Also ground potential will now be applied from the slider of potentiometer WF3 through resistor 618 to signal input conductor 608 of the true rate-of-climb motor control circuit and through resistor 821 to signal input conductor 1552 of the angle of attack motor control circuit representative of the reduction in lift incident to the raising of the wing flaps. The movement of the slider of potentiometer WF2 to the No. 1 terminal of its winding will also result in a decrease of phase $\varphi 1$ potential applied therefrom through resistor 902 to signal input conductor 1452 of the indicated airspeed motor control circuit and the consequent slight increase in airspeed.

The total result will be a reduction in the angle of attack and the consequent reduction in the indicated rate of climb, at an increased airspeed. To compensate for this the pilot will pull back about one inch on the control 2006 thereby decreasing the potential of phase $\varphi 1$ applied as previously described from the slider of the elevator potentiometer EL through resistor 1302 to the signal input conductor 1301 of the rate-of-pitch motor control circuit to compensate for the reduction of the phase $\varphi 2$ potential by the wing flaps.

*Climb*

For a continued climbing simulation the propeller governors (not shown) are adjusted until the tachometers read 2600 revolutions per minute and the throttles are pulled back until the manifold pressure indicators (not shown) show manifold pressures of 43 inches of mercury. This is accomplished in the manner previously set forth in the Burelbach-Lukacs application hereinbefore referred to. The elevator control 2006 is now adjusted until the rate-of-climb indicators 1608 and 1708 show a rate of climb of 1300 feet per minute at an airspeed of 120 knots. As a result of the movement of the control 2006 the slider of elevator potentiometer EL is moved further toward the No. 3 terminal of its winding thereby further decreasing the phase $\varphi 1$ potential applied from such slider through resistor 1302 to the signal input conductor 1301 of the rate-of-pitch motor control circuit. This will cause the readjustment of the rate-of-pitch motor unit to a position representative of a new rate of pitch and through the movement of the slider of rate-of-pitch potentiometer RP7, the rate-of-climb and angle of attack motor units will be operated to positions representative of an increased rate of climb and an increased angle of attack. The resetting of the potentiometer RC2 of the true rate-of-climb motor unit in turn causes the control of the indicated rate-of-climb motor unit to control the resetting of the rate-of-climb indicators 1608, 1708 and 2119 to show the new rate of climb of 1300 feet per minute.

As a result of the increase in the angle of attack and the movement of the sliders of angle of attack potentiometers AA1 and AA2 toward the No. 3 terminals of their windings, an increase in the drag effect due to the angle of attack of the wings is applied as an increased potential of phase $\varphi 1$ through resistor 806 to signal input conductor 1452 of the indicated airspeed motor control circuit whereby a potential unbalance occurs on conductor 1452 which causes the motor 1450 of the indicated airspeed motor unit to drive the sliders of variacs IAS7 and IAS8 toward the No. 2 terminals of their windings until a potential balance on conductor 1452 is again secured. This resetting of the indicated airspeed motor unit is representative of a slight reduction in indicated airspeed due to an increase in the angle of attack.

This reacts upon the rate-of-pitch motor control circuit through the indicated airspeed variac IAS7 to reduce the phase $\varphi 1$ potential applied through resistors 824 and 907 to signal input conductor 1301 of the rate-of-pitch motor control circuit, whereupon, the motor 1300 of the rate-of-pitch motor unit operates in a direction to reduce the phase $\varphi 1$ potential applied from the slider of the potentiometer RP7 through resistors 1303 and 1304 to conductor 1301 until a potential balance on conductor 1301 is again attained. The movement of the slider of potentiometer RP7 is thus representative of the establishment of a lower positive value of the rate of pitch. The reduction of the phase $\varphi 1$ potential at the slider of potentiometer RP7 causes an unbalance of the potentials applied to signal input conductor 1552 of the angle of attack motor control circuit and the motor 1550 of the angle of attack motor unit now rotates the slider of potentiometer AA5 slightly back toward its No. 1 terminal until the phase $\varphi 2$ potential derived at such slider and applied through resistor 823 to conductor 1552 again establishes a potential balance. This resetting of the angle of attack motor unit is representative of the decrease in angle of attack resulting from the decrease in airspeed.

The movement of the sliders of angle of attack potentiometers AA1 and AA2 toward the No. 1 terminals of their windings causes a decrease in the phase $\varphi 1$ potential applied through resistor 806 to signal input conductor 1452 of the indicated airspeed motor control circuit whereby a potential unbalance occurs on conductor 1452 which causes the motor 1450 of the indicated airspeed motor unit to drive the sliders of variacs IAS7 and IAS8 towards the No. 4 terminals of their windings until a potential balance on conductor 1452 is again secured. This resetting of the indicated airspeed motor unit is representative of a slight increase in indicated airspeed due to a decrease in the angle of attack. Thus the rate of pitch and indicated airspeed circuits interact so that a phugoid oscillation effect of a climbing airplane will be simulated in the fluctuations produced in the rate-of-climb indicators 1608, 1708 and 2119, which through the rate of climb and indicated rate-of-climb motor units, will follow the change in indicated airspeed and angle of attack. These oscillations will gradually die out until the indicators with the position of the elevator control sustained, will show a rate of climb of about 1300 feet per minute.

As previously stated the true airspeed is different from the indicated airspeed because the ordinary airspeed indicators depend on the air density as well as on the true airspeed, and air density depends on barometric pressure and temperature both of which are closely related to altitude. In the trainer a motor unit is provided which is controlled by signal potentials representing the relation between true airspeed, air density, altitude and indicated airspeed as expressed by the following equation:

$$\sqrt{\frac{\text{Air density at altitude}}{\text{Air density at sea level}}} \times \text{true airspeed} = \text{indicated airspeed}$$

In the trainer the square root of the density ratio, based on standard atmospheric conditions, is represented by a potentiometer A5 driven by the altimeter motor unit plus the outside temperature rheostat OA2 at the instructor's desk. Under standard conditions for any altitude the outside air temperature rheostat control at the desk will be in the normal position. A potential representative of the indicated airspeed is derived at the slider of the indicated airspeed potentiometer IAS9 and applied over conductor 763 and through resistor 1401 to the signal input conductor 1402 of the true airspeed motor control circuit. To determine this potential the winding of potentiometer IAS9 is energized over a circuit from the $40\varphi 1$ bus-bar, through resistor 754 and the potentiometer winding to ground.

The phase $\varphi 1$ potential applied to conductor 1402 causes the motor 1400 to turn shaft 1403 in a direction to move the sliders of all potentiometers driven thereby toward the No. 3 terminals of their windings. Movement of the slider of potentiometer TAS2 applies a balancing potential of phase $\varphi 2$ through resistor 1404 to conductor 1402 until such potential balances the phase $\varphi 1$ potential. To derive this phase $\varphi 2$ balancing potential the winding of potentiometer TAS2 is connected from ground through such potentiometer winding, over conductor 1405, through rheostat OA2 over conductor 1406 and to the slider of the altimeter potentiometer A5. The winding of the latter potentiometer is energized in a circuit extending from the $40\varphi 2$ bus-bar through such winding and resistor 450 to ground. As the altitude increases, the phase $\varphi 2$ potential at the slider of potentiometer A5 decreases causing the true airspeed motor 1400 to drive its potentiometers to points representing a higher true airspeed, at which time the sum of the potentials applied to control conductor 1402 becomes zero thus causing the motor 1400 to stop.

In order to simulate other than standard conditions at any altitude the rheostat OA2 is provided at the instructor's desk with a control for increasing or decreasing the temperature from that of standard conditions. As the temperature is decreased the phase $\varphi 2$ potential applied to conductor 1402 increases causing the true airspeed motor to drive the potentiometers to positions representative of a lower airspeed than for standard conditions.

Although there is no instrument showing the true airspeed, the potentiometers of the true airspeed motor unit modify potentials affecting other motor control circuits, such as indicated airspeed, yaw, ground speed and ground track, pitch bar, rate of turn and ball.

The airplane gyro-horizon instrument is built around a gyroscope rotating about an axis which is at all times substantially vertical. Any displacement of the attitude of the airplane from that of level flight causes the instrument to register the displacement by moving the horizon or pitch bar from its normal position. In the trainer the instrument used is electrically controlled by two circuits, namely, the pitch bar and the bank circuits. This instrument is disclosed in the Baker Patent 2,381,872 hereinbefore referred to. The pitch bar circuit controls the vertical movement of the horizon bar while the bank circuit controls the angular displacement of the bar. The pitch bar circuit adds the vertical components of the attack angle and yaw angle to the angle of climb in accordance with the following equation: Pitch bar angle=angle of climb+angle of attack (cosine of bank angle+yaw angle (sine of bank angle). Since there is no angle of climb circuit in the trainer the equivalent is used, namely, rate of climb divided by true airspeed=angle of climb. Thus pitch angle=rate of climb divided by true airspeed+angle of attack (cosine of bank angle)+yaw angle (sine of bank angle).

The circuit connected to signal input conductor 1111 of the pitch bar motor control circuit of Fig. 11 through resistor 705 represents the angle of climb term and that connected to conductor 1111 through resistor 625 represents the angle of attack term. The circuit connected to conductor 1111 through resistor 554 represents the angle of yaw term and the circuit connected through resistor 1112 is a balancing circuit. To derive the potential which is applied through resistor 705 and varies directly as the true rate of climb and inversely as the true airspeed, the winding of true rate-of-climb potentiometer RC1 is bridged through resistors 626 and 627 between the 40φ1 and 40φ2 bus-bars and since a climbing maneuver has been assumed, the slider of potentiometer RC1 will be above the electrical center of its winding representative of a positive rate of climb and the phase φ1 potential derived at such slider will be applied through resistor 628 to ground. Potential derived at a point between the potentiometer winding and resistor 628 is then applied over conductor 629 through the winding of true airspeed potentiometer TAS1 and through the potential divider resistors 706 and 707 to ground, the resistor 706 being shunted over conductors 708 and 709 by the winding of weight potentiometer W3. The potential derived at the slider of potentiometer TAS1 is then applied through resistor 705 to the signal input conductor 1111. Since the first 25 per cent of the winding of potentiometer TAS1 is short-circuited, the effect of true airspeed is not employed until a true airspeed in excess of 65 knots is attained.

The angle of attack potentiometer AA11 is bridged through resistors 837 and 838 between the 40φ1 and 40φ2 bus-bars and thus, with the assumed angle of attack for climbing, a phase φ1 potential is applied through resistor 839, over conductor 840 to the slider of the bank potentiometer BK10 and thence through the portions of the potentiometer winding on either side of the point of engagement of the slider with the winding and through resistor 639 to ground. With no bank angle assumed, the slider will be at the electrical center of the potentiometer winding. The potential derived between the resistor 839 and the slider of potentiometer BK10, which thus varies with the angle of attack and in accordance with the cosine of the bank angle, is then applied through resistor 625 to signal input conductor 1111.

To provide a potential which varies as the angle of yaw and as the sine of the bank angle the windings of bank variacs BK2 and BK3 are reversely connected between the 40φ1 and 40φ2 bus-bars and the potentials derived at the sliders of such variacs are applied through resistors 631 and 632 and over conductors 633 and 634 through the lower and upper halves of the winding of yaw potentiometer Y5 to ground. From the slider of the yaw potentiometer the derived potential is applied through resistor 554 to conductor 1111. With straightforward flight and consequently no yaw it will be obvious that the potential will be ground potential since the slider of yaw potentiometer Y5 will be at the center ground tap.

For a climbing flight, as assumed, the summation of the potentials thus derived and applied through resistors 705, 625 and 554 to signal input conductor 1111 will be a phase φ1 potential and the motor 1110 will consequently be driven in a direction representative of a nose "up" condition of flight. This will result in the movement of the slider of balancing potentiometer PB7 toward the No. 3 terminal of its winding. With its winding bridged between the 40φ1 and 40φ2 bus-bars through resistors 1113 and 1114 a phase φ2 potential will be derived at the slider and applied to signal input conductor 1111 through resistor 1112. When this potential balances the phase φ1 signal potential the motor 1110 will stop.

The motor 1110 in addition to moving the slider of balancing potentiometer PB7 also rotates the rotors of the synchro-transmitters PT1, PT2 and PT3. The stator windings of transmitter PT1 are connected over bus-bar 33G and conductors 1115 and 1116 to the stator windings of the synchro-receiver 1621 which controls the elevation or depression of the horizon bar of the gyro-horizon instrument 1622 at the pilot's station. The stator windings of transmitter PT2 are connected over bus-bar 33G and conductors 1117 and 1118 with the stator windings of the synchro-receiver 1721 which controls the elevation or depression of the horizon bar of the gyro-horizon instrument 1722 at the copilot's station. The stator windings of transmitter PT3 are connected over bus-bar 33G and conductors 1119 and 1120 with the stator windings of the synchro-receiver 2121 which controls the elevation or depression of the horizon bar of the gyro-horizon instrument 2122 at the instructor's desk. The rotor windings of all transmitters and receivers are energized from the 33G and 33V bus-bars.

Should the pilot pull back too far on the control 2006 during the climbing maneuver and thus cause too great an angle of attack, the airplane would get into a stall condition. This is simulated in the trainer by the provision of the stall (S) relay 809 which operates when the shaft 1553 of the angle of attack motor unit rotates the sliders of the potentiometers driven thereby to the No. 3 terminals of their windings representative of the maximum angle of attack or stall condition and the cam 1559 operates the L2 limit switch to the alternate position. The circuit of relay 809 may be traced from ground over the contacts of switch L2 and over conductor 1561 through the winding of relay 809 to battery and ground. Relay 809, upon operating, establishes a circuit from ground over its middle upper contacts, over conductor 1562, over the lower back contact of the RV1 relay 1555, and to battery through the winding of the LS relay 1556. Relay 1556 upon operating opens the rotor circuit of motor 1550 to stop further rotation of shaft 1553.

At its lower back contact, relay 809 removes the ground connection through resistor 808 from the No. 1 terminal of the winding of wing flaps potentiometer WF2 thereby modifying the circuit from the 40φ1 bus-bar through the wing flaps potentiometer and through resistor 902 to the signal input conductor 1452 of the indicated air speed motor control circuit so that with the slider of the potentiometer WF2 at the No. 1 terminal of its winding representative of the UP position of the wing flaps the phase φ1 potential applied through resistor 902 is materially increased, representative of the increase in drag. As a consequence the motor 1450 of the indicated airspeed motor unit turns the shaft 1459 in a direction representative of a reduction in indicated airspeed until the phase φ1 potential derived at the slider of indicated airspeed variac IAS8 and applied to conductor 1452 through resistor 806 is reduced sufficiently to restore the potential balance on conductor 1452.

A further result of the operation of the stall relay 809 is to disconnect the slider of angle of attack potentiometer AA5 from the circuit through resistors 701 and 699 over which potential of phase φ2 was applied to signal input conductor 608 of the true rate-of-climb motor control circuit and from the circuit over the inner lower back contact of the G1 relay 800 and through resistor 823 over which phase φ2 potential was applied to signal input conductor 1552 of the angle of attack motor control circuit and to apply phase φ2 potential to such circuits through the 2200 ohm resistor 841. As a consequence the phase φ2 lift potentials are decreased. With a decrease in the phase φ2 potential applied to signal input conductor 608, the motor 600 turns the sliders of the rate-of-climb potentiometers toward the No. 1 terminals of their windings representative of the rapid reduction in the rate of climb which will be indicated by the rate-of-climb indicator 1608, 1708 and 2119 in the manner previously described.

As the result of the reduction in rate of climb, the potential of phase φ1 derived at the slider of rate-of-climb potentiometer RC1 and applied through resistor 1453 to signal input conductor 1452 of the indicated airspeed motor control circuit, becomes reduced and the motor 1450 operates the shaft 1459 in a direction representative of a decrease in indicated airspeed which will be indicated by the air speed indicators.

A further result of the operation of the stall relay 809 is to control the elevator, rudder and aileron loading units to simulate the removal of the loading from the controls so that they "feel" soft. To recover from the stall, the pilot may push forward on the control 2006 until loading is reapplied. Pushing forward on the control causes the slider of the elevator potentiometer EL to move back toward the No. 1 terminal of its winding, thereby decreasing the phase φ2 potential applied from such slider through resistor 1302 to signal input conductor 1301 of the rate-of-pitch motor control circuit. The motor of the rate-of-pitch motor unit will then respond in a manner to move the slider of potentiometer RP7 toward the No. 1 terminal of its winding, thereby reducing the phase φ1 potential applied through resistor 1559 to the signal input conductor 1552 of the angle of attack motor control circuit with the result that the angle of attack motor 1550 returns the sliders of the potentiometers driven thereby toward the No. 1 terminals of their windings representative of a reduction in the angle of attack, and causes cam 1560 to release the L2 switch to release the stall relay 809. The circuit now returns to the condition prior to the simulation of the stall.

As a further result of the climbing maneuver and the operation of the altimeter motor unit representative of an increasing altitude, potential of phase φ1 is derived at the slider of altimeter potentiometer A8 and applied over conductor 451 and through resistor 1901 to signal input conductor 1902 of the outside air temperature motor control circuit of Fig. 19. In response to this potential and through the operation of the tubes VT10, VT11, VT12, GT1 and GT2, the motor 1900 is controlled to rotate shaft 1903 in a direction representative of a decrease in temperature until the potential of phase φ2 applied from the slider of balancing potentiometer AT1 through resistor 1904 to signal input conductor 1902 balances the phase φ1 signal potential when the motor 1900 will stop. As the assumed altitude increases the air temperature motor unit continually adjusts itself to continually represent a slowly decreasing outside air temperature at the rate of about 2 degrees per 1000 feet of altitude.

The instructor may initially control the air temperature motor unit for a standard sea level temperature of +15° C. or for any temperature based on standard atmospheric conditions for any altitude. To accomplish this the rheostat OA1 is provided at the instructor's desk, the winding of which is energized by potential applied from the 40φ1 bus-bar through resistor 2123 and through the rheostat winding to ground. The potential of phase φ1 derived at the slider of such rheostat is applied over conductor 2124 and through resistor 1905 to signal input conductor 1902 of the air temperature motor control circuit and such circuit is thereby controlled in the manner previously described to turn the shaft 1903 to a position representative of the air temperature determined by the instructor. From this initial setting the shaft 1903 is turned as previously described to represent a decrease in temperature as the altitude of the simulated flight increases.

The position to which shaft 1903 and the slider of potentiometer AT1 are turned representative of an assumed temperature for any altitude of flight, is indicated by the free air temperature indicators 1713, 1725, 1825 and 2125 on the bombardier's, copilot's, navigator's and instructor's instrument panels. These indicators are of the milliammeter type with their dials calibrated to read in degrees centigrade. To control them the potentiometer AT6 is provided in the air temperature motor unit, the slider of which is driven from shaft 1903 through gears 1906 and 1907. The winding of this potentiometer is energized in a circuit from the junction point between resistors 1909 and 1910 forming a potential divider connected between the +130 volt bus-bar and ground, thence through the potentiometer winding and resistor 1911 to ground. From the slider of potentiometer AT6 direct current potential which varies in accordance with the position of the slider and thus with the assumed air temperature is applied through resistor 1912 and over conductor 1913 through the winding of indicator 1825 at the navigator's station, over conductor 1826, through the windings of the indicators 1725 and 1713 at the copilot's and bombardier's stations, over conductor 1714, through the winding of indicator 2125 at the instructor's desk, and then through resistor 2126 to ground.

The air temperature motor unit is provided with additional potentiometers (not shown)

which are instrumental in controlling carburetor air temperature indicators for the four assumed engines.

Cruise

When a desired altitude has been reached and the pilot wishes to cruise at that altitude, he will adjust the engine throttles until the manifold pressure indicators show 33 inches of mercury and will adjust the propeller governors until the tachometers show about 1900 revolutions per minute. He will then move the cowl flaps controls to their closed positions so that as a result, the slider of the cowl flaps potentiometer CF2 of the cowl flap motor unit for each engine is operated by the motor 920 of such unit to the No. 1 or ground terminal of its winding thereby reducing the phase φ2 potential applied from such slider over conductor 910 and through resistor 1521 to signal input conductor 1522 of the thrust motor control circuit of Fig. 15, to zero, representative of the removal of the drag imposed by the slip stream from the propeller engaging the engine cowl flaps when such flaps are open. To supply this phase φ2 potential, the winding of true airspeed variac TAS10 is energized by potential applied thereto from the 40φ2 bus-bar and the potential derived at the slider of the variac, which will vary as the true airspeed, is applied over conductor 710, through resistor 911 and thence in parallel through resistor 912 and the winding of potentiometer CF2 to ground. At this time with the airspeed in excess of 50 knots, cam 765 on the slider shaft of the indicated airspeed variac IAS7 will have released the contact set AS to open the circuit extending from ground thereover and over conductor 766 through the winding of the AS relay 635 of the bank motor unit, thereby removing the direct ground connection over the lower contacts of relay 635 from conductor 910. Phase φ2 potential is in a similar manner removed from other conductors corresponding to conductor 910 and from the signal input conductor 1522 when the cowl flaps controls of the other three engines are operated to their closed positions. The motor 1520 of the thrust motor unit is now controlled by the removal of the phase φ2 drag potential to rotate shaft 1523 in a direction representative of the increase in thrust which would be developed by the engine driven propellers incident to the closure of all of the engine cowl flaps. The movement of the shaft 1523 and the consequent movement of the slider of thrust potentiometer T5 towards the No. 3 terminal of its winding, representative of an increase in thrust, increases the phase φ2 potential applied through resistor 801 to signal input conductor 1452 of the indicated airspeed motor control circuit whereby the motor 1450 thereof rotates the shaft 1459 in a direction representative of the slight increase in indicated airspeed resultant upon removing the drag of the open engine cowl flaps.

The pilot will then push the control 2006 forward slightly to hold the horizon bar of the gyro-horizon instrument 1622 at a point corresponding to an indicated airspeed of 150 to 160 knots with a zero rate of climb. The horizon bar will be very nearly in line with the horizontal marks on the ring outside the face of the artificial horizon. The elevator control will at this time be in approximately its neutral position. Upon the movement of the control the slider of potentiometer EL is moved toward the electrical center of its winding thereby reducing the phase φ2 potential applied from the slider thereof through resistor 1302 to signal input conductor 1301 of the rate-of-pitch motor control circuit. The motor 1300 of the latter circuit will thereupon operate in a direction representative of a negative rate of pitch and the slider of the rate-of-pitch potentiometer RP7 will apply potential of phase φ2 through resistor 1559 to signal input conductor 1552 of the angle of attack motor control circuit. The motor 1550 of the angle of attack motor circuit will thereupon rotate the sliders of the potentiometers controlled thereby toward the No. 1 terminals of their windings until the slider of potentiometer AA5 reduces the balancing potential of phase φ2 applied from such slider through resistance 823 to conductor 1552, to a value such that a potential balance on conductor 1552 is again attained. The shaft 1553 will now be positioned to represent a reduction in the angle of attack.

As previously described, the adjustment of the slider of angle of attack potentiometer AA8 results in a decrease in phase φ1 potential applied from its slider through resistor 824 to signal input conductor 1301 of the rate-of-pitch motor control circuit to cause a change in the rate of pitch and the angle of attack and rate-of-pitch circuits will as previously described interact until a value of angle of attack is attained in which the rate of pitch is reduced to a zero value.

As a result of the change of the angle of attack and the movement of the slider of angle of attack potentiometer AA5 toward the No. 1 terminal of its winding, the phase φ2 potential applied under the control of such potentiometer through resistors 701 and 609 to signal input conductor 608 of the true rate-of-climb motor unit becomes decreased and the motor 600 of the rate-of-climb motor unit operates in a direction representative of a reduction in rate of climb and through its control of the indicated rate-of-climb motor circuit causes the rate-of-climb indicators to show a reduction in the rate of climb.

As a further result of the reduction of angle of attack, the sliders of the angle of attack potentiometers AA1 and AA2 are moved toward the No. 1 terminals of their windings thereby reducing the phase φ1 potential applied from the slider of potentiometer AA2 through resistor 806 to signal input conductor 1452 of the indicated airspeed motor unit whereupon the motor 1450 of such unit operates in a manner representative of the increase in indicated airspeed resulting from the reduction of the angle of attack until the sliders of the indicated airspeed variacs IAS7 and IAS8 increase the phase φ1 potential applied through resistor 806 to conductor 1452 to restore the potential balance on such conductor.

This increase in indicated airspeed causes an increase in phase φ2 potential derived at the slider of indicated airspeed variac IAS3 and applied as previously described to the upper portion of the winding of angle of attack potentiometer AA5 and a consequent increase in the phase φ2 potential derived at the slider of potentiometer AA5 and applied to the signal input conductor 608 of the true rate-of-climb motor control circuit and to the signal input conductor 1552 of the angle of attack motor control circuit. The increase in potential applied to conductor 608 causes the motor 600 of the true rate-of-climb motor unit to run in a direction representative of the slight increase in rate of climb due to the increase in indicated airspeed and to consequently cause the rate-of-climb indicators to show such an increase in rate of climb. As a result of the increase in rate of climb the phase $\varphi1$ potential derived at the slider of the rate-of-climb potentiometer RC1 and applied as previously described through resistor 1453 to signal input conductor 1452 of the indicated airspeed motor unit, becomes increased, representative of the increase in drag due to the simulated increase in the rate of climb. This increase in phase $\varphi1$ potential causes the motor 1450 to run in a direction representative of a decrease in indicated airspeed.

In this manner the rate-of-climb and indicated airspeed motor units interact until after 30 to 60 seconds a state of stabilization is reached. During this period the airspeed indicators and rate-of-climb indicators on the instrument panels will show fluctuating readings, the fluctuations slowing down until steady readings are reached representative of a zero rate of climb and an airspeed of between 150 and 160 knots.

*Turns*

It will now be assumed that the pilot desires to simulate a turn. In an airplane any turn is indicated by the rate-of-turn indicator and by the compass system. The compass system includes a flux-gate master indicator operable from an inductor compass, remote indicating compasses controlled from the master indicator, directional gyro compasses and magnetic compasses. In the trainer a compass system is provided which simulates these various types of compasses which system is controlled by a compass motor unit responsive to a potential which is a function of the rate of pitch, rate of turn and bank angle. The effect of rate of pitch increases as the bank angle increases whereas the effect of rate of turn decreases as the bank angle increases. The motor unit telemetrically controls the flux-gate master indicator whereby the remote indicating compasses are controlled subject to magnetic connections made by the navigator and magnetic directions imposed by the instructor, telemetrically controls the directional gyro-compasses and telemetrically controls the magnetic compasses.

A turning error is introduced into the pilot's magnetic compass circuit by the effect of the field produced by two small coils mounted in the compass unit. The current through the coils is controlled by a potentiometer on the rate-of-turn motor unit as will be later described and is proportional to the rate of turn. With this provision no turning error will be produced on an east or west course and a maximum error of approximately 30 degrees will occur on fast turns from a north or south course. An additional error representing the variation of the horizontal component of the earth's magnetic field with change in location can be introduced by the instructor as previously stated.

The tendency of the directional gyro-compasses to drift away from the true heading is simulated by a slow speed motor and differential gear box to which the synchro-transmitter of the telemetric system which drives such compasses is attached to the compass motor unit.

The remote indicating compass at the pilot's station follows the master indicator at the navigator station and gives the true heading when the navigator has made the correct variation compensation at the flux-gate master indicator.

Before flying any turns the flux-gate compass system at the navigator's station should be tested. This system, disclosed schematically in Fig. 18, uses the standard flux-gate master indicator used in an airplane for controlling the operation of the remote indicating compasses from an earth inductor compass. It is provided with a coupling autosyn CA which, in an airplane would be controlled from the earth inductor compass, a servo amplifier AMP controlled by such autosyn, a servomotor SM controlled by such amplifier and a transmitting autosyn TA operated by the motor and arranged to be coupled with the synchro-receivers 1627 and 2127 which operate the remote indicator compass 1628 at the pilot's station and the true heading compass 2128 at the instructor's desk. The stator of the transmitting autosyn TA is rotatable by a magnetic variation knob MV which the navigator may turn to introduce the variation correction from the magnetic heading to cause the remote indicating compass to show the true heading. For the New York area, this variation is 10 degrees west. The navigator, therefore, turns the knob MV until the pointer in the master indicator shows this variation. The rotor windings of transmitter TA and synchro-receivers 1627 and 2127 being energized from the 28G and 28V bus-bars, the rotation of the stator of transmitter TA, the windings of which are connected over the 28G bus-bar and conductors 1804 and 1805 with the stator windings of receiver 1626, causes such receiver to operate the remote indicating compass 1628 at the pilot's station to indicate the corrected heading. The instructor by the operation of key 2129 to its alternate or pilot's remote compass position may also connect the stator windings of receiving autosyn 2127 to conductors 1804 and 1805 whereby such receiver is also controlled by the transmitting autosyn TA so that the true heading compass 2128 at the instructor's desk indicates the same corrected heading as the master indicator at the navigator's station. This compass should not show a variation of more than 3 degrees from its former reading. The key 2129 is then restored to its true heading or normal position.

The directional gyro-transmitter DG in the compass motor unit of Fig. 10 controls the directional gyro-compass 1615 at the pilot's station. In an actual airplane this instrument is set by the pilot to a position corresponding to the reading of the magnetic compass and maintains such reading by gyroscopic operation. This instrument has a tendency to drift away from the correct heading at a rate not exceeding 3 degrees in 15 minutes. This is caused by a phenomenon common to gyroscope operated instruments called "precession" and it requires the instrument to be reset periodically to agree with the magnetic compass. In the trainer this drift is simulated by a small slow speed continually running motor 1031 which, through reduction gear box 1032 and gears 1033 and 1034, drives one input shaft of a differential gear box 1036, the other input shaft 1037 of which is driven from the shaft 1030 of the compass motor unit. The output shaft of the gear box 1036 is connected to the rotor of transmitter DG. The motor 1031 thus causes the rotor of transmitter DG to continually add a small increment of rotation to the rotation imposed by the shaft 1030 of the compass motor unit. The stator windings of transmitter DG are connected over bus-bar 28G and conductors 1038 and 1039 with the stator windings of synchro-receiver 1614 which drives the compass 1615. With the rotor windings of transmitter DG and receiver 1614 both energized from the 28G and 28V bus-bars, the rotor of the transmitter DG causes the movement of the rotor of the receiver 1614 to operate the directional gyro-compass to show a drift of about 3 degrees every 15 minutes from the heading shown by the magnetic compass 1612.

The instructor may at any time introduce a magnetic variation which will affect the readings of the magnetic and remote indicating compasses 1612 and 1628 at the pilot's station by the operation of either the INC WEST or INC EAST variation key 2130 or 2136 until the magnetic variation indicator 2132 at the instructor's desk shows the desired variation. If the key 2130, for example, is operated, a circuit is established from ground thereover, over conductor 2133, through the stator winding 1011 of the motor 1010 and through resistor 1012 to the 40φ1 bus-bar. The motor 1010 thereupon operates and through the reduction gear box 1013 and gears 1014 and 1015 rotates the rotor winding of the synchro-transmitter V. The stator windings of this transmitter are connected over the 28G bus-bar and conductors 1016 and 1017 with the stator windings of the synchro-receiver 2131 which drives the remote indicating magnetic compass 2132 at the instructor's desk. The rotor windings of transmitter V and receiver 2131 are both energized from the 28G and 28V bus-bars. When the compass 2132 shows the desired variation, the instructor will release key 2130 to arrest the operation of motor 1010.

The motor 1010 also through gears 1014 and 1018 drives one input shaft 1019 of the differential gear box 1020 whereby gear 1021 on the output shaft of the gear box through gears 1022 and 1023 drives the rotors of the synchro-transmitters MH and MC. The stator windings of the transmitter MC are connected over bus-bar 33G and conductors 1024 and 1025 with the stator windings of the synchro-receiver 1611 which drives the magnetic compass 1612 on the pilot's instrument panel and, with the rotor windings of the transmitter MC and receiver 1611 both energized from the 33G and 33V bus-bars, the compass 1612 is operated to indicate the true magnetic heading including the magnetic variation imposed by the instructor.

The stator windings of the synchro-transmitter MH are connected over the 28G bus-bar, over back contacts of the DFG relay 1028 and conductors 1026 and 1027 with the stator windings of the coupling autosyn CA of the master flux-gate indicator at the navigator's station. In the trainer the synchro-transmitter MH, differentially driven from the shaft 1030 of the compass unit and from the magnetic variation motor 1010, is substituted for the flux-gate transmitter unit used in the airplane. With the rotor winding of transmitter MH energized from the 28G and 28V bus-bars, the signal transmitted by the rotation of such rotor winding is impressed from the rotor of the coupling autosyn CA upon the input of the amplifier AMP and the amplified signal output from the amplifier results in the energization of one phase winding 1806 of the servo-motor SM, 90 degrees out of phase with the other phase winding 1807 of such motor, with the result that the motor SM operates to turn the rotor of coupling autosyn CA until the null position is reached for such autosyn at which position the input signal to the amplifier AMP will be zero and the motor will stop. The motor SM in operating also rotates the rotor of transmitting autosyn TA to thereby control the remote indicating compass 1628 at the pilot's station.

The instructor may at any time simulate the failure of the master flux-gate indicator by operating the flux-gate disable key 2134 thereby establishing an operating circuit extending over conductor 2135 for the DFG relay 1029 which upon operating disconnects the stator windings of the synchro-transmitter MH from the stator windings of the coupling autosyn CA of the master indicator so that the master indicator will cease to function.

It is assumed that the true heading of the trainer before a turn is simulated is due north and that in the normal position of shaft 1030 of the compass motor unit, the rotor of the true heading synchro-transmitter TH is positioned by gears 1040 and 1041 so that through the stator windings, connected over bus-bar 28G, conductors 1042 and 1043 and the contacts of key 2129 in its normal or true heading position with the stator windings of synchro-receiver 2127 at the instructor's desk, the rotor of receiver 2127 positions the true heading remote indicator compass 2128 to show the normal due north heading.

It will be assumed that the pilot desires to make a 3 degree per second turn to the right. He will therefore depress the right rudder pedal 2001 and momentarily turn the aileron wheel 2006 in a clockwise direction. The movement of the rudder pedal will, as previously described, be imparted to the sliders of the potentiometers RD1 and RD2 and such sliders will be moved from the grounded center tap positions of their windings toward the No. 1 terminals of the windings. The upper portion of the winding of potentiometer RD1 is energized by potential of phase φ1 derived at the slider of the indicated airspeed variac IAS8 and which varies as the square of the airspeed, and applied through resistor 768 and over conductor 769 through the upper half of the potentiometer winding to ground and the lower half of the winding of the potentiometer is energized by potential of phase φ2 derived at the slider of indicated airspeed variac IAS3 and which varies as the square of the airspeed, and applied over conductor 769, through resistor 1476, over conductor 1477 and through the lower half of the potentiometer winding to ground. With the slider of potentiometer RD1 now positioned in the lower half of the potentiometer winding representative of a right turn, potential of phase φ2 is derived at such slider and applied over conductor 2092 and through resistor 1262 to signal input conductor 1263 of the rate-of-turn motor control circuit of Fig. 12. This potential is thus representative of the rudder moment and is proportional to the deflection of the rudder from neutral and varies as the square of the indicated airspeed.

Another factor which may influence the rate of turn is the unbalance of thrust developed by the engines on the opposite sides of the fuselage of an airplane. In the trainer this unbalance is represented by potentials applied to signal input conductor 1263 through resistors 1264 and 1265. The potential applied through resistor 1264 represents the thrust moment of the inboard engines 2 and 3 and the potential applied through resistor 1265 represents the thrust moment of the outboard engines 1 and 4. These moments are proportional to the engine brake horsepower divided by the true airspeed. If the engines are developing the same horsepower, the potentials applied through resistors 1264 and 1265 will be zero and no turning moment will be produced. To derive a potential to be applied through resistor 1264, phase φ2 potential is applied from the 40φ2 bus-bar through resistor 711, through true airspeed potentiometer TAS5, over conductor 712 and through resistor 842 to ground and the potential derived at the junction point between the potentiometer and resistor 842 is applied over conductor 843, through resistor 913 and the winding of the BH1 potentiometer of the No. 2 engine brake horsepower motor unit to ground. From the slider of potentiometer BH1, phase φ2 potential is applied over a front contact of the BHP relay 914 of the brake horsepower unit for the No. 2 engine, through resistor 915, over conductor 916, over the inner lower back contact of the BL relay 1260 and through resistor 1264 to the signal input conductor 1263 of the rate of turn motor control circuit. At the same time phase φ1 potential is applied from the 40φ1 bus-bar through resistor 713, through the winding of potentiometer TAS4, over conductor 714 and through resistor 844 to ground and the potential derived at the junction point between the potentiometer and resistor 844 is applied over conductor 845, through resistor 917 and the winding of the BH1 potentiometer of the No. 3 engine brake horsepower motor unit to ground. From the slider of this latter potentiometer phase φ1 potential is applied over a front contact of a relay similar to the BHP relay 914 of the brake horsepower unit for the No. 3 engine, through resistor 918 to conductor 916 and thence as traced through resistor 1264 to signal input conductor 1263. The potentials thus applied through resistor 1264 are of opposite phase and if the Nos. 2 and 3 engines are developing equal horsepower, these potentials will balance each other and no signal potential will be applied to conductor 1263 through resistor 1264.

Phase φ2 potential on conductor 843, which varies with the true airspeed, is also applied through the winding of the BH1 potentiometer of the No. 1 engine brake horsepower unit and this phase φ2 potential derived at the slider of this potentiometer is applied through resistor 919, over conductor 920, over the lower back contact of the BL relay 1260 and through resistor 1265 to signal input conductor 1263. Phase φ1 potential on conductor 845, which varies with the true airspeed, is also applied through the winding of the BH1 potentiometer of the No. 4 engine brake horsepower motor unit and the phase φ1 potential derived at the slider of this potentiometer is applied through resistor 921 and thence as traced over conductor 920 and through resistor 1265 to signal input conductor 1263. It is to be noted that series resistors between conductors 843 and 845 and the windings of the BH1 potentiometers of the Nos. 1 and 4 outboard engines are omitted so that the potentials derived at the sliders of such potentiometers are higher than those derived for similar settings of the potentiometers for the Nos. 2 and 3 inboard engines representative of the greater turning moment developed by the outboard engines. The potentials thus applied through resistor 1265 to signal input conductor 1263 are of opposite phase and if the Nos. 1 and 4 engines are developing equal horsepower these potentials will balance each other and no signal potential will be applied to conductor 1263 through resistor 1265. It will be assumed that at the time the pilot initiates the turning maneuver, the engines are all developing the same power and that there is therefore no turning moment due to the engines.

When the trainer is on the ground with the G3 relay 1259 operated, the rate of turn motor control circuit is subject to the effect of the application of the foot brakes represented by potential applied through resistor 1266 to signal input conductor 1263. To produce this potential phase φ2 potential derived at the slider of indicated airspeed variac IAS4 and which varies with the airspeed, is applied over the inner upper back contact of the ASN relay 750, through resistor 770 and over conductor 771 through the winding of the right foot brake potentiometer RB1 to ground and potential of phase φ1 derived at the slider of indicated airspeed variac IAS7 is applied over the inner lower back contact of relay 750, through resistor 772 and over conductor 773 through the winding of the left brake potentiometer LB1 to ground. The phase φ2 potential derived at the slider of potentiometer RB1 is applied to the junction point between resistors 2094 and 2093 of the series connected resistors 2093 to 2096, inclusive, and the phase φ1 potential derived at the slider of potentiometer LB1 is applied to the junction point between resistors 2095 and 2096. Any difference between these phase φ1 and φ2 potentials due to the unequal application of the brakes will therefore appear as a potential of either phase φ1 or phase φ2 at the junction point between resistors 2094 and 2095 and is applied over conductor 1267, over the inner upper back contact of the BL relay 1260 and the upper front contact of the G3 relay 1259 through resistor 1266 to signal input conductor 1263. Such potential will be effective to introduce a turning moment representative of the turning of an airplane when taxiing along the ground in response to the unequal application of the brakes. When both brakes are operated to their locked positions and the BL relay 1260 is operated, this turning moment is removed. Since, however, an airborne condition of flight has been assumed, the G3 relay 1259 will not be operated and the turning moment due to brake operation is removed at the upper contacts of relay 1259.

Under normal conditions when the flight is assumed to be on the ground with no airspeed, the ASN relay 750 of Fig. 7 will be operated and ground through resistors 774 and 775 will be connected over the inner front contacts of relays 750, through the windings of the indicated airspeed variacs IAS3 and IAS8 to ground, and consequently, no potential will be applied from the sliders of such variacs over conductors 751 and 776 and through resistors 555 and 556 to the terminals of potentiometer Y2 of the yaw motor unit and no potential will be connected over conductors 768 and 1477 as previously described to the terminals of the rudder potentiometer RD1 representative of rudder and side slip effects. Under this condition, the balancing potentiometer RT2 will cause the rate-of-turn motor unit to assume a position representative of a zero rate of turn. To accomplish this, the No. 1 terminal of the winding of potentiometer RT2 is connected over conductors 1268 and 710 with the slider of the true airspeed variac TAS10 at which potential of phase φ2 is derived as previously described, and the No. 3 terminal of the winding of potentiometer RT2 is connected over conductors 1269 and 715 with the slider of the true airspeed variac TAS9. When there is no airspeed the true airspeed motor unit is so arranged that its potentiometer sliders will be at a point away from their No. 2 terminals equivalent to a true airspeed of about 42 knots and consequently the phase $\varphi 1$ and phase $\varphi 2$ potentials will be applied to the terminals of the balancing potentiometer RT2 and a potential of either phase $\varphi 1$ or $\varphi 2$ dependent upon the position of the slider of potentiometer RT2 will be applied through the potential divider resistors 1270, 1271 and 1272 to ground and from the slider over conductor 1275, over the lower front contact of the ASN1 relay 617, conductor 636 and through resistor 1274 to the input conductor 1263. As a consequence the motor 1250 of the rate-of-turn motor circuit will be operated until the slider of potentiometer RT2 returns to the grounded mid-tap position of the winding whereupon the motor will stop.

It has been assumed, however, that the trainer pilot has simulated take-off and in cruising has started the simulation of a right turn by the depression of the right rudder pedal and that a phase $\varphi 2$ signal potential representative of the rudder operation has been applied through resistor 1262 to signal input conductor 1263 of the rate-of-turn motor control circuit. It will further be assumed that no potential is applied through resistors 1264 and 1265. The motor 1250 of the rate-of-turn motor unit will therefore be operated in a manner to turn shaft 1251 in a direction representative of a turn to the right thereby moving the sliders of all potentiometers driven thereby from their electrical center positions toward the No. 3 winding terminals of the potentiometer windings until the slider of balancing potentiometer RT2 reaches a position in which the phase $\varphi 1$ potential derived thereat and applied to signal input conductor 1263 through resistor 1274 balances the phase $\varphi 2$ signal potential. For applying this balancing potential, the slider of potentiometer RT2 is connected through the potential divider resistors 1270, 1271 and 1272 to ground and the phase $\varphi 1$ potential at the junction point between resistors 1270 and 1271 is applied over conductor 1273, over the lower back contact of the ASN1 relay 617 over conductor 636 and thence through resistor 1274 to signal input conductor 1263.

The rate of turn may also be influenced by any side slip or skid that may result on the turn. This is applied as a potential from the slider of the yaw potentiometer Y2 over conductor 557 and through resistor 1276 to signal input conductor 1263 of the rate-of-turn motor control circuit.

It will be recalled that to execute a right turn the pilot in addition to depressing the right rudder pedal 2001 also momentarily turned the aileron wheel 2006 in a clockwise direction. The turning of the aileron wheel through the operation of the potentiometer AL controls the operation of the rate-of-roll motor unit disclosed in Fig. 12. The rate-of-roll motor unit is controlled by potentials representing the rolling moment of the airplane. These are the moments produced by aileron movement and by side slip or skid.

Figure 20:
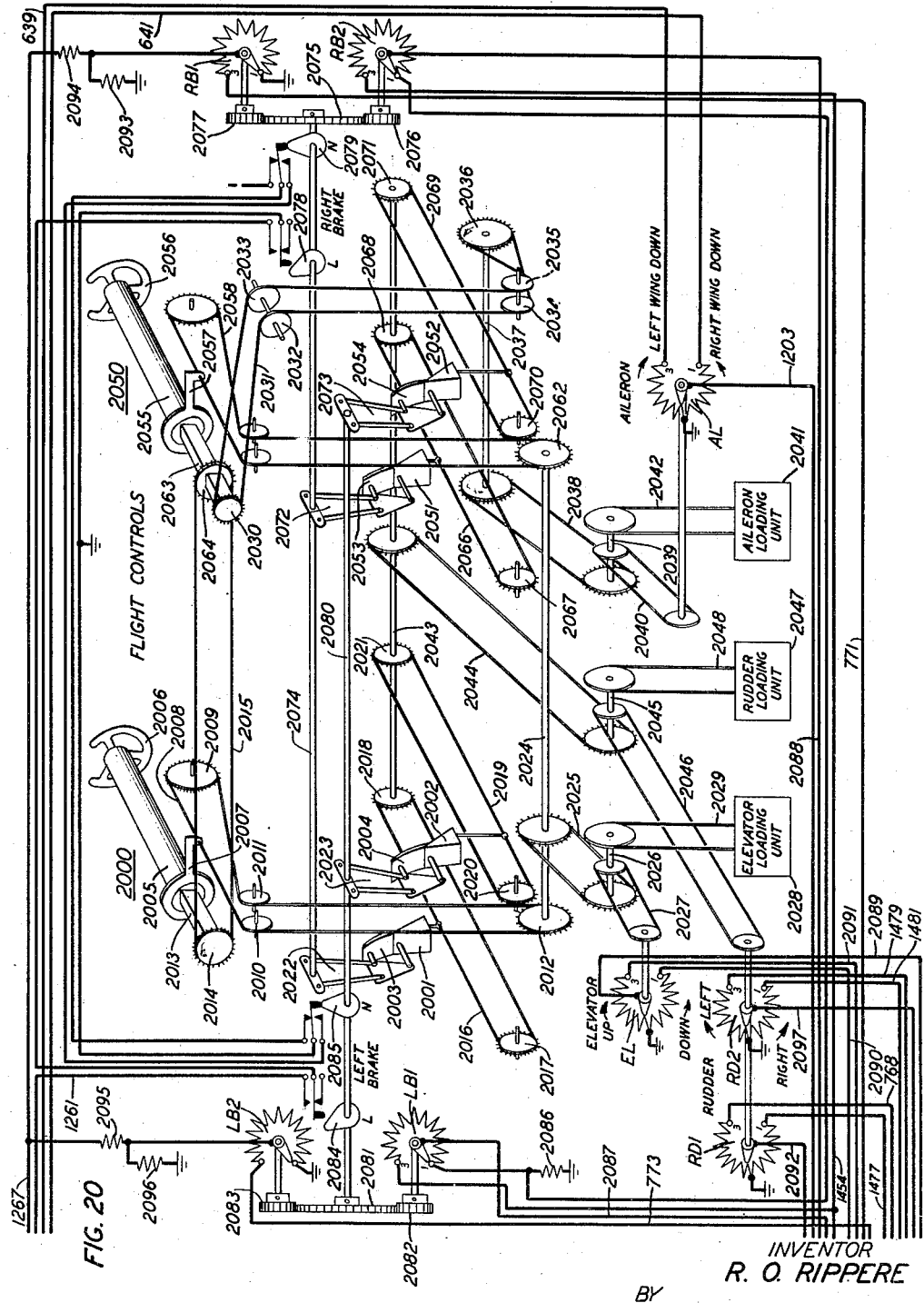
Fig. 20 shows the potentiometers operated mechanically by the elevator, rudder and aileron controls, the potentiometers operated mechanically by the right and left foot brake pedals, and a schematic representation of the elevator, rudder and aileron controls.

The potential which represents aileron moment is applied to signal input conductor 1201 through resistor 1202 and over conductor 1203 from the slider of the aileron potentiometer AL of Fig. 20 and will be of phase $\varphi 2$ on a left wing down movement of the slider toward the No. 3 terminal of the potentiometer, and will be of phase $\varphi 1$ on a right wing down movement of the slider toward the No. 1 terminal of the winding. To produce these potentials, the potential of phase $\varphi 2$ derived at the slider of indicated airspeed variac IAS4, is applied over conductor 777, over the inner upper back contact of the G5 relay 601, through resistor 638 and over conductor 639 through the upper portion of the winding of potentiometer AL to ground, and the potential of phase $\varphi 1$ derived at the slider of the indicated airspeed variac IAS7, is applied over conductor 778 over the inner lower back contact of relay 601, through resistor 640 and over conductor 641 through the lower portion of the winding of potentiometer AL to ground. The potential derived at the slider of potentiometer AL is thus proportional to the aileron deflection from neutral multiplied by the indicated airspeed. In the case assumed, the movement of the aileron wheel 2006 clockwise has rotated the slider of potentiometer AL towards the No. 1 terminal of its winding representative of a right wing down and therefore the derived potential applied to signal input conductor 1201 is of phase $\varphi 1$.

The moment potential representing yaw is applied to conductor 1201 through resistor 560 from the slider of yaw potentiometer Y10 and will be of phase $\varphi 2$ on a slip right movement of the slider toward the No. 1 terminal of the potentiometer winding and will be of phase $\varphi 1$ on a slip left movement of the slider toward the No. 3 of the potentiometer winding. To provide these potentials, the potential of phase $\varphi 2$ derived at the slider of indicated airspeed variac IAS4 is applied over conductor 777, through resistor 642 and over conductor 643 to the lower half of the winding of potentiometer Y10 to ground and the potential of phase $\varphi 1$ derived at the slider of the indicated airspeed variac IAS7 is applied over conductor 778, through resistor 644 and over conductor 645 through the upper half of the winding of potentiometer Y10 to ground. If a turn is executed properly there will be no side slip and the slider of yaw potentiometer Y10 will not therefore leave its normal ground tap position and ground potential will therefore be applied through resistor 560 to conductor 1201.

The rolling effects of rough air are represented by a variable potential of either phase $\varphi 1$ or $\varphi 2$ applied from the rough air circuit 1100 of Fig. 11 over conductor 1102 and through the potential divider resistors 1352 and 1353 to ground, the potential derived at the junction point between resistors 1352 and 1353 being applied over conductor 1354, through resistor 646, over the lower back contact of the G5 relay 601, over conductor 647 and through resistor 1204 to signal input conductor 1201 of the rate-of-roll motor control circuit.

It will be assumed that there is no moment due to side slip and no rough air condition imposed by the instructor and that therefore the only signal potential applied to conductor 1201 is that of phase $\varphi 1$ representative of a right wing down condition. The motor 1200 therefore responds to this potential and rotates shaft 1205 in such a direction as to move the slider of balancing potentiometer RR7 from its normal position at the electrical center of its winding toward the No. 3 terminal of its winding. Potential of phase $\varphi 2$ is applied to the upper No. 3 terminal of the winding of potentiometer RR7 from the junction point between resistors 1206 and 1207 connected between the $40\varphi 2$ bus-bar and ground and potential of phase $\varphi 1$ is applied to the lower No. 1 terminal of the potentiometer winding from the junction point between resistors 1208 and 1209 connected between the $40\varphi 1$ bus-bar and ground. Therefore upon the movement of the slider of potentiometer RR7 toward the No. 3 terminal of its winding, a balancing potential of phase φ2 is applied therefrom through resistor 1204 to signal input conductor 1201 until it balances the signal potential of phase φ1 when the motor 1200 will stop in the position representative of the rate of roll.

As the slider of potentiometer RR7 moves, it applies an increasing value of phase φ2 potential over conductor 647, over the lower back contact of the G5 relay 601, through resistor 646, over conductor 1354 and thence to the signal input conductor 1351 of the bank motor control circuit. In response to this potential the motor 1350 of the bank motor unit will rotate the shaft 1355 in a direction representative of a right wing down condition so long as the phase φ2 potential remains applied to signal input conductor 1351 by the rate-of-roll potentiometer RR7.

The amount of the angle of bank will be indicated by the bank unit of the gyro-horizon instrument 1622 at the pilot's station, the gyro-horizon instrument 1722 at the copilot's station and the gyro-horizon instrument 2122 at the instructor's desk. For remotely controlling these instruments the synchro-transmitters BKT1, BKT2 and BKT3 are driven by gears 1356 to 1360, inclusive, from shaft 1355. The stator windings of transmitter BKT1 are connected over the 33G bus-bar and conductors 1361 to 1362 with the stator windings of synchro-receiver 2123 which tips the horizon bar of the gyro-horizon instrument 2122 at the instructor's desk. The stator windings of transmitter BKT2 are connected over the 33G bus-bar and conductors 1363 and 1364 with the stator windings of synchro-receiver 1623 which tips the horizon bar of the gyro-horizon instrument 1622 at the pilot's station. Stator windings of transmitter BKT3 are connected over the 33G bus-bar and conductors 1365 and 1366 with the stator windings of the synchro-receiver 1723 which tips the horizon bar of the gyro-horizon instrument 1722 at the copilot's station. The rotors of these synchro-transmitters and synchro-receivers all being energized from the bus-bars 33G and 33V, the movement of the rotors of the transmitters will cause corresponding movements of the rotors of the receivers and the consequent tipping of the horizon bars of the gyro-horizon instruments.

When the pilot notes from the bank indicator of his gyro-horizon instrument that a desired angle of bank has been attained, he will return the aileron wheel 2006 to its neutral position thereby reducing the phase φ1 potential applied from the slider of aileron potentiometer AL to the signal input conductor 1201 of the rate-of-roll motor control circuit to a zero value. The motor 1200 will thereupon operate in a manner to return the slider of balancing potentiometer RR7 to the electrical center of its winding whereupon the motor will stop. With the slider of potentiometer RR7 thus positioned the phase φ2 potential applied to the signal input conductor 1351 of the bank motor control circuit is reduced to zero and the motor 1350 of such unit stops in the position representative of the desired angle of bank. This angle of bank will be maintained until the pilot later turns the aileron wheel 2006 in a counterclockwise direction.

It will be noted that when a ground condition of flight is simulated the G5 relay 601 will be operated and will remove all potential from the winding of the aileron potentiometer AL so that the aileron control 2006 will be ineffective to apply signal potential to the signal output conductor 1201 of the rate-of-roll motor control circuit and will also open the circuit over which potential from the rough air circuit may be applied to conductor 1201. The rate-of-roll motor unit will then be operated to rotate its shaft 1205 to the neutral position under the control of the balancing potentiometer RR7. Also with relay 601 operated, the potential from the slider of bank variac BK8 is applied over the lower front contact of relay 601, through resistor 646 and over conductor 1354 to the signal input conductor 1351 of the bank motor control circuit whereby the motor 1350 of such circuit is controlled to position the shaft 1355 in its neutral position and to thereby restore the horizon bars of the gyro-horizon instruments to level positions. To provide potential at the slider of variac BK8, the winding of such variac is bridged between the 40φ1 and 40φ2 bus-bars.

A further effect of rudder operation is to control the yaw motor unit. As previously stated the angle of yaw of an airplane is the angle between fore and aft axis of the airplane and the relative wind measured in the plane of the wings and fuselage. In other words it is the angle of side slip or skid. The yaw motor unit which solves for this angle is controlled by potentials representing the difference between the rate at which the airplane turns about its own axis perpendicular to the fuselage and wings and the rate of change of deviation of the line of flight in the fuselage-wing plane. The first of these rates is represented by a potential applied through resistor 558 to signal input conductor 559 of the yaw motor control circuit from the slider of the rate-of-turn potentiometer RT3. To derive this potential phase φ1 potential from the 40φ1 bus-bar is applied through the potential divider resistors 1278 and 1279 to ground and from the junction point between these resistors potential is applied to the No. 1 terminal of potentiometer RT3. Potential of phase φ2 is applied from the 40φ2 bus-bar through potential divider resistors 1280 to 1281 to ground and from the junction point between which resistors potential is applied to the No. 3 terminal of potentiometer RT3. Potential of either phase φ1 or phase φ2 is thus derived from the slider of potentiometer RT3 if there is any rate of turn and is applied to the junction point between resistors 1282 and 1283 of the potential divider which extends from ground through resistors 1282 and 1283, over conductor 1284 to the slider of bank potentiometer BK3 and thence in parallel through the portions of such potentiometer winding on either side of the point of slider engagement and thence through resistor 637 to ground. Potential derived between resistors 1282 and 1283 is then applied over the lower back contact of the G3 relay 1259, over conductor 1277 and thence through resistor 558 to signal input conductor 559 of the yaw motor control circuit.

The second of these rates is determined by considering the side forces affecting the airplane. These are centrifugal force, side force due to rudder deflection and angle of yaw, and the component of weight if the wings are not horizontal. The equation for such side forces is: Centrifugal force=weight (sine of the bank angle) +yaw force+rudder force. Substituting the factors which determine these forces, the following equation is derived $$MV \frac{d\psi}{dt} = W \sin \beta + K_1 \psi V_i^2 + K_2 \delta_R V_i^2$$

where mass $M = W/g$ or the weight divided by the gravitational acceleration;

$V_T$ is the true airspeed;

$\frac{d\psi}{dt}$ = the rate of change of direction of the line of flight in the fuselage-wing plane;

$W$ = the weight;

$\beta$ = the bank angle;

$\psi$ = yaw angle;

$\delta_R$ = the rudder deflection;

$V_i$ = indicated airspeed;

$K_1, K_2$ = constants of the airplane.

Dividing the above equation by $MV_T$ and solving for $$\frac{d\psi}{dt}$$

we have $$\frac{d\psi}{dt} = \frac{g \sin \beta}{V_T} + \frac{g}{W}(K_1\psi + K_2\delta_R)\frac{V_i^2}{V_T}$$

For circuit simplification the weight is assumed to be a constant and $V_T$ is assumed to be the equal of $V_i$. Then the above equation becomes $$\frac{d\psi}{dt} = \frac{g \sin \beta}{V_T} + (K_4\psi + K_5\delta_R)V_i$$

This equivalent of $$\frac{d\psi}{dt}$$

is used in the yaw motor control circuit.

The term $$\frac{g \sin \beta}{V_T}$$

of the above equation is represented by a potential derived at the slider of the bank variac BK8 modified by the true airspeed potentiometer TAS3 and applied through resistor 648 to signal input conductor 559 of the yaw motor control circuit. To determine this potential, which may be of either phase φ1 or phase φ2 dependent on whether the bank is for a right or left wing down condition, the winding of bank variac BK8 is bridged between the 40φ1 and 40φ2 bus-bars and the potential derived at the slider of such variac is applied over conductor 649, through resistor 717, through the true airspeed potentiometer TAS3 and through resistor 718 to ground. The potential thus derived at the junction point between resistor 718 and the slider of potentiometer TAS3 will vary in accordance with the term $$\frac{g \sin \beta}{V_T}$$

This potential is then applied over conductor 719 and through resistor 648 to signal input conductor 559.

The term $K_4\Psi V_i$ of the above equation is represented by potential derived at the slider of the yaw potentiometer Y10 and applied to conductor 559 through resistor 561. To determine this potential, which may be of either phase φ1 or phase φ2 dependent upon whether the slip is to the right or to the left, potential of phase φ1 derived at the slider of indicated airspeed variac IAS7 is applied as previously described through the upper half of the winding of potentiometer Y10 to ground and potential of phase φ2 derived at the slider of indicated airspeed variac IAS4 is applied as previously described through the lower half of the winding of potentiometer Y10 to ground. If there is a side slip to the right, phase φ2 potential will be derived at the slider potentiometer Y10 and applied through the potential divider resistors 562 and 563 to ground and from the junction point between such resistors through resistor 561 and thence to signal input conductor 559. If, on the other hand, there is a side slip to the left, phase φ1 potential will be derived at the slider of potentiometer Y10 and the derivation of such potential will be applied to conductor 559.

The term $K_5\delta R V_i$ of the above equation is represented by a potential derived at the slider of the rudder potentiometer RD2 and applied to conductor 559 through resistor 650. To determine this potential, which may be of either phase φ1 or phase φ2 dependent upon whether the rudder is deflected to the left or to the right, potential of phase φ1 derived at the slider of the indicated airspeed variac IAS7 is applied over the inner lower back contact of the ASN relay 750, conductor 779, resistor 1478, over conductor 1479 and through the upper half of the winding of rudder potentiometer RD2 to ground and potential of phase φ2 derived at the slider of indicated airspeed variac IAS4 is applied over the inner upper back contact of the ASN relay 750, over conductor 780, through resistor 1480 and over conductor 1481 through the lower half of the winding of potentiometer RD2 to ground. The potential thus derived at the slider of potentiometer RD2 is applied over conductor 2097, through resistor 651, over the upper back contact of the G5 relay 601 and through resistor 652 to ground, and potential derived between resistors 651 and 652 is applied through resistor 650 to signal input conductor 559 of the yaw motor control circuit.

It is to be noted that when a grounded condition of flight is being simulated, the G5 relay 601 will be operated and the potential representative of rudder deflection will be removed at the upper back contact of such relay and ground will be applied over the upper front contact of relay 601, through resistor 640 to conductor 559 in lieu of the bank potential. Also the G3 relay 1259 will be operated and will connect ground over its lower front contact, conductor 1277, through resistor 558 to conductor 559 in lieu of the potential representative of the rate of turn. The yaw motor unit will thereupon be controlled by potential applied to conductor 559 under the control of the yaw potentiometer Y10 to cause the motor 550 to drive the sliders of all potentiometers controlled thereby to the electrical centers of their windings at which time the slider of potentiometer Y10 will rest at the grounded mid-tap position and the motor 550 will come to rest.

If upon the execution of a turn the pilot has applied the proper amount of bank by the operation of the aileron control 2006 for the rudder deflection imposed by the depression of the rudder pedal 2001, the phase φ2 potential representative of the rate of turn and applied to signal input conductor 559, in the case assumed for a right turn, and the potential of phase φ2 representative of a right rudder deflection, will be slightly unbalanced by the phase φ1 potential applied to conductor 559 from the bank variac BK8 and representative of a right wing down condition for a right turn, and as a consequence the motor 550 of the yaw motor unit will operate in a manner to move the sliders of the potentiometers controlled thereby slightly towards the No. 1 terminals of their windings until the phase $\varphi2$ potential applied from the slider of potentiometer Y10 through resistor 561 to signal input conductor 559 provides a potential balance on conductor 559.

Should the pilot fail to bank properly, however, the phase $\varphi1$ and phase $\varphi2$ potentials applied to conductor 559 will be definitely out of balance. For example, if the pilot should underbank then the phase $\varphi1$ potential applied to conductor 559 under the control of bank variac BK8 will be less than the phase $\varphi2$ potentials applied to conductor 559 representative of the rudder deflection and rate of turn and the motor 550 of the yaw motor unit will move the sliders of yaw potentiometer toward the No. 1 terminals of their windings representative of a slip left until the phase $\varphi1$ potential derived at the slider of potentiometer Y10 again establishes a potential balance on conductor 559. Had the pilot over-banked so that a greater potential of phase $\varphi1$ was applied to conductor 559 then the potential on conductor 559 would have been predominantly of phase $\varphi1$ and the motor 550 would have rotated the slider of potentiometer Y10 toward the No. 3 terminal of its winding representative of a slip right until the the phase $\varphi2$ potential derived at the slider again establishes a potential balance on conductor 559.

The side slip is indicated to the pilot by the ball part of the turn and bank indicator 1601 operable under the control of the ball motor unit. As previously described, the ball or bank indicator of an airplane is an inclinometer consisting of a liquid-filled curved glass tube containing a ball. The position of the ball is determined by the curvature of the tube and the various forces acting on the ball. Its position is an indication of the lateral attitude of the airplane. If the ball is centered it indicates a properly banked turn while if it is in any other position it is an indication of the amount by which the actual bank angle differs from the correct angle. Because the trainer is motionless a special instrument is used in which the ball is arranged to be moved by a synchro-receiver. The movement of the synchro-receiver is controlled by the ball motor unit which, in turn, is controlled by potentials representing side forces on the airplane.

The ball movement is closely approximated by the following equation:

$$\text{Sine of the ball angle} = \text{sine of the bank angle} - \frac{\text{sidewise centrifugal force}}{\text{weight}}$$

The sidewise contrifugal force is equal to and opposite in direction to the sum of all the other side forces acting on the airplane. The equation of side force is: Centrifugal force= weight$\times$sine of the bank angle+yaw force+rudder force. When this equation for centrifugal force is substituted in the previous equation, the equation becomes:

$$\text{Sine of the ball angle} = \frac{\text{yaw force} + \text{rudder force}}{\text{weight}}$$

when the airplane is turning some rudder deflection is required to stream the rudder in the turn. Therefore the rudder displacement for zero force is dependent on the rate of turn. Taking this into account and assuming for the circuit under consideration that the weight is constant: Sine of the ball angle=$K_1 V_T$ (rate of turn) $-(K_2\psi + K_3\delta_R) V^2_1$, where $V_T$ is the true airspeed; $\psi$ is the yaw angle, $\delta_R$ is the rudder deflection, $V_i$ is the indicated airspeed, and $K_1$, $K_2$ and $K_3$ are constants of the airplane.

The rate of turn term of the above equation is represented by the potential applied from the junction point between resistors 1271 and 1272 of the potential divider comprising resistors 1270, 1271 and 1272 extending from the slider of the rate-of-turn potentiometer RT2 through such resistors to ground, through resistor 1285 to signal input conductor 1151 of the ball motor control circuit. The potential derived at the slider of potentiometer RT2 will be of phase $\varphi1$ if the turn is executed to the right, as assumed, or of phase $\varphi2$ if the turn is executed to the left. The potentials of phase $\varphi1$ and phase $\varphi2$ are supplied to the terminals of the potentiometer RT2 from the sliders of the true airspeed variacs TAS9 and TAS10 in the manner previously described.

The potential applied to signal input conductor 1151 through resistor 1286 from the junction point between resistors 1287 and 1288 of the potential divider connected from ground through such resistors, over the inner lower back contact of the G3 relay 1259 and over conductor 557 from the slider of the yaw potentiometer Y2, represents the yaw term of the above equation. As previously described, the potential derived at the slider of potentiometer Y2 may be of either phase $\varphi1$ or phase $\varphi2$ depending upon whether there is a left or right slip and varies with the square of the indicated airspeed. With a grounded condition of flight assumed, ground potential will be applied over the inner upper back contact of the G3 relay 1259, through resistor 1289 in lieu of a potential representative of the rudder deflection determined by the position of the slider of rate-of-turn potentiometer RT2.

It has been assumed that a turn has been executed to the right and that, therefore, the signal potential representative of this turn, applied through resistor 1285 will be of phase $\varphi1$. If the turn has been promptly executed the yaw potential for a right turn will be of phase $\varphi2$ and of a value which will balance the rate-of-turn potential. As a consequence there will be no potential effective to run the motor 1150 of the ball motor unit and there will be no deflection of the balls of the ball units of the bank and turn indicators. If, however, the pilot had underbanked, the yaw motor unit would have moved the sliders of the potentiometers driven thereby toward the No. 3 terminals of their windings thereby causing a greater value of phase $\varphi1$ potential to be applied from the slider of yaw potentiometer Y2 to the signal input conductor 1151 of the ball motor control circuit than the phase $\varphi2$ potential applied to such conductor from the rate-of-turn potentiometer RT2 with the result that the motor 1150 of the ball motor unit would turn the shaft 1152 in a direction representative of a ball movement to the left, which would result from a skid, until the slider of balancing potentiometer BL2 reaches a position in which the balancing potential of phase $\varphi2$ applied therefrom through resistor 1153 to signal input conductor 1151 provides a potential balance. To determine the balancing potential, the No. 3 terminal of the potentiometer BL2 has phase $\varphi2$ potential applied thereto from the junction point between potential divider resistors 1154 and 1155 and the No. 1 terminal has phase φ1 potential applied thereto from the junction point between potential divider resistors 1156 and 1157.

The balls of the turn and bank indicators are controlled by the synchro-transmitter BT, the rotor of which is driven from the shaft 1152 of the ball motor unit and energized from the 33G and 33B bus-bars and the stator windings of which are connected over the 33G bus-bar and conductors 1158 and 1159 with the stator windings of synchro-receivers 1602, 1702 and 2102 which drive the ball units of the turn and bank indicators 1601, 1701, 2101 at the pilot's, copilot's and instructor's stations. For an under-banked turn, as assumed, the balls would be moved to the left.

As the turn is executed the compass motor unit will be operated to control the movement of the compasses to an extent to show the changing course of the simulated flight. The compass motor unit is controlled by potentials representing the speed of change of a compass needle for any flight condition within the limits of the trainer. The compass heading is a function of the bank angle, rate of pitch and rate of yaw. The effect of rate of pitch on the airplane heading is dependent on the bank angle. For a given rate of pitch the compass heading change becomes greater as the angle increases. With zero bank angle the rate of pitch has no effect on the compass heading. The effect of rate of turn on the compass heading is also dependent on the bank angle. As the angle of bank increases the effect of rate of turn decreases becoming zero at an angle of 90 degrees. The summation of the effects described above give the compass heading as equal to the rate of turn multiplied by the cosine of the bank angle plus the rate of pitch multiplied by the sine of the bank angle, and determines the position of the compass motor unit which is an indication of the true heading. However, the gyro flux gate compass system, the magnetic compass and the directional gyro instrument have additional controlling features that simulate actual flight conditions.

The rate-of-turn effect is represented by potential applied through resistor 653 to signal input conductor 1001 of the compass motor unit. To determine this potential, potential of either phase φ1 or phase φ2 depending upon whether the turn is to the left or to the right, is derived at the junction point between resistor 1282 and the slider of rate-of-turn potentiometer RT3 and is applied through resistor 1283, over conductor 1284, through the bank potentiometer BK3 and resistor 637 to ground whereby the potential derived between resistor 1284 and the slider of potentiometer BK3 varies in accordance with the rate of turn multiplied by the cosine of the bank angle. This potential is then applied through resistor 653 to conductor 1001.

The rate-of-pitch effect is represented by a potential applied to conductor 1001, over conductor 1312 and through resistor 1311 from the slider of the rate-of-pitch potentiometer RP8. To derive a potential at the slider of potentiometer RP8 which shall vary as the rate of pitch multiplied by the sine of the bank angle, potential of phase φ1 derived at the slider of bank variac BK8 is applied over conductor 654 and through resistor 1313 to the No. 1 terminal of the winding of potentiometer RP8 and potential of phase φ2 derived at the slider of bank variac BK2 is applied over conductor 655 and through resistor 1314 to the No. 3 terminal of potentiometer RP8.

In response to these potentials, the motor 1000 of the compass motor unit turns the shaft 1030 in a direction representative of the compass heading of the simulated flight and through the gears 1044, 1045 and 1046 drives input shafts of the differential gear boxes 1020 and 1036. It will be recalled that the other input shaft 1035 of gear box 1036 is continuously driven by the motor 1031 and that therefore the output shaft of such gear box is driven in a manner representative of the summation of the movements of the input shafts, whereby the directional gyro-compasses are operated in the manner previously described. The output shaft of the differential gear box 1020 is driven in a manner representative of the summation of the movements of the input shafts whereby the synchro-transmitters MH and MC are operated as previously described in accordance with the compass heading determined by the movement of shaft 1030 and modified by the magnetic variation imposed by the instructor through the operation of motor 1010.

Shaft 1030 through gears 1040 and 1047 rotates the rotor of synchro-transmitter DST for the purpose of controlling the drift sight motor at the navigator's station as will be later described, and through gears 1048, 1049 and 1050, 1051 drives the rotatable transformers C and Y for introducing the compass headings into the ground speed and ground track motor control circuits as will be later described.

The magnetic compass is subject to a turning error which is normally present when turning off a northerly or southerly course. In the airplane, this is due to the action of the vertical component of the earth's magnetic field. On a banked turn off a northerly course the compass may show too slow a turn, no turn, or even a turn in the wrong direction whereas when turning off a southerly course the compass may show too fast a turn. Slow flat turns will not introduce this error to as great an extent. In the trainer the turning error is simulated by means of two small coils 1613 mounted like ear-muffs on the magnetic compass unit. The circuit through the coils is controlled by a potentiometer RT1 in the rate-of-turn motor unit and the potential derived is proportional to the rate of turn. The winding of potentiometer RT1 is energized from a source of direct current and the direct current potential derived at the slider of such potentiometer is applied over conductor 1290 to the upper terminals of the coils 1613, the lower terminals of which coils are connected to a junction point between resistors 1616 and 1617 of a direct current potential divider. With this circuit arrangement, no turning error will be produced on an east or west course and a maximum error of approximately 30 degrees will occur on a fast turn from a north or south course. An additional error representing the variation of the horizontal component of the earth's magnetic field with change in location can be introduced by the instructor by means of the magnetic variation keys 2130 and 2136 as previously described.

The ground track and ground speed motor control circuits and motor units disclosed in Figs. 2 and 3, which control the flight recorder at the instructor's desk disclosed in Fig. 21, are controlled by potentials representing the vectorial addition of the true airspeed and compass heading of the simulated flight and the ground wind velocity and direction. An additional controlling factor is a potential dependent upon the yaw angle of the simulated flight.

Potential representing the true airspeed of the flight is derived at the slider of true airspeed variac TAS7 of phase φ2 and is applied over conductor 720 through the rotor winding of the rotatable transformer C of the compass motor unit. The potential on the rotor will cause other potentials to be induced in the two stator windings and the magnitude of these potentials will be proportional to the components of the true airspeed in two directions 90 degrees apart which represent the north-south and east-west components of ground speed. These component potentials are applied over conductors 1052 and 1053 through resistors 317 and 318 to conductors 319 and 320.

Potential representing the effect of yaw is derived at the slider of yaw potentiometer Y3 and applied over conductor 764 through the rotor winding of the rotatable transformer Y of the compass motor unit. The potential on the rotor will cause other potentials to be induced in the two stator windings and the magnitude of these potentials will be proportional to the components of the true airspeed as modified by the yaw in two directions 90 degrees apart which represent the north-south and east-west components of ground speed. These component potentials are applied over conductors 1054 and 1055 through resistors 321 and 322 to conductors 319 and 320. To derive the potential at the slider of yaw potentiometer Y3, which may be in either phase φ1 or phase φ2, the upper portion of the winding of potentiometer Y3 is energized by potential of phase φ1 applied from the slider of true airspeed variac TAS9, over conductor 721, and the lower portion of the winding of potentiometer Y3 is energized by potential of phase φ2 applied from the slider of the true airspeed variac TAS7 over conductor 722.

Figure 17:
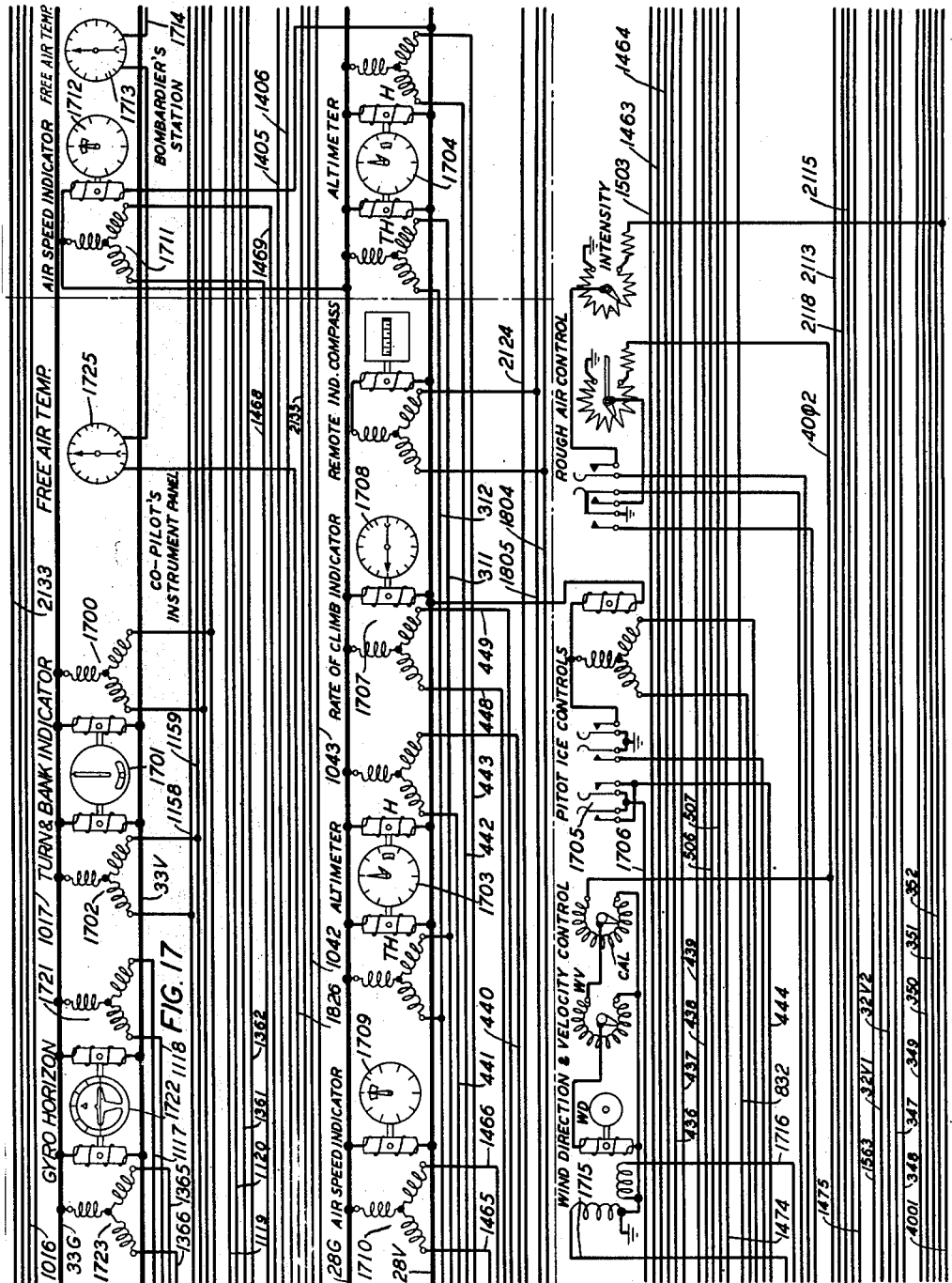
Figure 18:
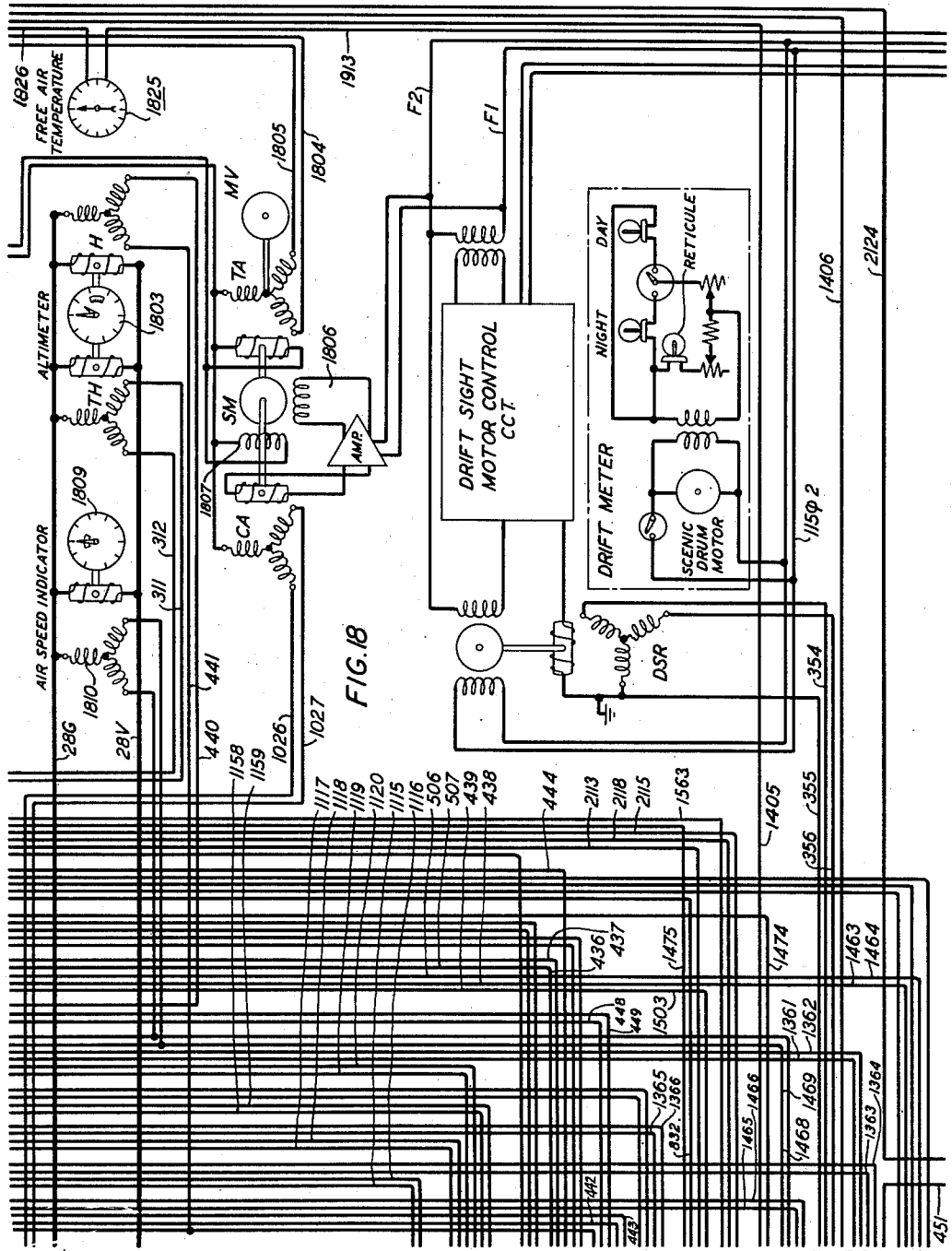
Fig. 18 shows schematically instruments and synchro-receivers for operating them, the flux gate master indicator and drift sight apparatus positioned at the navigator's station in the trainer.

The ground wind is similarly separated into two 90-degree components by the wind direction rotary transformer WD at the instructor's desk, Fig. 17. Potential of phase φ2 is applied from the 40φ2 bus-bar through the winding of the calibrating transformer CAL to ground and potential derived at the slider of such transformer is applied through the winding of the wind velocity control transformer WV, from the slider of which, potential of phase φ2 which varies in accordance with the wind velocity value selected by the instructor, is applied through the rotor winding of rotary transformer WD. The potential on the rotor of this transformer will cause other potentials to be induced in the two stator windings and the magnitude of these potentials will be proportional to the components of the wind velocity in two directions 90 degrees apart, which represent the north-south and east-west components of wind velocity. These component potentials are applied over conductors 1715 and 1716 and through resistors 323 and 324 to conductors 319 and 320.

The summation of the three potentials applied to conductor 319, through resistors 317, 321 and 323 and the summation of the three potentials supplied to conductor 320 through resistors 318, 322 and 324 now represent 90-degree components of the velocity and direction of motion of the simulated flight with respect to the earth and these summation potentials are applied through resistors 325 and 326, through the stator windings of the ground speed rotary transformer GST operable by the ground speed motor unit to determine the ground speed and are applied through resistors 327 and 328, through the stator windings of the ground track rotary transformer GTT operable by the ground track motor unit to determine the ground track.

The two component potentials being connected to the stator windings of transformer GTT through resistors 327 and 328, the current in the transformer circuit is limited and a phase shift of practically 90 degrees from the original potential to the input potential for the ground track motor control circuit will be secured. The phase shift is necessary for the operation of the two-phase motor GT connected to the output of the ground track motor control circuit shown in the lower portion of Fig. 2. The stator potentials induce a potential in the rotor whose phase and magnitude depend upon its angular position. The potential is amplified in the ground track motor control circuit and the amplified potential with its phase shift of 90 degrees is connected to the stator winding of the two-phase motor GT. The other phase winding of motor GT is connected to a source of 16-volt, 60-cycle supply, provided at the right half of the secondary winding of transformer S1TR. The primary winding of transformer S1TR is energized from the F1 and F2 bus-bars. This causes the motor GT, through the gears 307, 308, 329 and 330 to turn shaft 331 and through gears 332 and 333 to turn the rotor of transformer GTT until the rotor potential becomes zero. At this point the amplified potential is zero and the motor should come to rest. However, the inertia of the motor circuit may cause the motor to oscillate or hunt before a balance is reached and in order to eliminate this the motor GT, through gears 308 and 334, operates the two-phase motor FB2 as a generator which feeds a potential from its horizontal stator winding 335 over conductor 336 to the control grid of tube VT15 of the ground track amplifier circuit of such a phase that it stabilizes the operation of the motor. The other phase winding of the motor FB2 is energized over conductors 337 and 338 from the secondary winding of transformer TR4 which supplies filament heating current to tubes VT4 and VT14.

The ground speed rotatable transformer GST is also geared through gears 339 and 340 to shaft 331 driven by the motor GT but the rotor is placed 90 electrical degrees from the rotor of the GTT transformer. Because of this, when the ground track motor GT has driven the shaft 331 to a point where transformer GTT rotor potential is zero, the rotor potential of transformer GST will be a maximum and proportional to the ground speed. The flight velocity and direction components of potential are connected to the stator windings of transformer GST through resistors 325 and 326 which perform the same function for the ground speed unit as the resistors 327 and 328 previously mentioned performed for the ground track circuit. The stator potentials induce a potential in the rotor circuit whose phase and magnitude depend on its angular position. This potential is amplified in the ground speed motor control circuit and then applied to one phase of the two-phase induction motor GS1 of the ground speed motor unit. The other phase of the motor being energized from the left half of the secondary winding of transformer S1TR, the motor will run as long as airspeed is maintained and through gear box 300 will turn shaft 341. In order to provide stable speed control of this motor a second motor FB1 is coupled through gears 342, 343 and 344 to run as a generator which feeds back a potential from one of its stator windings over conductors 345 and 346 and through rheostats R1 and CAL to the control grid of tube VT4 of the ground speed motor control circuit. The resistor 200 and condenser 201 are provided in the feedback circuit to get the proper phase shift for the feedback potential.

The rotation of shaft 331 of the ground track motor unit is communicated through gears 330, 329, 309 and 310 to the rotor of synchro-transmitter GTST. The stator windings of this transmitter are connected over bus-bar 32V2 and conductors 347 and 348 with the stator windings of the synchro-receiver 2107 of the flight recorder at the instructor's desk. With the rotor windings of the transmitter and receiver energized over the 32V1 and 32V2 bus-bars connected to the secondary winding of power supply transformer TR1, the primary winding of which is energized from the F1 and F2 bus-bars, the steering wheel of the flight recorder is oriented.

The rotation of shaft 341 through the gears 301, 302, 303 and 304 turns the rotors of synchro-transmitters GS4 and GS27, the stator windings of which may be connected to the stator windings of the synchro-receivers 2103 and 2104 as described by the operation of either relay 305 or 306 over conductors 351 or 352 under the control of switch 2105 at the instructor's desk, so that a speed of 4 or 27 nautical miles per inch may be represented by the movement of the flight recorder in response to the operation of the synchro-receivers 2103 or 2104. The stator windings are connected over conductors 349 and 350 and bus-bar 32V2 and the rotor windings are energized from the 32V1 and 32V2 bus-bars.

When the trainer is not in flight the G4 relay 1551 in the angle of attack motor unit is operated and ground supplied over its upper back contact over conductor 1563 and through the flight recorder key 2106 at the instructor's desk is removed and, therefore, neither relay 305 or 306 may be operated. Consequently, the flight recorder ground speed synchro-receivers are disabled. The flight recorder may also be disabled in flight by the operation of the flight recorder key 2106. These disabling devices provide means for preventing movement of the flight recorder except when the trainer is in flight and the instructor is at the desk.

A further result of the operation of the ground track and compass motor units is to control the drift sight simulating means at the navigator's station. The indicated angle of drift is the difference in angle between the ground track direction and the compass heading. This difference is secured electro-mechanically by means of a differential synchro DIS geared to the ground track motor unit shaft 331 through the gears 332 and 353. A potential which is representative of the compass heading is produced in the stator of the synchro-transmitter DST the rotor of which is geared by gears 1040 and 1047 to the shaft 1030 of the compass motor unit. This potential is transmitted over conductors 1056 and 1057 and bus-bar 28G to the stator windings of the differential synchro DIS and impressed upon the rotor windings of such synchro. The rotor windings being rotated by gears 332 and 353 from the ground track motor shaft 331, the potential induced into such rotor windings will be a function of both the compass heading potential and the position of the differential synchro. Since the compass heading potential is a function of the rotor position of the synchro-transmitter DST the induced potential in the differential synchro DIS is a function of the relative positions of the rotors of both devices or of the rotation positions of the compass and ground track motor shafts. As used in this circuit, the potential induced in the rotor of the differential synchro is proportional to the difference between the positions of the ground track and compass motor unit shafts.

This potential is impressed over conductors 354, 355 and 356 upon the stator windings of the synchro-receiver DSR which drives the motor of the drift sight to rotate a bracket which supports the revolving landscape drum of the drift sight. A drift sight of this type has been fully disclosed and described in the application of Davis, Fogarty and Rippere, Serial No. 542,986, filed June 30, 1944.

*Climbing while turning*

It will now be assumed that while on a climbing flight as previously described, the pilot also moves the aileron wheel 2006 in a clockwise direction and depresses the right rudder pedal 2001 so that a climbing right turn is simulated with the correct angle of bank for the turn. When the desired rate of turn has been attained, the pilot will, as previously described return the aileron wheel to its neutral position. It will be recalled that on a climbing maneuver without any turn, the potential which affected the true rate-of-climb motor unit was of phase $\varphi 2$ and was applied under control of the angle of attack potentiometer AA5 through resistor 609 to signal input conductor 608 of the true rate-of-climb motor unit and that this potential was unmodified by the bank potentiometer BK7. Now, however, with a bank angle and the slider of bank potentiometer BK7 moved away from the grounded center tap position of the potentiometer winding, and thereby adding resistance to the potential divider extending from the slider of angle of attack potentiometer AA5, over conductor 825, the inner upper back contact of the S relay 809, conductor 826, through resistor 701, over conductor 702 through resistor 612 and a portion of the winding of potentiometer BK7 to ground, whereby the potential applied through resistor 609, therefore, becomes decreased. This potential also becomes decreased by phase $\varphi 1$ potential derived at the slider of bank potentiometer BK7 through the two halves of the winding which are energized in parallel over a circuit extending from the grounded midtap over the two halves of the potentiometer winding, through resistor 613 and to the junction point between resistors 656 and 657 of the potential divider connected to the $40\varphi 1$ bus-bar.

At the same time the phase $\varphi 1$ potential applied to conductor 608 through resistor 611 will be increased due to the decrease in resistance imposed by the bank potentiometer BK1, the increase of current flowing therein and the consequent reduction of drop potential through resistor 615.

The net result of these potential changes on signal input conductor 608 is that the motor 600 of the true rate-of-climb motor unit will rotate the sliders of the potentiometers driven thereby in a direction representative of a reduction in the rate of climb.

The reduction in the rate of climb causes the indicated rate-of-climb and altimeter motor units to readjust their shafts to positions representative of a slower rate of climb and a slower increase in altitude as indicated by the rate-of-climb indicators 1608, 1708 and 2120 and the altimeters 1603, 1703, 1704, 1803 and 2117 driven telemetrically by the shafts of the indicated rate-of-climb and altimeter motor units.

Another effect of banking while climbing is to cause a reduction in the angle of attack. As the bank angle increases and the slider of bank potentiometer BK1 moves towards the No. 1 or No. 3 terminal of its winding, the current flowing through the circuit from the junction point between resistors 615 and 624, over the slider potentiometer BK1, through the upper and lower portions of the winding of such potentiometer in parallel and through resistor 658 to ground increases and consequently the potential applied from the junction point between resistor 624 and the slider, over conductor 835, over the inner back contact of the G1 relay 800 and through resistor 822 to signal input conductor 1552 of the angle of attack motor control circuit is reduced. The motor 1550 of the angle of attack motor unit will, therefore, rotate shaft 1553 in a direction representative of a reduction in the angle of attack. The reduction in the true rate of climb and in the angle of attack will reduce the phase $\varphi 1$ drag potential applied through resistor 1453 under the control of the rate-of-climb potentiometer RC1 and through resistor 806 under the control of the angle of attack potentiometers AA1 and AA2 to signal input conductor 1452 of the indicated airspeed motor control circuit whereupon the motor 1450 will be operated to rotate the shaft 1459 in a direction representative of an increase in indicated airspeed.

A further effect of the increase of bank angle is to decrease the phase $\varphi 1$ potential which is applied through resistor 625 to the signal input conductor 1112 of the pitch bar motor control circuit. This is brought about by the reduction of the resistance of the potential divider extending from the slider of the angle of attack potentiometer AA11 through resistor 839, over conductor 840, through the bank potentiometer BK10 and resistor 630 to ground, whereby the potential applied from the slider of potentiometer BK10 through resistor 625 to conductor 1111 becomes reduced to cause the motor 1110 of the pitch bar motor unit to turn the shaft thereof in a direction representative of a lowering of the horizon bars of the gyro-horizon instruments. The reduction in angle of attack also augments this action through the movement of the slider of angle of attack potentiometer AA11.

*Return to straight flight from a right turn*

It will be assumed that when the pilot has made a turn of the desired amount he moves the aileron wheel 2006 in a counterclockwise direction and depresses the left rudder pedal 2002 to its normal position. It will be assumed that at this time a level flight is being flown. The depression of the left rudder pedal moves the sliders of rudder potentiometers RD1 and RD2 to the center positions of their windings, whereby the potential of phase $\varphi 2$ derived at the slider of potentiometer RD1 in the manner previously described and applied through resistor 1262 to signal input conductor 1263 of the rate-of-turn motor control circuit is removed. The potential of phase $\varphi 1$ applied from the slider of balancing potentiometer RT2 through resistor 1274 now becomes effective to cause motor 1250 to turn shaft 1251 of the rate-of-turn motor unit back to its normal position whereupon the slider of potentiometer RT2 will be at the grounded center tap position of its winding and the motor 1250 will stop. Through the return of shaft 1251 to its normal position, the rate-of-turn needles of the turn and bank indicators 1601, 1701 and 2101 will be operated to show a zero rate of turn.

The return of the slider of rudder potentiometer RD2 to its center tap position causes the reduction of the phase $\varphi 2$ potential applied therefrom as previously described through resistor 650 to signal input conductor 559 of the yaw motor control circuit to ground potential. With the return of the slider of rate-of-turn potentiometer RT3 to the electrical center position of the potentiometer winding the phase $\varphi 2$ potential derived at the slider of such potentiometer RT3 and applied through resistor 558 to signal input conductor 559 is reduced to zero. The movement of the aileron wheel in a counter-clockwise direction also moves the slider of aileron potentiometer AL toward the No. 3 terminal of its winding whereby potential of phase $\varphi 2$ is applied through resistor 1202 to signal input conductor 1201 of the rate-of-roll motor control circuit. It will be assumed that the pilot has applied the proper amount of aileron control and that, therefore, there is no side slip when he comes out of the turn and that, therefore, the sliders of the yaw motor unit are at the centers of their windings. Under this condition, ground potential will be applied from the slider of yaw potentiometer Y10 through resistor 560 to signal input conductor 1201 of the rate of roll motor control circuit and the phase $\varphi 2$ potential applied to conductor 1201 under the control of the aileron potentiometer AL will, therefore, cause the motor 1200 to rotate shaft 1205 in a direction representative of a rolling of the airplane to the left until the phase $\varphi 1$ balancing potential applied from the slider of rate-of-roll potentiometer RR7 through resistor 1204 provides a potential balance on conductor 1201. The motor 1200 will then come to rest.

In the manner previously described, the potential of phase $\varphi 1$ derived at the slider of potentiometer RR7 is applied through resistor 646 to signal input conductor 1351 of the bank motor control circuit whereupon the motor 1350 of the bank motor unit is operated in a manner representative of a left wingdown condition as long as the phase $\varphi 1$ potential is applied. The bank motor unit in the manner previously described, controls the tilting of the horizon bars of the gyro-horizon instruments 1622, 1722 and 2122. When the pilot notes from his gyro-horizon instrument 1622 that the bank has been reduced to zero, he will restore the aileron wheel 2006 to its neutral position thereby removing the phase $\varphi 2$ potential from signal input conductor 1201 of the rate-of-roll motor control circuit. The balancing potentiometer RR7 will thereupon control the motor 1200 in a direction to restore the slider of such potentiometer to the electrical center of its winding, whereupon the motor 1200 will come to rest. The return of the slider of potentiometer RR7 to the electrical center of its winding removes the phase $\varphi 1$ potential from signal input conductor 1351 of the bank motor control circuit and the motor thereof comes to rest.

If the bank has been properly executed to return the flight to a straight forward flight, the operation of the bank motor unit as just described will have reduced the phase $\varphi1$ potential applied from the slider of bank potentiometer BK8 as previously described through resistor 648 to signal input conductor 559 of the yaw motor unit to zero and with the phase $\varphi1$ potential supplied through resistors 558 and 650 removed there will be no potential on signal input conductor 559 and the motor 550 of the yaw motor unit will not operate. As a further result of the restoration of the rate-of-turn motor unit to the position representative of a zero rate of turn, the potential of phase $\varphi2$ derived at the slider of rate-of-turn potentiometer RT3 and applied through resistor 653 to the signal input conductor 1001 of the compass motor control circuit is reduced to zero and the motor 1000 of the compass motor unit will come to rest.

*Descent*

It will now be assumed that the flight is in a position in which the pilot desires to simulate a descent for landing. To descend the pilot now partially closes the engine throttles thereby reducing the thrust developed by the engines which will be represented in the trainer by the movement of the sliders of the potentiometers driven by the shaft 1523 of the thrust motor unit toward the No. 1 terminals of their windings. The movement of the slider of potentiometer T5 reduces the phase $\varphi2$ potential applied through resistor 801 to signal input conductor 1452 of the indicated airspeed motor control circuit, whereupon the motor 1450 of such circuit rotates the shaft 1459 of the indicated airspeed motor unit in a direction representative of a decrease in airspeed. As a result of the movement of the slider of thrust potentiometer T2, in a direction representative of the reduction in thrust, phase $\varphi2$ potential applied from such slider through the upper portion of the winding of angle of attack potentiometer AA5 and representative of the lift produced by the slip stream on the portions of the wings in the path of the slip stream is reduced. Also as a result of the reduction in indicated airspeed and the movement of the sliders of indicated airspeed variac IAS3 towards the No. 2 terminal of its winding, the potential of phase $\varphi2$ applied therefrom through the upper portion of angle of attack potentiometer AA5, is reduced. As a consequence of the reduction of the phase $\varphi2$ potential applied to the winding of potentiometer AA5, the potential of phase $\varphi2$ derived at the slider of this potentiometer and applied through resistor 823 to the signal input conductor 1552 of the angle of attack motor control circuit and through resistor 609 to the signal input conductor 608 of the true rate-of-climb motor control circuit become reduced.

With the reduction in phase $\varphi2$ potential applied to signal input conductor 1552, the motor 1550 of the angle of attack motor unit will rotate shaft 1553 in a direction representative of an increase in the angle of attack thereby moving the sliders of angle of attack potentiometers AA1 and AA2 towards the No. 3 terminals of their windings, whereby the potential of phase $\varphi1$ applied from the slider of potentiometer AA2 through resistor 806, to signal input conductor 1452 of the indicated airspeed motor control circuit becomes decreased and the motor 1450 of the indicated airspeed motor unit will rotate shaft 1459 in a direction representative of an increase in indicated airspeed. The indicated airspeed and angle of attack motor unit thus interact.

The reduction in phase $\varphi2$ potential applied to signal input conductor 608 of the rate-of-climb motor control circuit due to the reduction in thrust and indicated airspeed causes the motor 600 of the rate-of-climb motor unit to rotate the shaft of such unit in a direction representative of a reduction in the rate of climb, or to move the sliders of the potentiometers driven thereby toward the No. 1 terminals of their windings. Thereupon the slider of potentiometer RC1 moves below the electrical center of its winding and potential of phase $\varphi2$ becomes applied therefrom over the circuit previously traced through resistor 1453 to the signal input conductor 1452 of the indicated airspeed motor control circuit. Motor 1450 will now be operated to rotate shaft 1459 in a direction representative of an increase in airspeed due to the diving attitude of the flight. In response to the increase in indicated airspeed the phase $\varphi2$ potential applied from the slider of indicated airspeed variac IAS3 to the winding of angle of attack potentiometer AA5 increases with the result that the phase $\varphi2$ potential applied to signal input conductor 608 of the true rate-of-climb motor control circuit increases and the motor 600 thereof is operated in a direction representative of a reduction in the angle of dive. The true rate of climb and indicated airspeed motor unit thus interact until a stable condition is reached in which a steady descending flight results at the indicated airspeed determined by the position of the elevator control 2006 and the throttle openings. The rate of dive will be indicated by the rate-of-climb indicators 1607, 1707 and 2120 controlled in the manner previously described.

As a further result in the decrease in airspeed due to the closing of the throttles, the potential of phase $\varphi2$ applied from the slider of wing flaps potentiometer WF5 through resistor 926 to signal input conductor 1301 of the rate-of-pitch motor control circuit becomes reduced and as a result the motor 1300 rotates the slider of potentiometer RP7 toward the No. 1 terminal of its winding representative of a negative rate of pitch. A potential of phase $\varphi2$ is thereby applied through resistor 1559 to signal input conductor 1552 of the angle of attack motor control circuit whereupon the angle of attack motor unit functions in a manner representative of a reduction in angle of attack. The phase $\varphi1$ potential applied through resistor 824 to signal input conductor 1301 of the rate-of-pitch motor control circuit then becomes reduced and the motor 1300 of the rate-of-pitch motor unit will thereby be controlled to move the slider of rate-of-pitch potentiometer RP7 in a direction to reduce the phase $\varphi2$ potential applied therefrom to the signal input conductor 1552 whereupon the motor 1550 of the angle of attack motor unit will function to again slightly increase the angle of attack. The angle of attack and rate-of-pitch motor units thus interact until a value of angle of attack is attained in which the rate of pitch becomes zero at which time the sliders of the rate-of-pitch motor unit will be at the electrical centers of their windings.

If the line of descent is not correct for the simulated landing, the pilot may increase or decrease the rate of dive by the operation of the elevator control 2006 and the consequent resetting of the potentiometer EL which will in the manner previously described control the rate of pitch and thereby the angle of attack and rate of dive.

Approach and landing

When the altimeter reading has decreased sufficiently the pilot will operate the landing gear control to its "down" position whereupon the motor of the landing gear motor unit will operate such unit to a position representative of a fully "down" position of the landing gear in which position the slider of the landing gear potentiometer LG7 will be at the No. 1 terminal of its winding. This readjustment of the potentiometer LG7 increases the phase $\varphi 1$ potential applied through resistor 551 to the signal input conductor 1452 of the indicated airspeed motor control circuit whereupon the motor 1450 of the indicated airspeed motor unit operates in a manner representative of a decrease in airspeed. The decrease in airspeed causes a decrease in the phase $\varphi 2$ potential applied from the slider of the indicated airspeed variac IAS3 to the upper portion of the winding of the angle of attack potentiometer AA5 with the result that the true rate-of-climb motor unit is operated in a direction representative of an increase in the rate of descent. By means of the elevator control and the throttles, the pilot will now readjust the indicated airspeed to 130 to 135 knots at which airspeed the rate of descent will be from 600 to 900 feet per minute.

The pilot will then operate the wing flaps control thereby operating the wing flaps motor unit of Fig. 9 until the indicators show the wing flaps to be about 20 degrees down. The movement of the wing flaps potentiometer WF2 toward the No. 3 winding terminal will decrease the phase $\varphi 1$ potential applied through resistor 902 to the signal input conductor 1452 of the indicated airspeed motor control circuit whereupon the motor 1450 thereof will rotate shaft 1459 in a direction representative of a decrease in airspeed. To maintain an airspeed of 130 to 135 knots the pilot will push forward on the elevator control whereby, through the interaction of the rate of pitch and angle of attack motor control circuits as previously described, the angle of attack motor unit is controlled to represent an angle of attack which through the angle of attack potentiometers AA1 and AA2 will maintain the airspeed at 130 to 135 knots. A further result of the movement of the wing flaps potentiometer WF3 toward the No. 3 terminal of its winding will be to increase the phase $\varphi 2$ potential applied through resistor 610 to the signal input control conductor 608 of the true rate-of-climb motor control circuit thereby causing the rate-of-climb motor control circuit to be operated in a manner representative of a decrease in the rate of descent.

The pilot will then further reduce the airspeed to 120 to 125 knots by further closing the throttles. The reduction in the airspeed results as previously described in an increase in the rate of descent to 650 to 950 feet per minute. The pilot will then operate the wing flaps control until the indicators show the wing flaps to be 40 degrees down with the result that potentiometer WF2 again causes the indicated airspeed motor to be readjusted to a position representative of a further decrease in airspeed. To maintain an airspeed of 105 to 110 knots the pilot will again pull forward on the elevator control whereby, through the interaction of the rate of pitch and angle of attack motor control circuits as previously described, the angle of attack motor unit is controlled to represent an angle of attack which through the angle of attack potentiometers AA1 and AA2 will maintain the airspeed at 105 to 110 knots. At this time the rate of descent will increase to 700 to 1000 per minute.

When the altimeter reads zero the pilot will fully close the throttles thereby further reducing the airspeed through the reduction of the phase $\varphi 2$ thrust potential applied from the slider of thrust potentiometer T5, through resistor 801 to signal input conductor 1452 of the indicated airspeed motor control circuit. With a zero altitude represented by the position of the shaft of the altimeter motor unit, the L1 and L3 switches of such unit are both operated to thereby close the circuit of the G relay 412 which operates in turn operating the G1, G2, G3, G4 and G5 relays 890, 1451, 1259, 1551 and 601, respectively. To simulate the nose wheel off the ground condition in the landing the pilot pulls back on the elevator thereby moving the slider of elevator potentiometer EL to a position in which phase $\varphi 2$ potential is applied therefrom to signal input conductor 1301 of the rate-of-pitch motor control circuit whereupon the motor of such circuit will move the slider of potentiometer RP7 into a position such that potential of phase $\varphi 1$ will be applied therefrom through resistor 1559 to signal input conductor 1552 of the angle of attack motor control circuit. The motor 1550 of the angle of attack motor unit will thereupon rotate its shaft into a position representative of an angle of attack such that the nose wheel in the airplane would be off the ground. At this time the horizon bars of the gyro-horizon instruments will, under control of the pitch bar motor unit, in turn controlled by the rate of climb and angle of attack motor units, show a nose "up" condition of the trainer. When the indicated airspeed becomes reduced to 40 to 70 knots the potentials controlling the position of the shaft of the angle of attack motor unit, become changed so that the angle of attack becomes reduced with a consequent operation of the pitch bar motor unit until the horizon bars of the gyro-horizon instruments show a nose level condtion.

When the airspeed has become reduced to 40 to 70 knots and the foot brakes are applied, foot brake potentiometers RB1 and LB1 move toward the No. 3 terminals of their windings and, with the G3 relay 1259 now operated, the potentials of phase $\phi 1$ are applied through resistor 1453 to signal input conductor 1452 of the indicated airspeed motor control circuit whereby the motor of that circuit causes the shaft 1459 to turn rapidly to a position of zero airspeed. With the G relays all operated, the various motor units of the trainer are controlled to restore the sliders thereof to their normal positions in the manner previously described. At zero airspeed the position of the rate-of-turn indicators will be centered, the balls of the ball units of the turn and bank indicators will be centered, the horizon bars of the gyro-horizon instruments will be horizontal, the rate-of-climb indicators will read zero and the compasses will cease to move.

What is claimed is:

1. In a device for simulating the flight of an airplane, a source of current, a control conductor, a potentiometer for deriving a potential from said source commensurate with the rate of turn of the simulated flight and for applying said potential to said conductor, a first motor responsive to the potential applied to said conductor for integrating the rate of turn with respect to time, an instructor's desk, a second motor, means at said desk for causing said second motor to turn in one or the other direction to a degree commensurate with a desired compass variation, simulated compasses at said instructor's desk and at crew stations in said trainer and means jointly controlled by said motors for operating said compasses.

2. In a device for simulating the flight of an airplane, a source of current, a control conductor, a potentiometer for deriving a potential from said source commensurate with the rate of turn of the simulated flight and for applying said potential to said conductor, a first motor responsive to the potential applied to said conductor for integrating the rate of turn with respect to time, an instructor's desk, a second motor, means at said desk for causing said second motor to turn in one or the other direction to a degree commensurate with a desired compass variation, a differential gear box, the input shafts of which are driven by said first and second motors respectively, whereby the output shaft of said gear box is driven at a speed equal to the differential sum of the speeds of the input shafts, and simulated compasses at said instructor's desk and at crew stations in said trainer operable in response to the rotation of said output shaft.

3. In a device for simulating the flight of an airplane, a source of current, a control conductor, a potentiometer for deriving a potential from said source commensurate with the rate of turn of the simulated flight and for applying said potential to said conductor, a first motor responsive to the potential applied to said conductor for integrating the rate of turn with respect to time, an instructor's desk, a second motor, means at said desk for causing said second motor to turn in one or the other direction to a degree commensurate with a desired compass variation, a simulated compass at said instructor's desk operable in response to the operation of said second motor to indicate the amount of magnetic variation imposed by the instructor, simulated compasses at said instructor's desk and at crew stations in said trainer, and means jointly controlled by said motors for operating said latter compasses to indicate the heading of the simulated flight as corrected by the magnetic variation imposed by the instructor.

4. In a trainer for simulating the flight of an airplane, a source of current, a control conductor, a potentiometer for deriving a potential from said source commensurate with the rate of turn of the simulated flight, a potentiometer for modifying said derived potential in accordance with the cosine of the angle of bank of the simulated flight, means for deriving a second potential from said source which varies with the angle of bank of the simulated flight, a potentiometer for modifying said latter potential in accordance with the rate of pitch of the simulated flight and for applying said latter potential to said conductor, a motor responsive to the summation of the potentials applied to said conductor for integrating the rate of turn and the rate of pitch as modified by the angle of bank with respect to time, and instructor's desk, and simulated compasses at said instructor's desk and at crew stations in said trainer operable in response to the operation of said motor.

5. In a trainer for simulating the flight of an airplane, a source of current, a control conductor, a potentiometer for deriving a potential from said source commensurate with the rate of turn of the simulated flight and for applying said potential to said conductor, a motor responsive to the potential applied to said conductor for integrating the rate of turn with respect to time, representative of the operation of an earth inductor compass, a navigator's station, a simulated master indicator flux gate compass at said station, telemetric means operable by said motor for operating said master indicator flux gate compass, and a simulated remote indicating compass in said trainer telemetrically operable by said master indicator flux gate compass.

6. In a trainer for simulating the flight of an airplane, a source of current, a control conductor, a potentiometer for deriving a potential from said source commensurate with the rate of turn of the simulated flight and for applying said potential to said conductor, a motor responsive to the potential applied to said conductor for integrating the rate of turn with respect to time, representative of the operation of an earth inductor compass, a navigator's station, a simulated master indicator flux gate compass at said station, telemetric means operable by said motor for operating said master indicator flux gate compass, means at said navigator's station for introducing a magnetic variation correction into said compass, an instructor's desk, a simulated remote indicating compass at said desk, and a key at said desk for enabling the instructor to cause said remote indicating compass to be telemetrically controlled by said motor to indicate the true heading of the simulated flight or by said master indicator flux gate compass to indicate the heading as corrected by the navigator.

7. In a trainer for simulating the flight of an airplane, a source of current, a control conductor, means for deriving a first potential from said source which varies as the rate of turn and with the bank angle of the simulated flight and for applying said potential to said conductor, means for deriving a second potential from said source which varies with the true airspeed and with the bank angle of the simulated flight and for applying said latter potential to said conductor, means for deriving a third potential from said source which varies with the indicated airspeed and with the amount of simulated rudder deflection and for applying said latter potential to said conductor, a balancing potentiometer for deriving a potential from said source which varies in accordance with the indicated airspeed and with the amount of side slip and for applying said balancing potential to said conductor, a motor responsive to the summation of the potentials applied to said conductor for adjusting said balancing potentiometer until the sum of the potentials applied to said conductor becomes zero, and means controlled by said motor for introducing the effect of rate of yaw or side slip into other motor control circuit networks in the trainer.

8. In a trainer for simulating the flight of an airplane, a source of current, a control conductor, means for deriving a first potential from said source which varies as the rate of turn and with the cosine of the bank angle of the simulated flight and for applying said potential to said conductor, means for deriving a second potential from said source which varies with the true airspeed and with the bank angle of the simulated flight and for applying said latter potential to said conductor, means for deriving a third potential from said source which varies with the indicated airspeed and with the amount of the simulated rudder deflection and for applying said latter potential to said conductor, a balancing potentiometer for deriving a potential from said source which varies in accordance with the indicated airspeed and with the amount of side slip and for applying said balancing potential to said conductor, a motor responsive to the summation of the potentials applied to said conductor for adjusting said balancing potentiometer until the sum of the potentials applied to said conductor becomes zero, means controlled by said motor for introducing the effect of rate of yaw or side slip into other motor control circuit networks in the trainer, and means operative when a ground condition of flight is simulated for discontinuing said first three potentials whereupon said balancing potentiometer becomes effective to control said motor to center the slider of said balancing potentiometer at a position of zero yaw.

9. In a trainer for simulating the flight of an airplane, a source of current, a control conductor, a potentiometer for deriving a potential from said source commensurate with the rate of climb of the simulated flight, a potentiometer for modifying said potential in accordance with the true airspeed of the simulated flight and for applying said modified potential to said conductor, a potentiometer for deriving a potential from said source commensurate with the angle of attack of the simulated flight, means for modifying said latter potential in accordance with the cosine of the angle of bank of the simulated flight and for applying said modified potential to said conductor, a balancing potentiometer for deriving a potential from said source and for applying it to said conductor, a motor responsive to the summation of the potentials applied to said conductor for adjusting said balancing potentiometer until the sum of the potentials applied to said conductor becomes zero, an instructor's desk, simulated gyro-horizon instruments at said instructor's desk and at crew stations in said trainer, and means controlled by said motor for elevating or depressing the horizon bars of said instruments to indicate the nosing down, nosing up or level condition of the simulated flight.

10. In a trainer for simulating the flight of an airplane, a source of current, a control conductor, a potentiometer for deriving a potential from said source commensurate with the true rate of climb of the simulated flight, a potentiometer for modifying said potential in accordance with the airspeed of the simulated flight and for applying said modified potential to said conductor, a potentiometer for deriving a potential from said suorce commensurate with the angle of attack of the simulated flight, means for modifying said latter potential in accordance with the cosine of the angle of bank of the simulated flight and for applying said modified potential to said conductor, means for deriving a potential from said source if an incorrectly banked turn is simulated and for applying it to said conductor, a balancing potentiometer for deriving a potential from said source and for applying it to said conductor, a motor responsive to the summation of the potentials applied to said conductor for adjusting said balancing potentiometer until the sum of the potentials applied to said conductor becomes zero, an instructor's desk, simulated gyro-horizon instruments at said instructor's desk and at crew stations in said trainer, and means controlled by said motor for elevating or depressing the horizon bars of said instruments to indicate the nosing down, the nosing up or level condition of the simulated flight.

11. In a trainer for simulating the flight of an airplane, a source of current, a control conductor, a potentiometer for deriving a potential from said source commensurate with the true rate of climb of the simulated flight, a potentiometer for modifying said potential in accordance with the true airspeed of the simulated flight and for applying said modified potential to said conductor, a potentiometer for deriving a potential from said source commensurate with the angle of attack of the simulated flight, means for modifying said latter potential in accordance with the cosine of angle of bank of the simulated flight and for applying said modified potential to said conductor, means for deriving equal potentials of opposite phase from said source which vary in value in accordance with the simulated angle of bank, a potentiometer having a grounded mid-tap to the terminals of the windings of which said latter potentials are applied and the slider of which is controlled in accordance with the side slip of an incorrectly banked turn and applies the potential derived thereat to said conductor only if a turn is incorrectly banked, a balancing potentiometer for deriving a potential from said source and for applying it to said conductor, a motor responsive to the summation of the potentials applied to said conductor for adjusting said balancing potentiometer until the sum of the potentials applied to said conductors becomes zero, an instructor's desk, simulated gyro-horizon instruments at said desk and at crew stations in said trainer, and means controlled by said motor for elevating or depressing the horizon bars of said instruments to indicate a nosing down, a nosing up or a level condition of the simulated flight.

12. In a trainer for simulating the flight of an airplane, a source of current, a control conductor, means for deriving a potential from said source which varies in accordance with the square of the indicated airspeed of the simulated flight, a potentiometer for deriving a further potential from said source which varies with the simulated thrust of the airplane propellers, a potentiometer for modifying the summation of said derived potentials in accordance with the effect of the assumed positions of the wing flaps of the simulated airplane and for applying said modified potential to said conductor, a potentiometer for modifying said summation potentials in accordance with the angle of attack of the simulated flight and for applying said latter potential to said conductor, a potentiometer for deriving a potential from said source commensurate with the effect of the assumed weight of the airplane and for applying said potential to said control conductor, a motor operable in response to the summation of the potentials applied to said conductor to a degree commensurate with the rate of climb of the simulated flight, an instructor's desk, and indicators at said desk and at crew stations in said trainer operable in response to the operation of said motor to indicate the rate of climb of the simulated flight.

13. In a trainer for simulating the flight of an airplane, a source of current, a control conductor, means for deriving a potential from said source which varies in accordance with the square of the indicated airspeed of the simulated flight, a potentiometer for deriving a further potential from said source which varies with the simulated thrust of the airplane propellers, a potentiometer for modifying the summation of said derived potentials in accordance with the effect of the assumed positions of the wing flaps of the simulated airplane and for applying said modified potential to said conductor, a potentiometer for modifying said summation potential in accordance with the angle of attack of the simulated flight and for applying said latter potential to said conductor, a potentiometer for deriving a potential from said source commensurate with the effect of the assumed weight of the airplane and for applying said potential to said conductor, potentiometers for modifying the potentials applied to said conductor in accordance with the angle of bank of the simulated flight, a motor operable in response to the summation of the potentials applied to said conductor to a degree commensurate with the rate of climb of the simulated flight, an instructor's desk, and indicators at said desk and at the crew stations in said trainer operable in response to the operation of said motor to indicate the rate of climb of the simulated flight.

14. In a trainer for simulating the flight of an airplane, a source of current, means for simulating the indicated airspeed of an airplane, means for simulating the effect of the positions of the wing flaps of said airplane, means for simulating the angle of attack of said airplane, means for simulating the effect of the weight of said airplane, means for simulating the effect of the banking of said airplane, means responsive to said preceding means for deriving potentials from said source of current, means responsive to the summation of said potentials, a potentiometer operable by said latter means for deriving a potential from said source commensurate with the true rate of climb of the simulated flight, a motor responsive to said latter potential, an instructor's desk, and indicators at the instructor's desk and at crew stations in said trainer operable in response to the operation of said motor to indicate the rate of climb of the simulated flight.

15. In a trainer for simulating the flight of an airplane, a source of current, means for simulating the indicated airspeed of an airplane, means for simulating the positions of the wing flaps of said airplane, means for simulating the angle of attack of said airplane, means for simulating the effect of the weight of said airplane, means for simulating the effect of the banking of said airplane, means responsive to said preceding means for deriving potentials from said source of current, means responsive to the summation of said potentials, a control conductor, a potentiometer operable by said means for deriving a potential from said source and for applying it to said conductor commensurate with the true rate of climb of the simulated flight, a balancing potentiometer for deriving a potential from said source and for applying it to said conductor, a motor responsive to the summation of said potentials for adjusting said potentiometers until the sum of the potentials applied to said conductor becomes zero, an instructor's desk, and indicators at the instructor's desk and at crew stations in said trainer operable in response to the operation of said motor to indicate the rate of climb of the simulated flight.

16. In a trainer for simulating the flight of an airplane, a source of current, a control conductor, a potentiometer for deriving a potential from said source commensurate with the altitude of the simulated flight and for applying said potential to said conductor, an instructor's desk, a rheostat at said desk operable by the instructor to derive a potential from said source commensurate with a departure from the basic air temperature and for applying said potential to said conductor, a balancing potentiometer for deriving a potential from said source and for applying it to said conductor, a motor responsive to the summation of the potentials applied to said conductor for adjusting said balancing potentiometer until the sum of the potentials applied to said conductor becomes zero, an instructor's desk, and indicators at said instructor's desk and at crew stations in said trainer operable in response to the operation of said motor for simulating the indication of the outside air temperature, which temperature will decrease as the altitude of the simulated flight increases.

17. In a trainer for simulating the flight of an airplane, a source of current, a control conductor, means for deriving a potential from said source which varies in accordance with the square of the indicated airspeed of the simulated flight, a potentiometer for deriving a further potential from said source which varies with the simulated thrust of the airplane propellers, a potentiometer for modifying the summation of said derived potentials in accordance with the effect of the assumed positions of the wing flaps of the simulated airplane and for applying said modified potential to said conductor, a potentiometer for deriving a potential from said source commensurate with the effect of the assumed weight of the airplane and for applying said potential to said conductor, a potentiometer for deriving a potential from said source which varies with the rate of pitch of the simulated flight and for applying it to said conductor, a balancing potentiometer for modifying said summation potential and for applying it to said conductor, a motor responsive to the summation of the potentials applied to said conductor for adjusting said balancing potentiometer until the sum of the potentials applied to said conductor becomes zero, and means controlled by said motor for introducing integration factors into other motor controlled circuit networks in the trainer representative of the angle of attack.

18. In a trainer for simulating the flight of an airplane, a source of current, a control conductor, means for deriving a potential from said source which varies in accordance with the square of the indicated airspeed of the simulated flight, a potentiometer for deriving a further potential from said source which varies with the simulated thrust of the airplane propellers, a potentiometer for modifying the summation of said derived potentials in accordance with the effect of the assumed positions of the wing flaps of the simulated airplane and for applying said modified potential to said conductor, a potentiometer for deriving a potential from said source commensurate with the effect of the assumed weight of the airplane and for applying said potential to said conductor, a balancing potentiometer for modifying said summation potential and for applying it to said conductor, potentiometers for modifying said potentials applied to said conductor in accordance with the effect of the angle of bank of the simulated flight, a potentiometer for deriving a potential from said source which varies with the rate of pitch of the simulated flight and for applying it to said conductor, a motor responsive to the summation of the potentials applied to said conductor for adjusting said balancing potentiometer until the sum of the potentials applied to said conductor becomes zero, and means controlled by said motor for introducing integration factors into other motor control circuit networks in the trainer representative of the angle of attack.

19. In a trainer for simulating the flight of an airplane, a source of current, a control conductor, means for deriving potentials from said source and applying them to said conductor representative of the flight factors which determine the angle of attack of an airplane, a motor responsive to the summation of said potentials, a relay operative to discontinue the application of said potentials to said conductor when a landing condition of flight is simulated, means controlled by said motor after a landing has been simulated and an angle of attack has been attained representative of the engagement of the nose wheel of an airplane with the ground for arresting the operation of said motor.

20. In a trainer for simulating the flight of an airplane, a simulated aileron control, a source of current, a control conductor, means for deriving a potential from said source which varies in accordance with the indicated airspeed, a potentiometer operable by said aileron control for modifying said derived potential and for applying it to said control conductor, a potentiometer for modifying said first derived potential in accordance with the yaw or side slip of a simulated flight, and for applying it to said conductor, a balancing potentiometer for deriving a potential from said source and for applying it to said conductor, a motor responsive to the summation of the potentials applied to said conductor for adjusting said balancing potentiometer until the sum of the potentials applied to said conductor becomes zero, a motor unit operable to represent the effect of banking in a simulated flight, and means controlled by said motor for introducing an integration factor into said bank motor unit of said trainer representative of the rate of roll of the simulated flight.

21. In a trainer for simulating the flight of an airplane, a simulated aileron control, a source of current, a control conductor, means for deriving a potential from said source which varies in accordance with the indicated airspeed of the simulated flight, a potentiometer operable by said aileron control for modifying said derived potential and for applying it to said conductor, a potentiometer for modifying said first derived potential in accordance with the yaw or side slip of the simulated flight and for applying it to said conductor, a balancing potentiometer for deriving a potential from said source and for applying it to said conductor, a first motor responsive to the summation of the potentials applied to said conductor for adjusting said balancing potentiometer until the sum of the potentials applied to said conductor becomes zero and said balancing potentiometer has thus integrated the rate of change of the rate of roll with respect to time, a second control conductor to which potential derived at said balancing potentiometer is applied, a motor responsive to potential applied to said latter conductor, an instructor's desk, and indicators at said desk and at crew stations in said trainer operative in response to the operation of said latter motor to indicate the angle of bank of the simulated flight.

22. In a trainer for simulating the flight of an airplane, a simulated elevator control, a source of current, a control conductor, means for deriving potentials of opposite phase from said source which vary in accordance with the indicated airspeed of a simulated flight, a potentiometer controlled by said elevator control for modifying one or the other of said potentials in accordance with the angle of attack of the elevator and for applying said modified potential to said conductor, a potentiometer for modifying one or the other of said derived potentials in accordance with the angle of attack of the simulated flight and for applying said latter potential to said conductor, a potentiometer for modifying one of said first derived potentials in accordance with the assumed position of the wing flaps of the simulated airplane and for applying said potential to said conductor, potentiometers for modifying said derived potential of the opposite phase in accordance with the effect of the assumed longitudinal center of gravity and in accordance with the effect of the assumed position of the wing flaps of the simulated airplane and for applying said modified potential to said conductor, a balancing potentiometer for deriving a balancing potential from said source and for applying it to said conductor, a motor responsive to the summation of the potentials applied to said conductor for adjusting said balancing potentiometer until the sum of the potentials applied to said conductor becomes zero, and means controlled by said motor for introducing integration factors into the other motor control circuit networks in the trainer representative of the rate of pitch.

23. In a trainer for simulating the flight of an airplane, a simulated elevator control, a source of current, a control conductor, means for deriving potentials of opposite phase from said source which vary in accordance with the indicated airspeed of the simulated flight, a potentiometer controlled by said elevator control for modifying one or the other of said potentials in accordance with the assumed position of the elevator and for applying said modified potential to said conductor, a potentiometer for modifying one or the other of said derived potentials in accordance with the angle of attack of the simulated flight and for applying said modified potential to said conductor, a potentiometer for modifying one of said derived potentials in accordance with the effect of the assumed position of the wing flaps of the simulated airplane and for applying said modified potential to said conductor, potentiometers operable prior to simulated take-off of a flight to derive a potential of the opposite phase from said source which varies as the indicated airspeed, in accordance with the effect of the assumed longitudinal center of gravity and in accordance with the effect of the assumed weight of the simulated airplane and for applying said potential to said conductor, a balancing potentiometer for deriving a balancing potential from said source and for applying it to said conductor, a motor responsive to the summation of the potentials applied to said conductor for adjusting said balancing potentiometer until the sum of the potentials applied to said conductor becomes zero, and means controlled by said motor for introducing integration factors into other motor control circuit networks in the trainer representative of the rate of pitch.

24. In a trainer for simulating the flight of an airplane, a source of current, a control conductor, potentiometers for deriving potentials from said source in accordance with the simulated brake horsepower output of each of four simulated engines of an airplane, the potentials derived for simulating the output of the Nos. 1 and 2 engines being of one phase, the potentials derived for simulating the output of the Nos. 3 and 4 engines being of the opposite phase, and the potentials simulating the output of the Nos. 1 and 4 outboard engines being greater for the same brake horsepower output than the potentials simulating the output of the Nos. 2 and 3 inboard engines, means for applying the derived potentials to said conductor, a balancing potentiometer for deriving a potential of either phase from said source and for applying it to said conductor and a motor responsive to the summation of the potentials applied to said conductor for adjusting said balancing potentiometer until the sum of the potentials applied to said conductor becomes zero, whereby said motor operates in a direction representative of a turn in a simulated flight to the left or to the right if any potential is derived which simulates the condition whereunder any simulated engine develops less horsepower than the other engines, and said rate of turn being greater in the event of the derivation of a potential which simulates the failure of an outboard engine.

25. In a trainer for simulating the flight of an airplane, a source of current, a control conductor, means for deriving potentials from said source of current of opposite phase which vary in accordance with the true airspeed of the simulated flight, a potentiometer for modifying one or the other of said derived potentials in accordance with the rate of turn of the simulated flight and for applying it to said conductor, means for deriving potentials from said source of current of opposite phase which vary in accordance with the indicated airspeed of the associated flight, a potentiometer for modifying one or the other of said latter potentials in accordance with the yaw or side slip of the simulated flight and for applying said modified potential to said conductor, a balancing potentiometer for deriving a potential of either phase from said source and for applying it to said conductor, a motor responsive to the summation of the potentials applied to said conductor for adjusting said balancing potentiometer until the sum of the potentials applied to said conductor becomes zero, indicators simulating ball indicators operative in response to the operation of said motor to indicate any failure to simulate a properly banked turn in a simulated flight, and means operated by said motor for introducing integration factors into other motor control circuit networks in the trainer.

26. In a trainer for simulating the flight of an airplane, a simulated rudder control, a source of current, a control conductor, means for deriving potentials from said source of opposite phase which vary in accordance with the true airspeed of the simulated flight, a potentiometer for modifying one or the other of said derived potentials in accordance with the amount of the simulated rate of turn, means effective on a simulated ground condition of flight for applying said modified potential to said conductor, a balancing potentiometer for deriving a potential of either phase from said source and for applying it to said conductor, a motor responsive to the summation of the potentials applied to said conductor for adjusting said balancing potentiometer until the sum of the potentials applied to said conductor becomes zero, and indicators simulating ball indicators operative in response to the operation of said motor and operable into positions in which the balls are centered when the rudder control is returned to its normal neutral position.

27. In a device for simulating the flight of an airplane, a control conductor, means for applying a potential to said conductor representative of the simulated altitude of flight, a motor, a space discharge device responsive to said potential for transmitting power impulses to said motor whereby said motor operates in a manner representative of the simulated altitude, relays operable to represent a ground condition of flight, and a relay operable over the cathode-anode path of said space discharge device to cause the release of said relays to simulate an airborne condition of flight.

28. In a device for simulating the flight of an airplane, a control conductor, means for applying a potential to said conductor representative of the simulated altitude of flight, a motor, relays operable to represent a ground condition of flight, means controlled by said motor for causing the operation of said relays when a zero altitude condition is simulated, a space discharge device responsive to said potential for transmitting power impulses to said motor whereby said motor operates in a manner representative of an increasing altitude and a relay operable over the cathode-anode path of said space discharge device to cause the release of said relays to simulate an airborne condition of flight.

29. In a device for simulating the flight of an airplane, a source of current, a control conductor, a potentiometer for deriving a potential from said source commensurate with the indicated airspeed of the simulated flight and for applying said potential to said conductor, a potentiometer for deriving a potential opposite in phase to said first potential from said source which varies with the altitude of the simulated flight, an instructor's desk, means at said desk controllable to modify said latter derived potential in accordance with the assumed outside air temperature whereby said modified potential is caused to vary in a manner representative of the air density, a balancing potentiometer for applying said modified potential to said conductor, a motor responsive to the summation of the potentials applied to said conductor for adjusting said balancing potentiometer until the sum of potentials applied to said conductor becomes zero, and means controlled by said motor for introducing integration factors into other motor control circuit networks in the trainer representative of the true airspeed.

30. In a trainer for simulating the flight of an airplane, two transmitters each having a multi-winding stator and a rotor, means for applying a potential of one phase to one of said rotors which varies as the true airspeed of a simulated flight, means for producing a potential of opposite phase which varies as the true airspeed, means for modifying one or the other of said potentials in accordance with the simulated yaw of the flight and for applying said modified potential to the other of said rotors, means for rotationally displacing said rotors proportionally to the compass heading of the simulated flight, a third transmitter having a multiwinding stator and a rotor, means for applying a potential to said latter rotor proportional to an assumed wind velocity, means for rotationally displacing said latter rotor proportionally to the assumed wind direction, two receivers each having a multiwinding stator connected to the stators of all of said transmitters and each having a rotor, a motor geared to the rotors of said receivers and a thermionic amplifier circuit interposed between the rotor of one of said receivers and said motor for controlling said motor to bring the rotor of said one receiver into a rotational position corresponding to the vectorial sum of the positions of the rotors of all of said transmitters and to bring the rotor of said other receiver into a rotational position in which the potential induced therein is proportional to the vectorial sum of the potentials applied to the rotors of said transmitters.

ROBERT O. RIPPERE.

REFERENCES CITED

The following references are of record in the file of this patent:

UNITED STATES PATENTS

| Number | Name | Date |
| --- | --- | --- |
| 2,164,412 | Koster | July 4, 1939 |
| 2,190,390 | Thiry | Feb. 13, 1940 |
| 2,332,523 | Norden | Oct. 26, 1943 |
| 2,336,711 | Barber | Dec. 14, 1943 |
| 2,366,603 | Dehmel | Jan. 2, 1945 |
| 2,379,869 | Baker | July 10, 1945 |
| 2,381,872 | Baker | Aug. 14, 1945 |
| 2,395,477 | Gumley | Feb. 26, 1946 |
| 2,428,767 | Albert | Oct. 14, 1947 |
| 2,428,770 | Albert | Oct. 14, 1947 |
| 2,439,168 | Kail | Apr. 6, 1948 |
| 2,442,205 | Kail | May 25, 1948 |
| 2,443,076 | Lowkrantz | June 8, 1948 |
| 2,443,604 | Dehmel | June 22, 1948 |
| 2,494,508 | Dehmel | Jan. 10, 1950 |

FOREIGN PATENTS

| Number | Country | Date |
| --- | --- | --- |
| 396,540 | Great Britain | 1933 |